US009524803B2

(12) United States Patent
Sugiura et al.

(10) Patent No.: US 9,524,803 B2
(45) Date of Patent: Dec. 20, 2016

(54) NOZZLE STUB WORKING SYSTEM FOR REACTOR VESSEL

(75) Inventors: Atsushi Sugiura, Tokyo (JP); Takumi Hori, Tokyo (JP); Kenji Nishikawa, Tokyo (JP); Ken Onishi, Tokyo (JP); Noriaki Shimonabe, Tokyo (JP); Satoshi Tsuzuki, Hiroshima (JP); Ikuo Wakamoto, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 836 days.

(21) Appl. No.: 13/263,938

(22) PCT Filed: May 26, 2010

(86) PCT No.: PCT/JP2010/003503
§ 371 (c)(1),
(2), (4) Date: Oct. 11, 2011

(87) PCT Pub. No.: WO2011/004540
PCT Pub. Date: Jan. 13, 2011

(65) Prior Publication Data
US 2012/0027154 A1 Feb. 2, 2012

(30) Foreign Application Priority Data
Jul. 10, 2009 (JP) .................. 2009-163875

(51) Int. Cl.
*G21C 17/017* (2006.01)
*G21C 17/01* (2006.01)
(Continued)

(52) U.S. Cl.
CPC ............. *G21C 17/017* (2013.01); *G21C 17/01* (2013.01); *G21C 19/14* (2013.01); *G21C 17/003* (2013.01); *G21C 19/207* (2013.01)

(58) Field of Classification Search
CPC .......... G21C 9/00; G21C 17/003; G21C 19/02; G21C 19/00; G21C 17/01; G21C 17/017; G21C 19/14
(Continued)

(56) References Cited

U.S. PATENT DOCUMENTS 3,756,915 A * 9/1973 Matveevich et al. ......... 376/249
4,311,556 A * 1/1982 Iwamoto ................ G21C 17/01
376/249
(Continued)

FOREIGN PATENT DOCUMENTS

JP 54-007987 A 1/1979
JP 56-038899 U 4/1981
(Continued)

OTHER PUBLICATIONS

European Search Report dated Jan. 28, 2014, issued in corresponding European application No. 10796854.7.
(Continued)

*Primary Examiner* — Jack W Keith
*Assistant Examiner* — Lily C Garner
(74) *Attorney, Agent, or Firm* — Westerman, Hattori, Daniels & Adrian, LLP

(57) ABSTRACT

A reactor vessel that performs work inside a nozzle stub of the reactor vessel, including a platform unit that is provided at an upper portion inside the reactor vessel and includes a substantially cylindrical side wall portion and a bottom portion blocking the lower end of the side wall portion; an access window that is provided at the side wall portion of the platform unit an access window moving device that opens and closes the access window; a working device; and a control device that is provided at the outside of the reactor vessel and controls the access window moving device and the working device, wherein the control device drives the (Continued)

access window moving device to open the access window, drives the working device to perform work inside the nozzle stub, and then drives the access window moving device to close the access window after the performance of the work.

21 Claims, 38 Drawing Sheets

(51) Int. Cl.
*G21C 19/14* (2006.01)
*G21C 17/003* (2006.01)
*G21C 19/20* (2006.01)

(58) Field of Classification Search
USPC .................. 376/305, 260, 249; 219/76.1
See application file for complete search history.

(56) References Cited

U.S. PATENT DOCUMENTS

| | | | |
|---|---|---|---|
| 5,571,968 A * | 11/1996 | Buckley | G01N 29/265 376/249 |
| 6,636,579 B2 * | 10/2003 | Kurosawa et al. | 376/305 |
| 8,450,631 B2 * | 5/2013 | Sato | 219/76.1 |
| 2007/0121776 A1 * | 5/2007 | Pao | 376/305 |
| 2010/0325859 A1 * | 12/2010 | Poling | B23K 9/0284 29/402.07 |

FOREIGN PATENT DOCUMENTS

| | | | |
|---|---|---|---|
| JP | 57-113397 A | | 7/1982 |
| JP | 2006-349596 A | | 12/2006 |
| JP | 2006349596 A | * | 12/2006 |
| JP | 2007-003442 A | | 1/2007 |
| JP | 2007-178334 A | | 7/2007 |
| JP | 2007-183278 A | | 7/2007 |
| WO | 2007-116532 A1 | | 10/2007 |

OTHER PUBLICATIONS

International Search Report of PCT/JP2010/003503, mailing date Aug. 31, 2010.

Written Opinion of PCT/JP2010/003503, mailing date Aug. 31, 2010.

* cited by examiner

NOZZLE STUB WORKING SYSTEM FOR REACTOR VESSEL

TECHNICAL FIELD

The present invention relates to a nozzle stub working system for a reactor vessel used to perform work inside a reactor vessel of a nuclear reactor.

Priority is claimed on Japanese Patent Application No. 2009-163875, filed Jul. 10, 2009, the content of which is incorporated herein by reference.

BACKGROUND ART

Hitherto, the maintenance inside a nozzle stub of a reactor vessel has been performed under water since the inside of the reactor vessel is generally filled with cooling water. However, in order to perform the maintenance under water, all devices need to be designed to be waterproof. For this reason, since the devices are designed to be waterproof, the volume and the weight of the devices increase, so that the handling of the devices is difficult. Further, since the used device is exposed to radiation contained in the cooling water, the device needs to be decontaminated after it is lifted. For this reason, recently, a method of performing the maintenance inside the nozzle stub of the reactor vessel in atmosphere has been proposed.

Specifically, a platform is installed inside the reactor vessel after the water level of the cooling water therein is made to be lower than that of the nozzle stub. Inside the platform, a workman inserts a UT inspecting device into the nozzle stub to be fixed therein, and performs UT inspection in a desired range.

CITATION LIST

Patent Literature

[PTL 1] Japanese Patent Application Laid-Open (JP-A) No. 2007-3442

SUMMARY OF INVENTION

Technical Problem

However, in the method of PTL 1, since the inside of the platform is also exposed to radiation, there is a limitation in time for which one workman may stay for each period of work. For this reason, in order to efficiently perform the work inside the platform, a plurality of workmen need to simultaneously perform the work and a plurality of groups of workmen need to alternately perform the work. On the other hand, since the platform is disposed inside the reactor vessel, the inner space of the platform is very narrow, so that there is a limitation in the number of workmen and devices disposed at the same time. For this reason, even when the work is performed using the platform in atmosphere, limited efficiency is obtained, so that the work period needs to be further shortened and cost needs to be further reduced.

The invention is made in view of such circumstances, and it is an object of the present invention to provide a nozzle stub working system for a reactor vessel capable of shortening a work period and reducing cost while suppressing a radiation exposure dose of a workman as much as possible.

Solution to Problem

In order to solve the above-described problems, the invention suggests the following means.

There is provided a nozzle stub working system for a reactor vessel that performs work inside a nozzle stub protruding outward from a side surface of the reactor vessel and allowing the inside and the outside of the reactor vessel to communicate with each other, the nozzle stub working system for the reactor vessel includes: a platform unit that is provided at an upper portion inside the reactor vessel, of which the upper portion is opened by separating an upper structure and an inner structure therefrom, and includes a substantially cylindrical side wall portion and a bottom portion blocking the lower end of the side wall portion; an access window that is provided at the side wall portion of the platform unit to allow the inside of the platform unit to communicate with the nozzle stub; an access window moving device that opens and closes the access window; a working device that advances from the inside of the platform unit to the inside of the nozzle stub to perform work inside the nozzle stub; and a control device that is provided at the outside of the reactor vessel and controls the access window moving device and the working device, wherein the control device drives the access window moving device to open the access window, drives the working device to perform work inside the nozzle stub, and then drives the access window moving device to close the access window after the performance of the work.

According to this configuration, the inside of the platform unit may be made to be the atmospheric environment suppressing the amount of radiation by using the platform unit. Then, when the water level of the cooling water inside the reactor vessel is made to be lower than that of the nozzle stub, it is possible to access the inside of the nozzle stub from the inside of the platform unit through the access window in the atmospheric environment. Then, when the control device provided outside the reactor vessel drives the access window moving device to open the access window and to drive the working device to perform work inside the nozzle stub, it is possible to automatically perform the work inside the nozzle stub without disposing a workman inside the platform unit. Furthermore, when the control device drives the access window moving device to close the access window after the work is completed, in the same manner, it is possible to automatically return the inside of the reactor vessel to the underwater environment without disposing a workman inside the platform unit.

The nozzle stub working system for the reactor vessel may further include: a working floor that is provided above the reactor vessel; and an elevating device that elevates the working device from the working floor into the platform unit. The control device may drive the elevating device to drop the working device into the platform unit.

In this case, since the working floor is provided above the reactor vessel, it is possible to dispose a plurality of devices requiring the working device and the like outside the reactor vessel. Further, since the elevating device is driven under the control of the control device, it is possible to perform the work inside the nozzle stub by dropping the working device inside the platform unit if necessary. For this reason, it is possible to decrease the number of devices disposed inside the platform unit as minimally as possible and perform the work inside the nozzle stub with high efficiency in a narrow space. Then, when the working device is selectively inserted into the platform unit by elevating the elevating device, it is possible to sequentially perform a plurality of types of work.

The nozzle stub working system for the reactor vessel may further include: a moving device that is provided inside the platform unit, separably attaches the working device thereto, and moves the working device attached thereto. The control device may drive the moving device to send and receive the working device between the moving device and the elevating device inside the platform unit, and move the working device attached to the moving device between predetermined positions inside the platform unit and the nozzle stub.

In this case, the moving device is provided inside the platform unit, and the working device may be sent and received between the moving device and the elevating device under the control of the control device. Further, the attached working device may be moved. For this reason, a moving function does not need to be provided in the working device, so that a minimal function necessary for performing the work is provided. Accordingly, it is possible to realize a decrease in size of the working device. Accordingly, it is possible to realize a decrease in weight of the working device elevated by the elevating device and realize a decrease in size of the elevating device. Further, it is possible to more easily perform the movement and the work in the narrow space inside the platform unit and the nozzle stub.

The moving device may be configured to be rotatable about the central axis of the platform unit.

In this case, since the moving device is configured to be rotatable about the central axis of the platform unit inserted into the reactor vessel, it is possible to accurately and easily perform the positioning operation with respect to the plurality of nozzle stubs radially provided in the reactor vessel.

The moving device may include: a first moving unit that separably attaches the working device to the front end thereof and moves the working device about a plurality of axes, and a second moving unit that includes a support plate on which the working device is placed and slides the working device placed on the support plate. The working device may include: a first working unit that is separably attached to the front end of the first moving unit and is driven while being attached thereto, and a second working unit that is placed on the support plate of the second moving unit and includes a fixing unit fixed to an inner surface of the nozzle stub inside the nozzle stub.

In this case, it is possible to perform the work inside the nozzle stub using the first working unit while delicately adjusting the position of the first working unit using the first moving unit movable about a plurality of axes under the control of the control device. On the other hand, it is possible to move the second working unit into the nozzle stub using the second moving unit while stably supporting the second working unit using the support plate under the control of the control device. Then, the second working unit may perform the work while maintaining a stable posture inside the nozzle stub using the fixing unit fixed to the inside of the nozzle stub. That is, it is possible to appropriately perform the work while delicately moving inside the nozzle stub by the combination of the first moving unit and the first working unit. Then, it is possible to appropriately perform the work causing a reaction or vibration from the nozzle stub by the combination of the second moving unit and the second working unit.

The nozzle stub working system for the reactor vessel may further include: a storage device that receives the plurality of working devices. The elevating device may elevate the storage device receiving the plurality of working devices.

In this case, it is possible to elevate a plurality of the working devices received in the storage device using the elevating device under the control of the control device. Accordingly, it is possible to highly efficiently elevate the plurality of working devices. Further, it is possible to perform the work by selecting a working device from the plurality of working devices received in the storage device while the storage device is dropped into the platform unit. Further, in the case of the working device performing the work using a consumable material, the working device does not need to be exchanged using the elevating device whenever the consumable material is completely consumed, but the working device may be exchanged between the storage device and the moving device. Accordingly, it is possible to efficiently perform the work.

The nozzle stub working system for the reactor vessel may further include: a plurality of types of the working devices; and a plurality of the storage devices that correspond to the types of the working devices, each type of the working device being received in each storage device. The control device may drive the elevating device to selectively elevate the storage device in accordance with the type of work.

In this case, it is possible to simultaneously perform the same type of work using a plurality of working devices received in one storage device by driving the elevating device to selectively elevate the storage device in accordance with the type of the work under the control of the control device. Further, it is possible to sequentially perform a plurality of works by exchanging the storage device. Accordingly, it is possible to more efficiently perform the work.

The nozzle stub working system for the reactor vessel may further include: a nozzle stub blocking device that blocks the nozzle stub inside the nozzle stub. The control device may drive the nozzle stub blocking device to block the nozzle stub at the inner position in relation to a work position when seen from the reactor vessel inside the nozzle stub before the work inside the nozzle stub using the working device.

In this case, it is possible to block the nozzle stub at the inner position in relation to the work position when seen from the reactor vessel inside the nozzle stub by driving the nozzle stub blocking device under the control of the control device before the work is performed inside the nozzle stub using the working device. For this reason, it is possible to reliably prevent foreign matter from intruding into the nozzle stub when performing the work using the working device.

The nozzle stub working system for the reactor vessel may further include: a gap closing device that closes a gap between the access window and the nozzle stub. The control device may drive the gap closing device to close a gap between the access window and the nozzle stub before or immediately after driving the access window moving device to open the access window.

In this configuration, the gap closing device is driven to close the gap between the access window and the nozzle stub before or immediately after the access window moving device is driven to open the access window under the control of the control device. Accordingly, it is possible to reliably prevent foreign matter from intruding between the reactor vessel and the platform unit when the work is performed by advancing the working device into the nozzle stub.

The working device may include: an inspecting unit that inspects the inner surface of the nozzle stub, and a constructing unit that performs an inner surface construction at the inner surface of the nozzle stub. The control device may allow the inspecting unit to inspect the inner surface of the nozzle stub and allow the constructing unit to perform the inner surface construction at the inner surface of the nozzle stub on the basis of the inspection result of the inspecting unit.

In this case, it is possible to automatically perform the inner surface construction at a necessary position in the inner surface of the nozzle stub using the constructing unit on the basis of the inspection result using the inspecting unit under the control of the control device.

The constructing unit may include a cutting unit that cuts the inner surface of the nozzle stub. The control device may drive the cutting unit to cut the inner surface of the nozzle stub in an area that is determined as a defective position on the basis of the inspection result using the inspecting unit.

In this case, it is possible to automatically cut and remove the defective position in the inner surface of the nozzle stub using the cutting unit on the basis of the inspection result using the inspecting unit under the control of the control device.

The control device may allow the inspecting unit to inspect the area cut by the cutting unit after the cutting is performed by the cutting unit. The control device may drive the cutting unit again to perform cutting when a defective position is found on the basis of the inspection result using the inspecting unit.

In this case, it is possible to automatically detect the defective position that may not be completely removed by the cutting using the cutting unit by inspecting the cut area using the inspecting unit after the cutting of the cutting unit and cut and remove the defective position again using the cutting unit under the control of the control device.

The constructing unit may further include a welding unit that welds the inner surface of the nozzle stub. The control device may drive the welding unit to perform welding on the area cut by the cutting unit.

In this case, it is possible to automatically maintain the defective position by welding the area cut by the cutting unit using the welding unit under the control of the control device.

The constructing unit may further include a finish processing unit that performs finish processing on the inner surface of the nozzle stub. The control device may drive the finish processing unit to perform finish processing on the area welded by the welding unit.

In this case, it is possible to finish the automatically maintained position by performing finish processing on the area welded by the welding unit using the cutting unit under the control of the control device.

The control device may allow the inspecting unit to inspect the area welded by the welding unit, and retract the working device inside the platform unit to close the access window using the access window moving device when a construction is determined to be satisfactory in all areas on the basis of the inspection result using the inspecting unit.

In this case, it is possible to automatically determine whether a defective position is generated due to the welding using the welding unit by inspecting the area welded by the welding unit using the inspecting unit under the control of the control device. Then, when the control device determines that a satisfactory construction is performed on all areas on the basis of the inspection result using the inspecting unit, the working device is retracted into the platform unit and the access window moving device closes the access window under the control of the control device. Accordingly, it is possible to return the inside of the reactor vessel to the underwater environment again while the nozzle stub is appropriately maintained.

The control device may drive the cutting unit again to perform cutting on the area determined as a defective construction.

In this case, when the cutting unit is driven again to perform cutting on the area determined as a defective construction on the basis of the inspection result of the inspecting unit under the control of the control device, it is possible to remove a defect caused by the defective construction.

Advantageous Effects of Invention

According to the nozzle stub working system for the reactor vessel of the present invention, it is possible to shorten a work period and reduce cost while suppressing a radiation exposure dose of a workman as much as possible.

DESCRIPTION OF EMBODIMENTS

Figure 1:
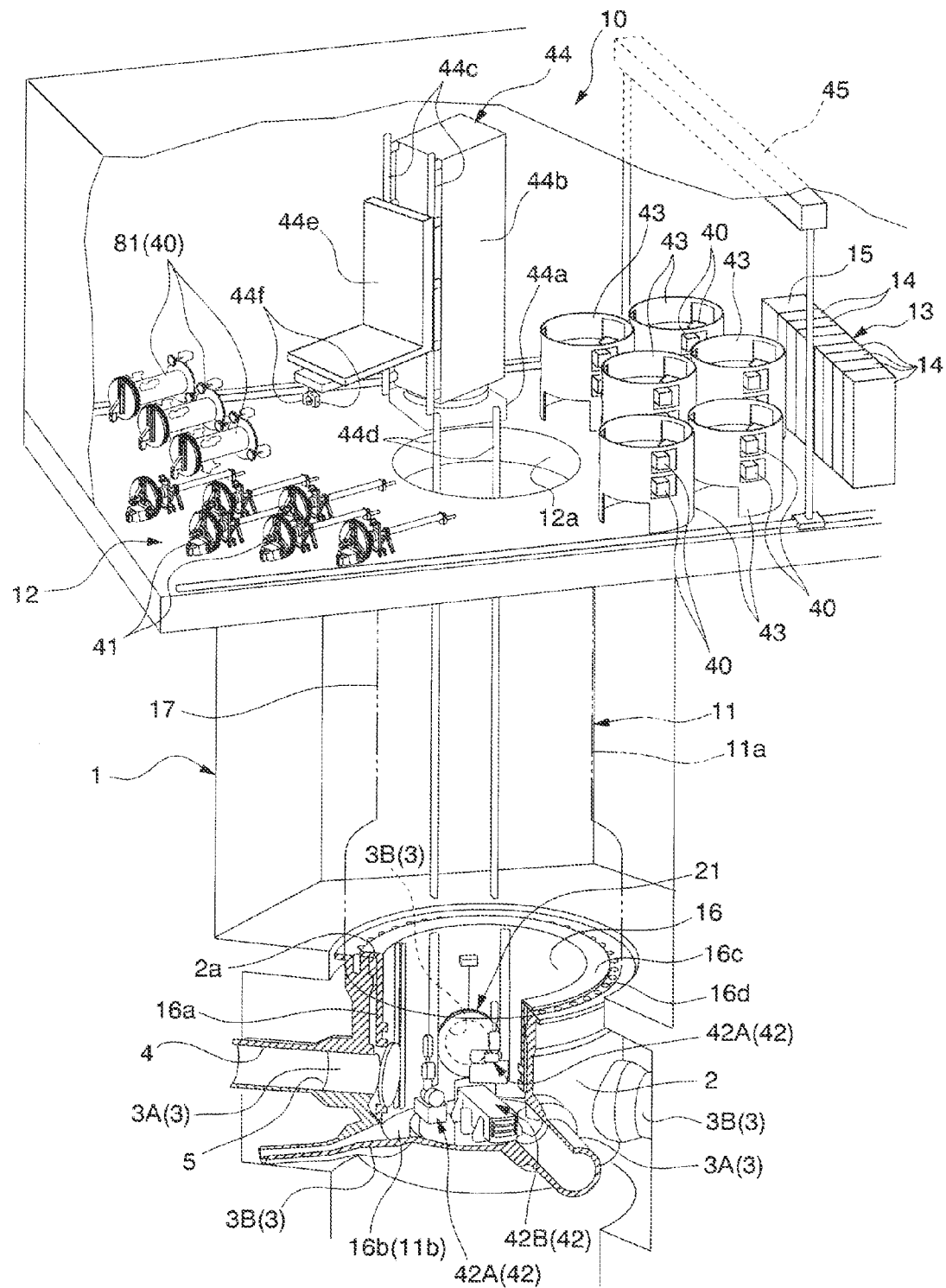
FIG. 1 is a partially cut-away entire perspective view illustrating an outline of a nozzle stub working system according to an embodiment of the present invention.
Figure 2:
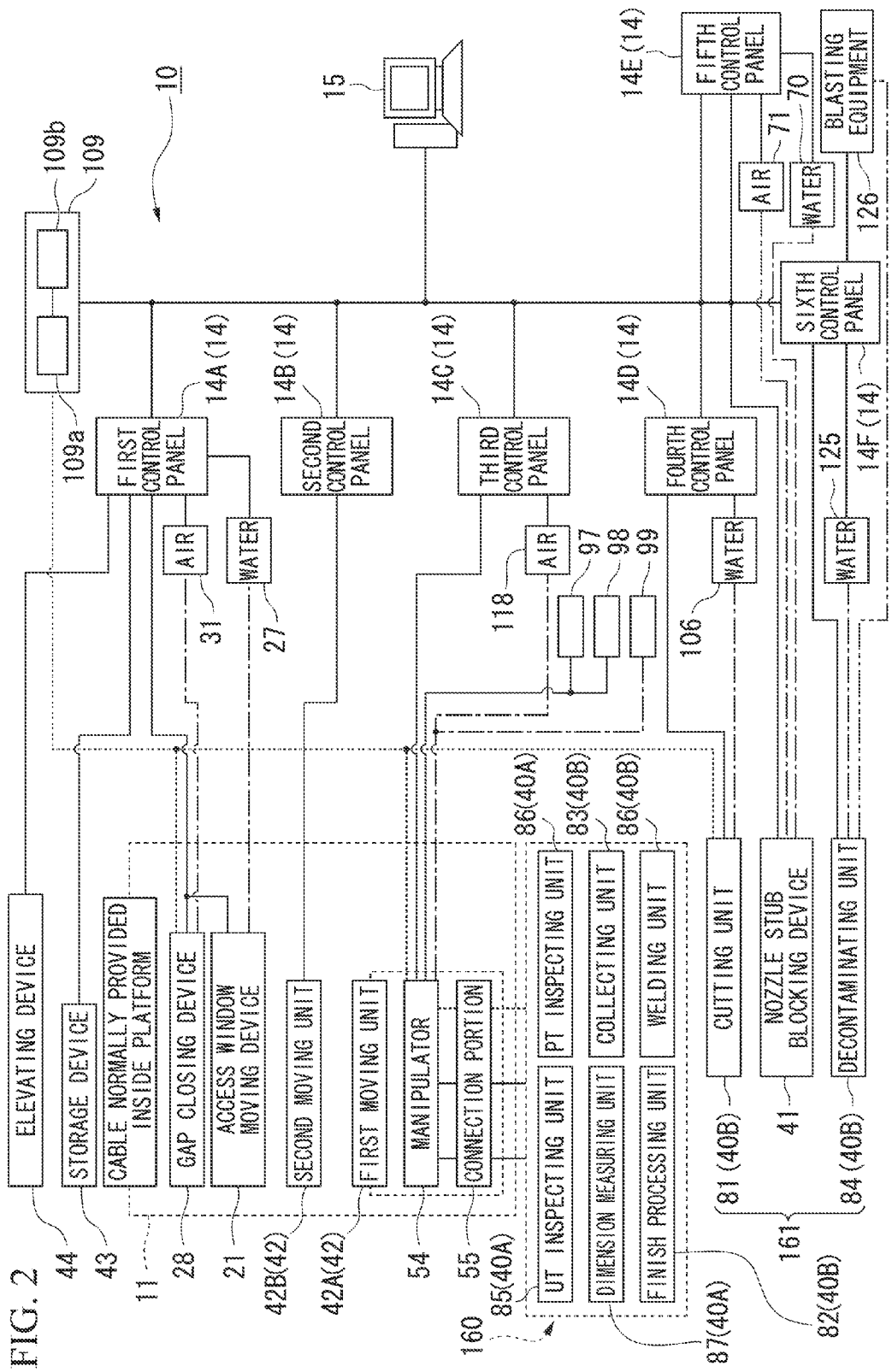
FIG. 2 is a block diagram specifically illustrating a configuration of the nozzle stub working system according to the embodiment of the present invention.

Hereinafter, an embodiment according to the invention will be described with reference to the drawings. FIG. 1 is an entire view illustrating an outline of a nozzle stub working system performing nozzle stub work in a reactor vessel. Further, FIG. 2 is a block diagram illustrating a configuration of the nozzle stub working system. FIG. 1 illustrates a reactor vessel 2 of which the upper portion is opened by separating an upper cover as an upper structure and a reactor core as an inner structure therefrom inside a nuclear reactor 1. As shown in FIG. 1, the reactor vessel 2 is provided with at least a pair of an inlet nozzle stub 3A and an outlet nozzle stub 3B as a nozzle stub 3. In the embodiment, three pairs of the inlet nozzle stubs 3A and the outlet nozzle stubs 3B are provided. Cooling water may be introduced from the inlet nozzle stub 3A of each pair, and may be discharged from the outlet nozzle stub 3B of each pair.

As shown in FIG. 1, a nozzle stub working system 10 of the embodiment includes: a bottomed cylindrical platform unit 11 that extends upward while the lower end side thereof is inserted from an upper opening 2a of the reactor vessel 2, a working floor 12 that is provided above the reactor vessel 2, and a control device 13 that is installed on the working floor 12 outside the reactor vessel 2 and controls the respective constituents. As shown in FIG. 2, the control device 13 includes a plurality of control panels 14 that electrically controls the respective constituents and a supervising computer 15 to which operation information of the respective constituents is input from the control panels 14 and which outputs an operation command for controlling the operation of the respective constituents to the control panels 14. In the embodiment, first to sixth control panels 14A to 14F are provided as the control panels 14. The first control panel 14A controls an elevating device 44, a storage device 43, an access window moving device 21, and a gap closing device 28. The second control panel 14B controls a second moving unit 42B. The third control panel 14C controls a first working unit 160 in a first moving unit 42A and a working device 40. The fourth control panel 14D controls a cutting unit 81. The fifth control panel 14E controls a nozzle stub blocking device 41. The sixth control panel 14F controls a decontaminating unit 84. Furthermore, the respective constituents as the control subjects of the control panels 14 will be specifically described later. Further, the configuration of the control panels 14 is not limited thereto, and the control panel may be further segmented or may be one control panel 14. Further, even as the supervising computer 15, the process thereof may be performed by correlating a plurality of computers with each other.

As shown in FIG. 1, the platform unit 11 includes a platform 16 that is disposed inside the reactor vessel 2 and a substantially cylindrical connection pipe line 17 that is connected to the platform 16 and is disposed along the perpendicular direction above the reactor vessel 2. The platform 16 includes a substantially cylindrical side wall 16a that has an outer diameter smaller than the inner diameter of the reactor vessel 2, a bottom plate 16b that blocks the lower end of the side wall 16a, and a flange 16c that protrudes toward the outer periphery from the upper end of the side wall 16a and is supported by the upper edge of the reactor vessel 2. Then, the platform 16 is fixed to the reactor vessel 2 by using a fixing hole 16d formed at the flange 16c. The lower end of the connection pipe line 17 is fixed to the flange 16c of the platform 16. A side wall portion 11a of the platform unit 11 is formed by the side wall 16a of the platform 16 and the connection pipe line 17. A bottom portion 11b of the platform unit 11 is formed by a bottom plate 16b of the platform 16. The upper end of the connection pipe line 17 communicates with a communication hole 12a that is formed at a position corresponding to the upper portion of the reactor vessel 2 in the working floor 12. For this reason, an access to the inside of the platform unit 11 may be performed through the communication hole 12a from the position on the working floor 12. Furthermore, sealings are respectively provided between the flange 16c of the platform 16 and the upper end of the reactor vessel 2 and between the flange 16c of the platform 16 and the lower end of the connection pipe line 17. Accordingly, as shown in FIG. 1, even when the drainage is performed so that the water level of the inside of the reactor vessel 2 is lower than that of the nozzle stub 3, the cooling water filled around the connection pipe line 17 at the upper portion of the reactor vessel 2 does not leak into the reactor vessel 2 and the platform unit 11.

Figure 3:
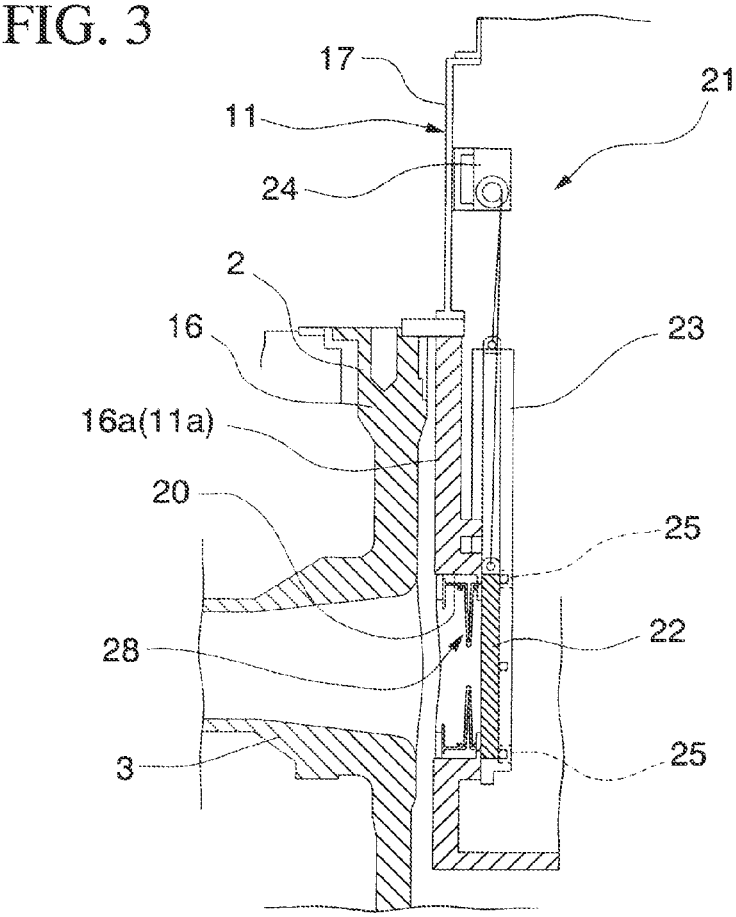
FIG. 3 is a cross-sectional view specifically illustrating an access window moving device in the nozzle stub working system according to the embodiment of the present invention.
Figure 4:
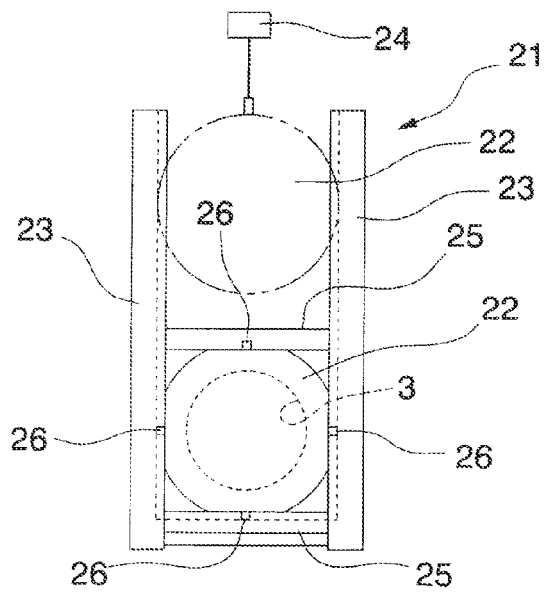
FIG. 4 is a front view specifically illustrating the access window moving device in the nozzle stub working system according to the embodiment of the present invention.

Here, in the platform unit 11, the side wall 16a of the platform 16 is provided with access windows 20 making the inside of the platform unit 11 communicate with each nozzle stub 3 and an access window moving device 21 opening and closing the access windows 20. As shown in FIGS. 2 to 4, the access window moving device 21 includes a substantially plate-shaped cover 22, a pair of guide rails 23, and an electric winch 24. The cover 22 is provided at each access window 20 in the inner peripheral surface of the side wall 16a. The pair of guide rails 23 guides the cover 22 up and down with the cover 22 interposed between the inner peripheral surface of the side wall 16a and the guide rail. The electric winch 24 is an elevating unit provided above the access window 20 and moving the cover 22 up and down along the guide rails 23. A driving motor (not shown) of the electric winch 24 is connected to the first control panel 14A. The driving motor is driven by the control using the first control panel 14A, and may move the cover 22 up and down. Further, the upper and lower portions of the access window 20 are provided with a pair of support members 25 provided across a pair of guide rails 23.

Figure 5:
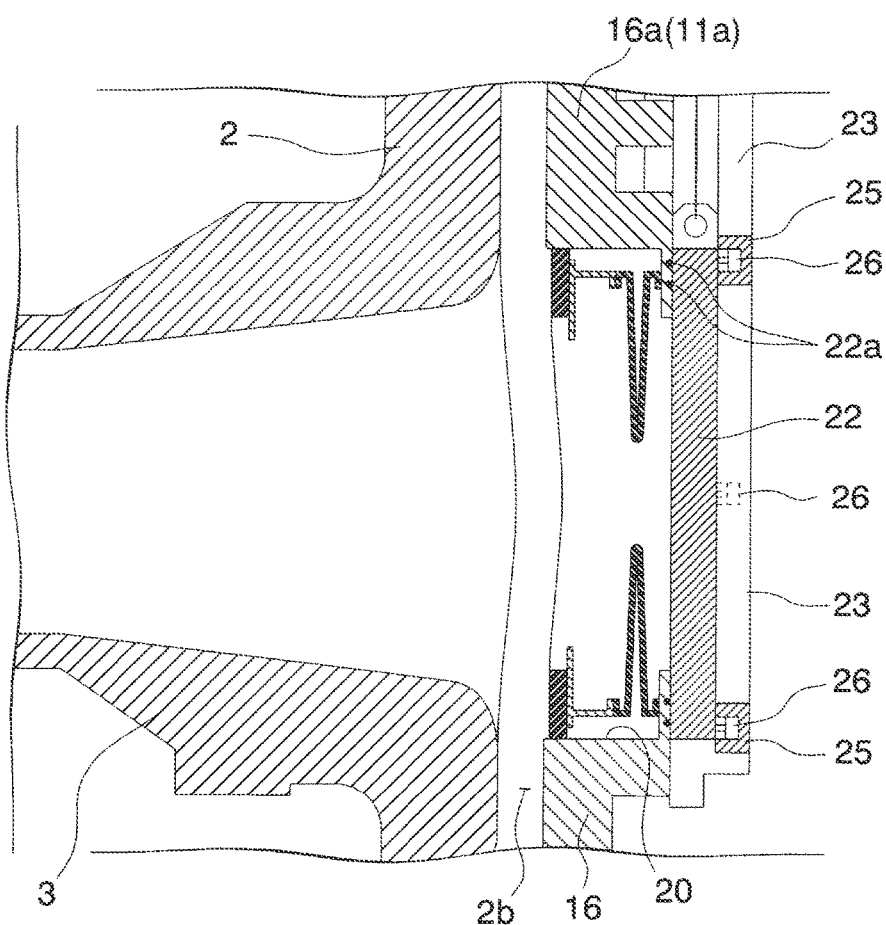
FIG. 5 is a cross-sectional view specifically illustrating a cover portion of the access window moving device in the nozzle stub working system according to the embodiment of the present invention.
Figure 6:
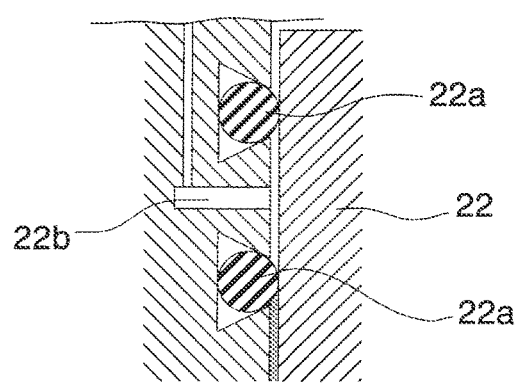
FIG. 6 is a cross-sectional view specifically illustrating a seal portion of the access window moving device in the nozzle stub working system according to the embodiment of the present invention.

As shown in FIG. 5, the surfaces of the pair of guide rails 23 and the pair of support members 25 facing the side wall 16a are provided with a hydraulic cylinder 26 that is movable in a reciprocating manner toward the cover 22 disposed to close the access window 20. The hydraulic cylinder 26 is provided on the working floor 12 through a pipe (not shown) and is connected to an operating water supply device 27 (refer to FIG. 2) connected to the first control panel 14A. For this reason, when a hydraulic, pressure is applied to the hydraulic cylinder 26 by supplying operating water thereto using the operating water supply device 27 under the control of the first control panel 14A, it is possible to press the cover 22 toward the side wall 16a at four positions of the up, down, left, and right positions. Further, as shown in FIG. 6, O-rings 22a are doubly disposed around the access window 20 in the side wall 16a of the platform 16. For this reason, the O-rings 22a are elastically deformed in a manner such that the hydraulic cylinder 26 presses the cover 22 toward the side wall 16a. Accordingly, even when the outside of the platform 16 is under water, it is possible to prevent the intrusion of water through the access window 20. Furthermore, a leakage detecting port 22b is formed between the double O-rings 22a inside the side wall 16a, and a liquid level sensor (not shown) may detect whether water intrudes into the leakage detecting port 22b. The detection result of the liquid level sensor is connected to the supervising computer 15 by the first control panel 14A through a communication line (not shown). Accordingly, when the intrusion of the water is detected, the work may be promptly stopped.

Figure 7:
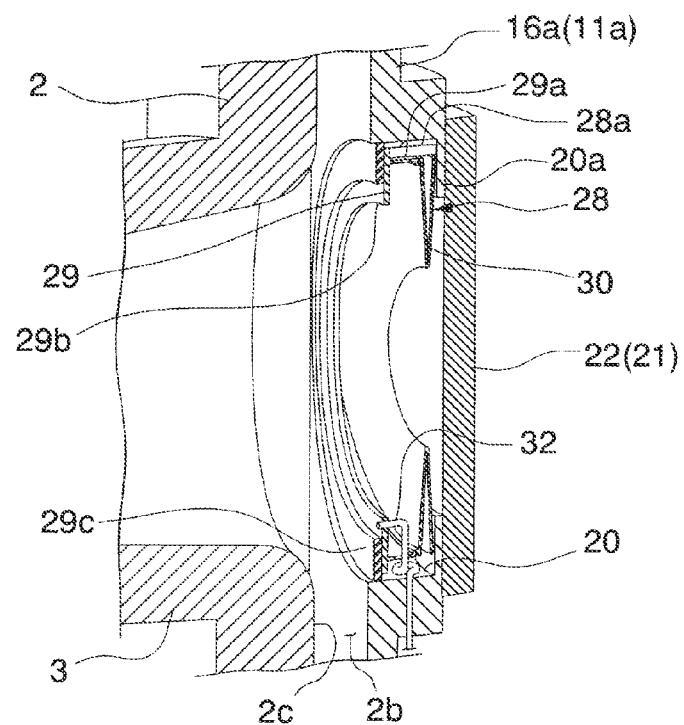
FIG. 7 is a cross-sectional view illustrating a receiving state of a gap closing device in the nozzle stub working system according to the embodiment of the present invention.
Figure 8:
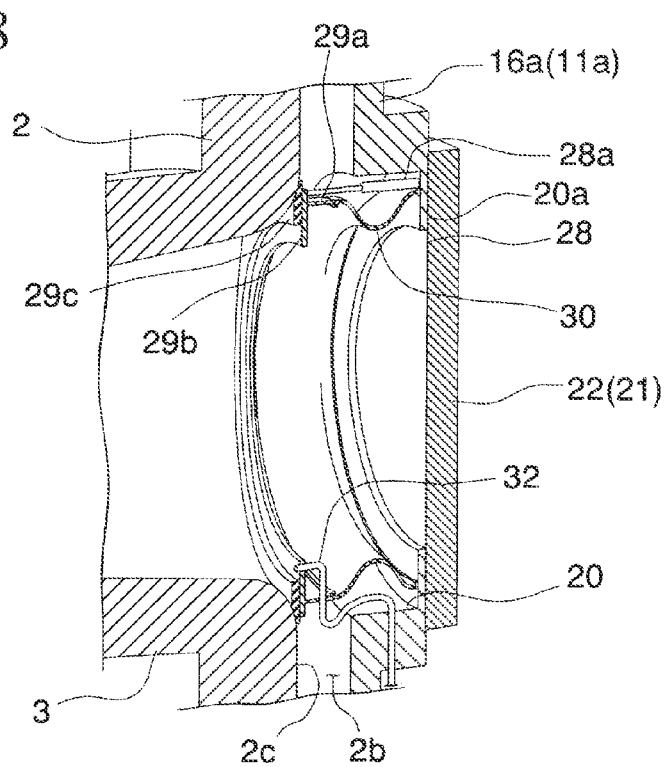
FIG. 8 is a cross-sectional view illustrating a state where a gap is closed by the gap closing device in the nozzle stub working system according to the embodiment of the present invention.

As shown in FIGS. 7 and 8, the inner peripheral surface of each access window 20 is provided with the gap closing device 28 that closes a gap 2b between the access window 20 and the nozzle stub 3. The gap closing device 28 is formed of a rigid member such as a substantially annular metal. The gap closing device 28 includes a protection ring 29 that is movable in a reciprocating manner toward the inner surface of the reactor vessel 2 while being received inside the access window 20 and an expanding and contracting member 30 that is provided between a flange portion 20a protruding from the inner peripheral surface of the access window 20 and the protection ring 29 and is formed of a substantially cylindrical flexible material. The protection ring 29 is formed to have a substantially T-shaped cross-section by a body 29a burying the gap 2b between the access window 20 and the reactor vessel 2 and a contact portion 29b provided at the outer periphery of the body 29a to come into contact with the inner peripheral surface of the reactor vessel 2. In the contact portion 29b, the side facing the inner peripheral surface 2c of the reactor vessel 2 is provided with a seal material 29c that is elastically deformable. Accordingly, the seal material 29c may adhere to the inner peripheral surface 2c of the reactor vessel 2.

The expanding and contracting member 30 has a sufficient length with respect to a length in which the protection ring 29 received in the access window 20 comes into contact with the inner peripheral surface 2c of the reactor vessel 2. Then, a plurality of pneumatic cylinders 28a is provided between the expanding and contracting member 30 and the inner peripheral surface 2c of the access window 20 at an interval in the circumferential direction. The pneumatic cylinders 28a are provided on the working floor 12 through a pipe (not shown) and are connected to a compressed air supply device 31 (refer to FIG. 2) connected to the first control panel 14A. For this reason, when a pneumatic pressure is applied to the pneumatic cylinders 28a by supplying compressed air thereto using the compressed air supply device 31 under the control of the second control panel 14B, it is possible to advance the protection ring 29 at a plurality of positions toward the inner peripheral surface 2c of the reactor vessel 2 to be pressed. Furthermore, the lower end of the protection ring 29 of each gap closing device 28 is provided with a collecting port 32. The collecting port 32 is opened from a position near the inner peripheral surface 2c of the reactor vessel 2 in the protection ring 29, and is connected to collecting equipment 109 to be described later on the working floor 12 through the inside of the side wall 16a of the platform 16. Accordingly, the collecting port 32 may suction and collect water or the like accumulated around the opening of the nozzle stub 3.

As shown in FIG. 1, the nozzle stub working system 10 includes the working device 40, the nozzle stub blocking device 41, a moving device 42, the storage device 43, the elevating device 44, and a portal crane 45. The working device 40 performs various works relating to the nozzle stub. The nozzle stub blocking device 41 blocks the nozzle stub 3 inside the nozzle stub 3. The moving device 42 is provided inside the platform unit 11, and moves the working device 40 or the nozzle stub blocking device 41. The storage device 43 receives each working device 40. The elevating device 44 elevates the devices through the communication hole 12a from the working floor 12 inside the platform unit 11. The portal crane 45 moves the respective devices on the working floor 12. The portal crane 45 is configured to travel over the communication hole 12a. Accordingly, it is possible to move equipment between the area near the communication hole 12a and the area away from the communication hole 12a by using the portal crane 45.

Further, the elevating device 44 includes a support table 44a, a frame 44b, a pair of a first rail 44c and a second rail 44d, a body 44e, and a pair of grip portions 44f. The support table 44a is configured to travel on the working floor 12. The frame 44b is provided on the support table 44a to be rotatable about the perpendicular axis. The pair of first rail 44c and the second rail 44d is respectively disposed at the frame 44b and the inner peripheral surface of the platform unit 11 to be substantially perpendicular thereto. The body 44e may travel up and down on the first rail 44c and the second rail 44d. The pair of grip portions 44f is configured to be movable close to or away from the body 44e, and grips the working device 40 and the storage device 43. The support table 44a is provided with a travel driving section and a rotational driving section (not shown) connected to the first control panel 14A. Then, the travel driving section may make the support table 44a travel on the working floor 12 under the control of the first control panel 14A. Further, the rotational driving section may rotate the frame 44b and the first rail 44c about the perpendicular axis. Further, the body 44e is provided with an elevation driving section (not shown) connected to the first control panel 14A, and may travel on the first rail 44c or the second rail 44d in the perpendicular direction by the elevation driving section under the control of the first control panel 14A. Further, the body 44e is provided with a grip driving section (not shown) connected to the first control panel 14A. Then, when the grip driving section moves the pair of grip portions 44f to be close to each other under the control of the first control panel 14A, the working device 40 and the storage device 43 may be gripped.

Figure 9:
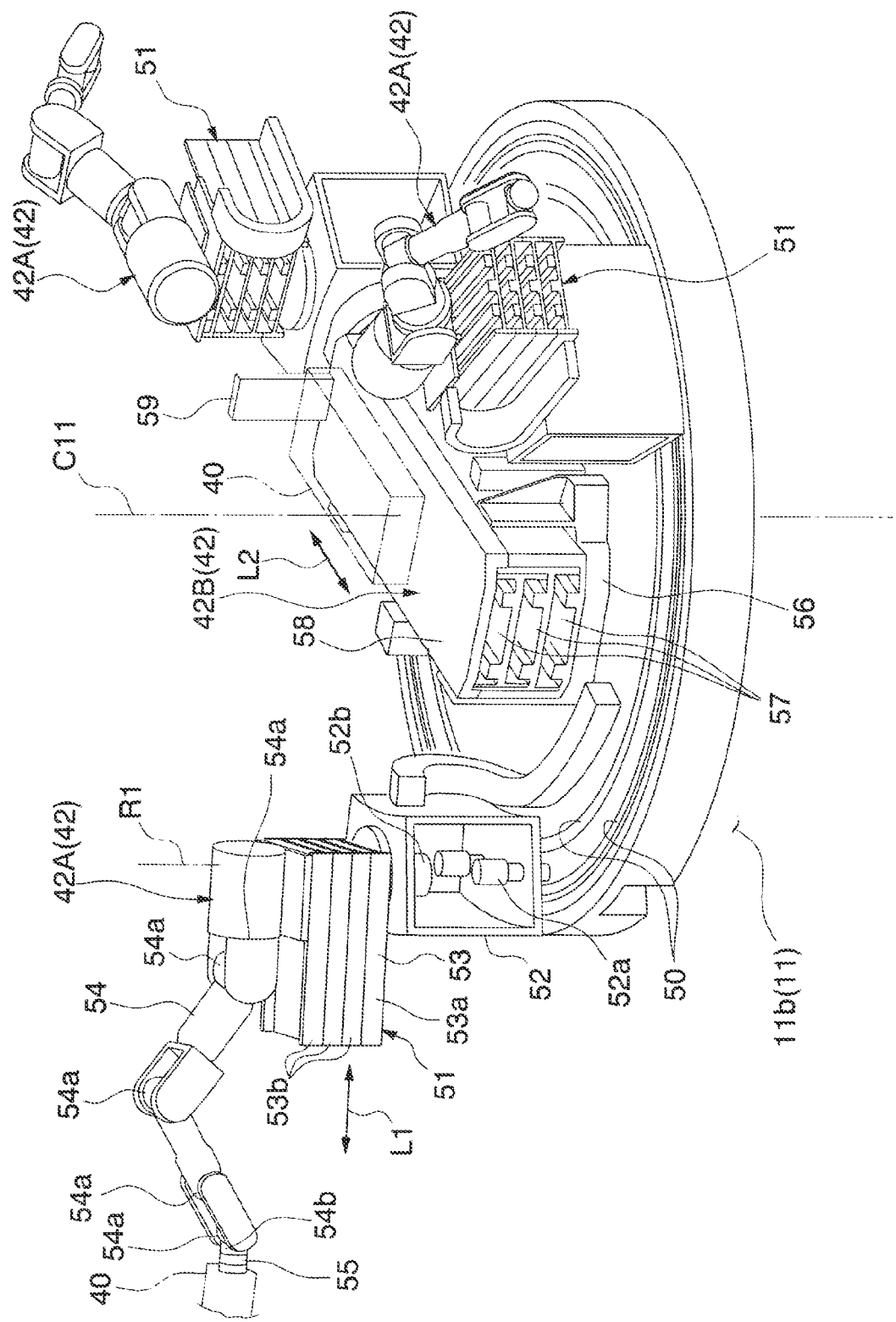
FIG. 9 is a perspective view specifically illustrating a moving device in the nozzle stub working system according to the embodiment of the present invention.

As shown in FIG. 9, as the moving device 42, there are provided a first moving unit 42A rotatable about a plurality of axes and a second moving unit 42B capable of moving the working device 40 or the nozzle stub blocking device 41 in a sliding manner. The first moving unit 42A includes a guide rail 50 that is formed in a circular-arc shape at the outer periphery on the bottom portion 11b of the platform unit 11 and a unit body 51 that is movable about the central axis C11 of the platform unit 11 in the circumferential direction along the guide rail 50. In the embodiment, the surface of the guide rail 50 is provided with three unit bodies 51 corresponding to the number of the pairs of the inlet nozzle stub 3A and the outlet nozzle stub 3B constituting the nozzle stub 3.

The unit body 51 includes a first support body 52, a second support body 53, a manipulator 54, and a connection portion 55. The first support body 52 is movable along the guide rail 50. The second support body 53 is rotatable about the first rotary axis R1 substantially parallel to the central axis C11 of the platform unit 11 on the first support body 52. The manipulator 54 is provided on the second support body 53. The connection portion 55 is provided at the front end of the manipulator 54, and is used for the attachment or detachment of the working device 40. The first support body 52 is provided with a travel driving section 52*a* that travels along the guide rail 50 and a first rotational driving section 52*b* that rotates the second support body 53 about the first rotary axis R1 with respect to the first support body 52. Further, the second support body 53 includes a lower plate 53*a*, an upper plate 53*b*, and a slide driving section (not shown). The second support body 53 is attached to the first support body 52 to be rotatable about the first rotary axis R1. The upper plate 53*b* is configured to be slidable in the slide direction L1 perpendicular to the first rotary axis R1 on the lower plate 53*a*. The slide driving section is provided between the upper plate 53*b* and the lower plate 53*a*, and is used to slide the upper plate 53*b* with respect to the lower plate 53*a*.

The manipulator 54 is configured as a multi-joint structure having a plurality of joints 54*a*. Accordingly, the manipulator is rotatable about three axes, that is, the axis parallel to the slide direction L1 and two axes perpendicular thereto. Furthermore, although it is not shown in the drawings, each joint 54*a* is provided with a rotational driving section that rotates the front end side joint 54*a*. Accordingly, the connection portion 55 provided at the front end 54*b* of the manipulator 54 and the working device 40 attached to the connection portion 55 may be rotated about an arbitrary axis. Further, although it is not shown in the drawings, each driving section is provided with a position sensor such as an encoder that detects the moving state of each driving section. The detection result detected from the position sensor is input as a position detection signal to the third control panel 14C. For this reason, the third control panel 14C outputs a control signal to each driving section on the basis of the command from the supervising computer 15, so that the first moving unit 42A is operated by the driving of the driving section. Accordingly, a feed back control is performed on the basis of the detection signal input from the position sensor, thereby performing the accurate position control.

Figure 10:
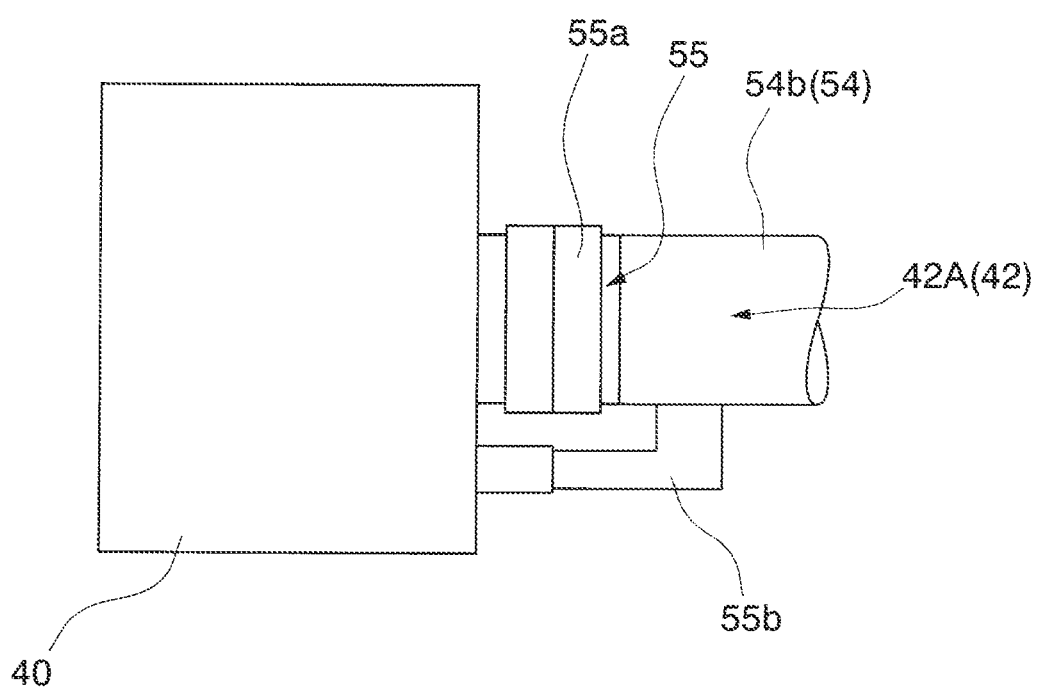
FIG. 10 is a side view specifically illustrating a front end portion of a first moving unit in the nozzle stub working system according to the embodiment of the present invention.

Here, as shown in FIG. 10, a subject connection portion is provided at a part of the working device 40 to correspond to the connection portion 55 of the first moving unit 42A, so that a tool changer is configured to perform the attachment and the detachment between the connection portion 55 and the subject connection portion. The connection portion 55 and the subject connection portion respectively include a connection body 55*a* and a subject connection body that are used to strongly connect them each other, and a wiring-piping connector 55*b* and a connector receiving portion that are used to connect wirings and pipes (not shown) disposed near the manipulator 54 and the working device 40 to each other. As the wirings and the pipes built in the manipulator 54, there are provided wirings that electrically connect the working device 40 and the devices on the working floor 12 to each other or various pipes that are used to supply operating water or compressed air from the operating water supply device or the compressed air supply device on the working floor 12 or perform a suction from the working device 40 while being connected to the collecting equipment 109. For this reason, the working device 40 connected to the connection portion 55 is selectively connected to the wirings and pipes disposed inside the manipulator 54 in accordance with the type of work to be performed by the working device 40. Then, the working device 40 receives power supplied from the third control panel 14C through the wiring-piping connector 55*b*, and is operated by a necessary control signal transmitted therefrom. Further, the working device 40 may output the detection result as a detection signal to the third control panel 14C through the wiring-piping connector 55*b*.

Furthermore, the working device 40 is operated by the operating water or the compressed air supplied from the operating water supply device or the compressed air supply device. Alternatively, the working device 40 may supply water or air into the nozzle stub 3. Further, the working device 40 may perform a suction operation by the negative pressure exerted from the collecting equipment 109. This will be described in detail in the description of each working device 40.

Further, as shown in FIG. 9, the second moving unit 42B includes a base 56, a plurality of stages of slide plates 57, a support plate 58, and a pressing member 59. The base 56 is provided near the inner periphery of the guide rail 50 of the first moving unit 42A on the bottom portion 11*b* of the platform unit 11 to be rotatable about the central axis C11 of the platform unit 11. The plurality of stages of slide plates 57 is provided on the base 56 to be slidable along the slide direction L2 perpendicular to the central axis C11 of the platform unit 11. The support plate 58 is provided on the uppermost stage of the slide plate 57 to be slidable along the slide direction L2, and the working device 40 may be placed thereon. The pressing member 59 is provided to protrude from the base end of the support plate 58, and is movable forward and backward toward the front end. Although it is not shown in the drawings, the base 56 is provided with a rotational driving section rotating about the central axis C11 of the platform unit 11 and a slide driving section sequentially sliding the plurality of slide plates 57, the support plate 58, and the pressing member 59 in the slide direction L2. Accordingly, the working device 40 placed on the support plate 58 may be moved in the slide direction L2. Furthermore, as in the first moving unit 42A, although it is not shown in the drawings, each driving section is provided with a position sensor that detects the moving state of each driving section. The detection result detected at the position sensor is input as a position detection signal to the second control panel 14B. For this reason, the second control panel 14B outputs a control signal to each driving section on the basis of the command from the supervising computer 15, and operates the second moving unit 42B by driving each driving section. Accordingly, a feed back control is performed on the basis of the position detection signal input from the position sensor, thereby performing the accurate position control.

Figure 11:
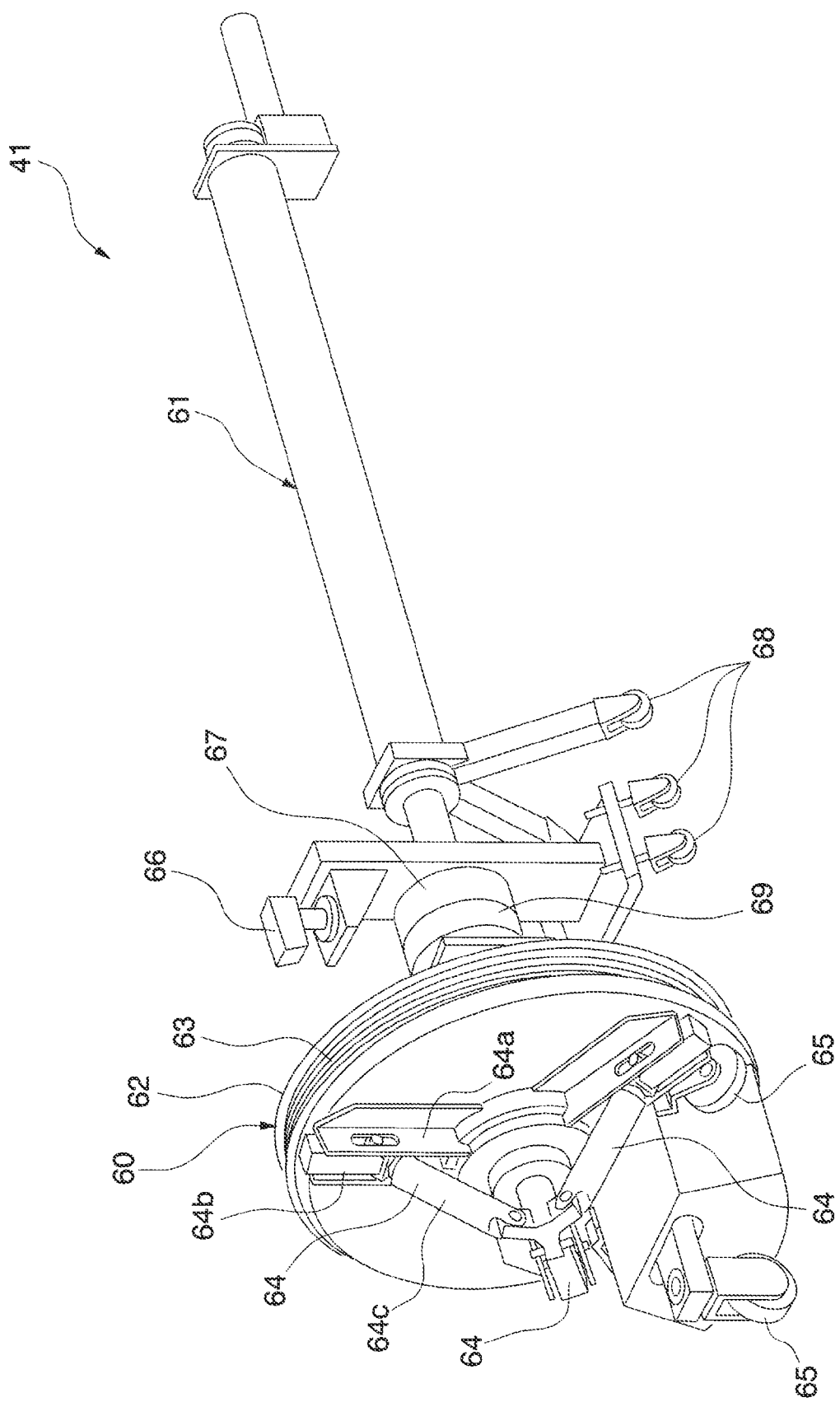
FIG. 11 is a perspective view specifically illustrating a nozzle stub blocking device in the nozzle stub working system according to the embodiment of the present invention.

Next, the nozzle stub blocking device 41 will be described. As shown in FIG. 11, the nozzle stub blocking device 41 includes a seal body 60 that blocks the inside of the nozzle stub 3 and a guide portion 61 that is separably connected to the seal body 60. The seal body 60 includes a substantially disk-shaped seal plug 62, an inflatable seal 63, a fixing jack 64, and a caster 65. The outer diameter of the substantially disk-shaped seal plug 62 is set to be smaller than the inner diameter of the nozzle stub 3. The inflatable seal 63 is fitted into the outer peripheral surface of the seal plug 62. A plurality of the fixing jacks 64 is radially provided in the seal plug 62, and is movable in a reciprocating manner toward the outer periphery in the radial direction. The caster 65 travels on the inner surface of the nozzle stub 3. Each fixing jack 64 includes a guide 64*a*, a contact portion 64*b*, and a hydraulic cylinder 64*c*. The guide 64*a* is disposed toward the outer periphery in the radial direction from the central position of the seal plug 62. The contact portion 64*b* is movable in a reciprocating manner along the guide 64*a*, and comes into contact with the inner surface of the nozzle stub 3. The hydraulic cylinder 64*c* may be expanded and contracted from the central position of the seal plug 62 toward the outer periphery in the radial direction, and the contact portion 64b is attached to the front end of the rod. For this reason, the fixing jack 64 may expand and contract the hydraulic cylinder 64c so that the contact portion 64b advances toward the outer periphery in the radial direction along the guide 64a to come into contact with the inner surface of the nozzle stub 3 located at the outer periphery of the seal plug 62. The seal plug 62 may be fixed to the inner surface of the nozzle stub 3 by using the plurality of fixing jacks 64. The inflatable seal 63 has a space between the inflatable seal and the outer peripheral surface of the seal plug 62, and is expanded toward the outer periphery by supplying compressed air thereinto. Accordingly, it is possible to seal a gap between the seal plug 62 disposed inside the nozzle stub 3 and the inner surface of the nozzle stub 3.

The guide portion 61 is a substantially bar-shaped member that may be inserted into the nozzle stub 3, and includes an imaging unit 66 for monitoring the front end, a connection portion 67 provided at the front end and having the same configuration as that of the connection portion 55 of the first moving unit 42A, and a caster 68 used for the traveling action on the inner surface of the nozzle stub 3. The seal body 60 is provided with a subject connection portion 69 corresponding to the connection portion 67 of the guide portion 61, so that a tool changer is configured to perform the attachment and the detachment between the connection portion 67 and the subject connection portion 69. The connection portion 67 and the subject connection portion 69 may be strongly held to each other. These function as a wiring-piping connectors connecting wirings and pipes (not shown) respectively disposed inside the seal plug 62 and the guide portion 61. Specifically, a pipe supplying operating water to the hydraulic cylinder 64c of the fixing jack 64 and a pipe supplying compressed air to the inflatable seal 63 are provided inside the seal body 60 and the guide portion 61 to be connectable to each other through the connection portion 67 and the subject connection portion 69. Further, a wiring serving as a communication line is disposed inside the guide portion 61 to transmit a control signal driving the imaging unit 66 and imaging data output from the imaging unit 66 to the fifth control panel 14E.

For this reason, as shown in FIG. 2, the operating water supply device 70 connected to the fifth control panel 14E may be driven so that the seal plug 62 is fixed to the inner surface of the nozzle stub 3 using the fixing jack 64 under the control of the fifth control panel 14E. Also, the compressed air supply device 71 connected to the fifth control panel 14E may be driven in this state so that the inflatable seal 63 is expanded to seal a gap between the seal plug 62 and the inner surface of the nozzle stub 3. Then, when the connection portion 67 provided at the front end of the guide portion 61 is separated from the subject connection portion 69 provided at the seal body 60 in this state, the seal body 60 may seal the inside of the nozzle stub 3.

Next, the working device 40 will be described. As shown in FIGS. 1 and 2, in the embodiment, as the working device 40, there are provided an inspecting unit 40A inspecting the inner surface of the nozzle stub 3 and a constructing unit 40B performing an inner surface construction inside the nozzle stub 3. More specifically, the constructing unit 40B includes a welding unit 80, a cutting unit 81, a finish processing unit 82, a collecting unit 83, and a decontaminating unit 84. The welding unit 80 performs welding on the inner surface of the nozzle stub 3. The cutting unit 81 performs cutting on the inner surface of the nozzle stub 3. The finish processing unit 82 performs finish processing on the inner surface of the nozzle stub 3. The collecting unit 83 collects processing chips present inside the nozzle stub 3. The decontaminating unit 84 cleans the inner surface of the nozzle stub 3. The inspecting unit 40A includes a UT inspecting unit 85, a PT inspecting unit 86, and a dimension measuring unit 87. The UT inspecting unit 85 performs an ultrasonic test on the welding portion 5 of the inner surface of the nozzle stub 3. The PT inspecting unit 86 performs a penetration test. The dimension measuring unit 87 measures a dimension of a subject.

Figure 12:
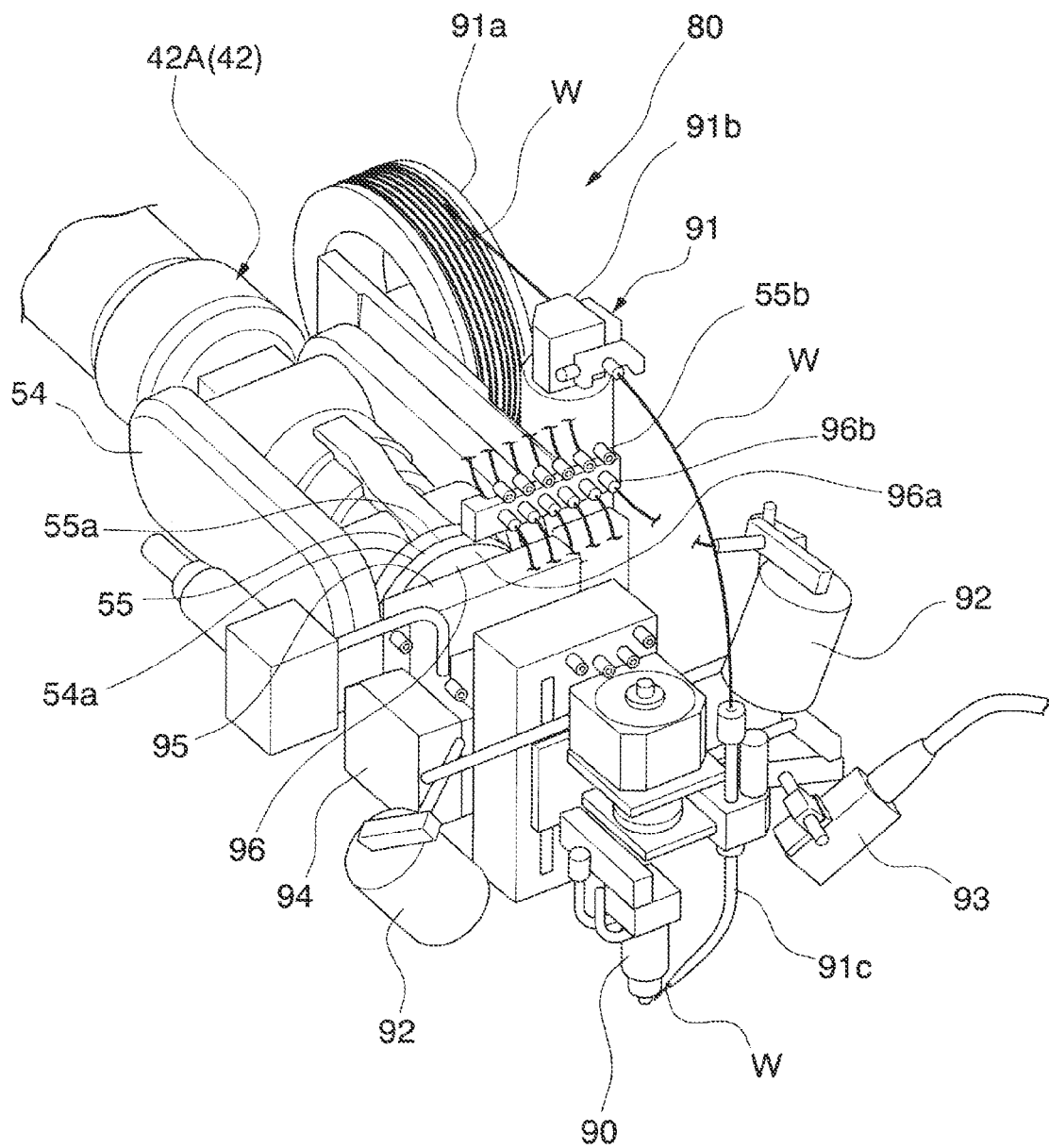
FIG. 12 is a perspective view specifically illustrating a welding unit in the nozzle stub working system according to the embodiment of the present invention.

As shown in FIG. 12, the welding unit 80 includes a welding torch 90, a welding material supply unit 91, an illumination unit 92, an imaging unit 93, a position sensor 94, a support member 95, and a subject connection portion 96. The welding torch 90 performs arc discharge. The a welding material supply unit 91 supplies a wire W as a welding material to the front end of the welding torch 90. The an illumination unit 92 illuminates the front end of the welding torch 90. The an imaging unit 93 images the front end of the welding torch 90. The position sensor 94 detects the relative position with respect to the nozzle stub 3. The support member 95 supports the position sensor 94 and the like. The subject connection portion 96 is attached to the support member 95, and is connected to the connection portion 55 of the first moving unit 42A. The a welding material supply unit 91 includes a wire reel 91a on which the wire W as the welding material is wound, a supply portion 91b that supplies the wire W wound on the wire reel 91a, and a guide portion 91c that guides the wire W supplied by the supply portion 91b to the front end of the welding torch 90. The supply portion 91b includes, for example, a pair of rollers that interposes the wire W supplied from the wire reel 91a and a roller rotational driving portion that rotates the rollers. Although it is not shown in the drawings, the roller rotational driving portion is provided with an encoder, so that the length of the supplied wire W may be obtained from the detected number of rotations.

The subject connection portion 96 includes a subject connection body 96a that is strongly held to the connection body 55a of the first moving unit 42A and a connector receiving portion 96b that is connected to the wiring-piping connector 55b. A wiring or a pipe is connectable to the connector receiving portion 96b. Specifically, a wiring supplying power and transmitting a control signal from a welding power supply panel 97 and a welding control panel 98 provided on the working floor 12 to the an illumination unit 92, the an imaging unit 93, the welding torch 90, and the a welding material supply unit 91, or a pipe supplying cooling water from welding cooling equipment 99 on the working floor 12 to a cooling pipe (not shown) may be connected to the connector receiving portion. In the state where the first moving unit 42A is connected to the connection portion 55, the position of the welding unit 80 relative to the nozzle stub 3 is adjusted by the first moving unit 42A under the control of the third control panel 14C. Then, electrical discharge is generated between the welding torch 90 and the nozzle stub 3 at the corresponding position, and the wire W as the welding material is sequentially supplied thereto. Accordingly, it is possible to perform the welding at a desired position.

Figure 13:
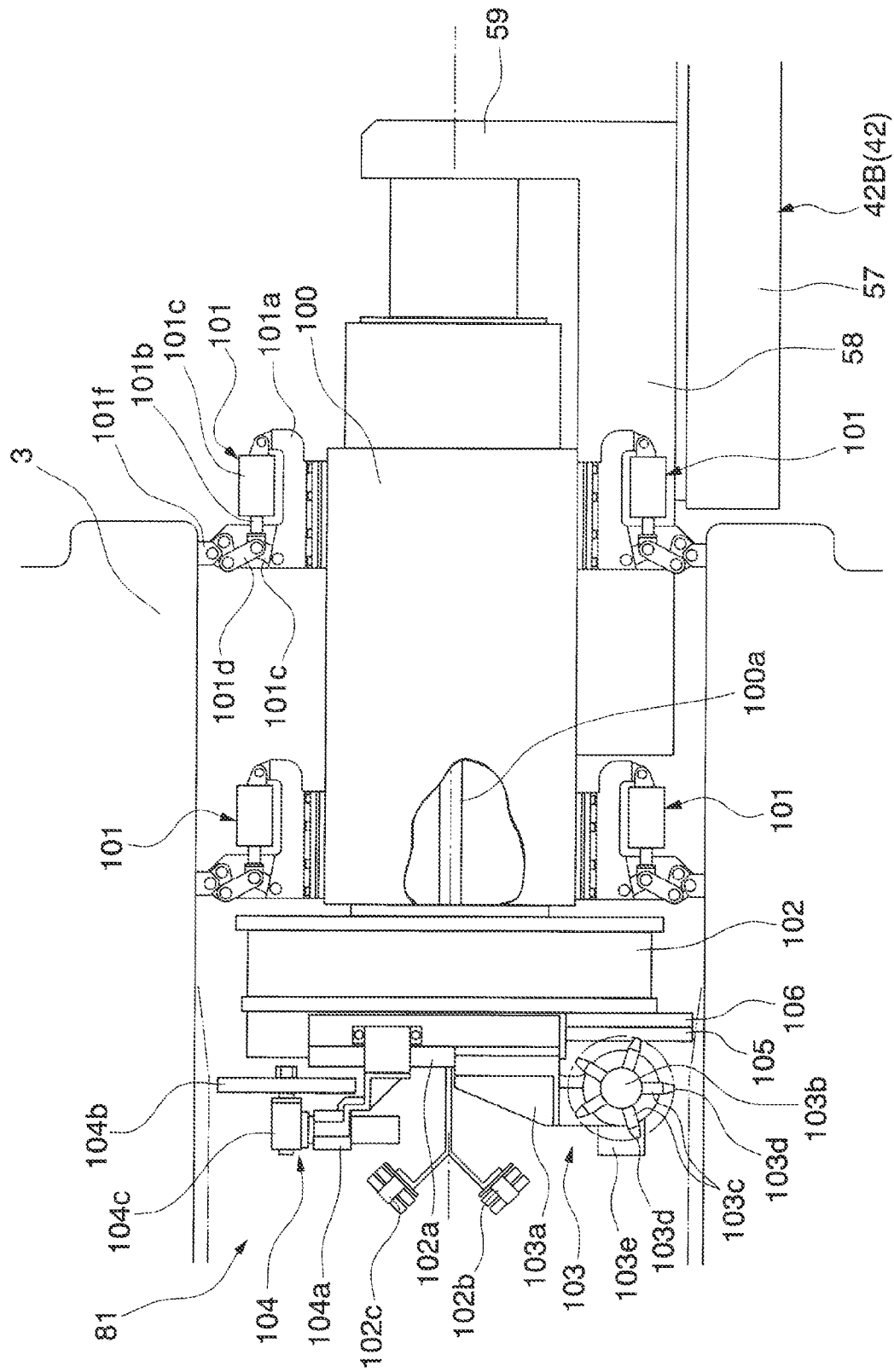
FIG. 13 is a partially cut-away side view specifically illustrating a cutting unit in the nozzle stub working system according to the embodiment of the present invention.

As shown in FIG. 13, the cutting unit 81 includes a substantially cylindrical pipe body 100, a fixing unit 101, a disk 102, a cutting unit 103, a grinding unit 104, a water supply pipe 105, and a suction pipe 106. The pipe body 100 is insertable into the nozzle stub 3. The fixing unit 101 is provided at the outer peripheral surface of the pipe body 100, and may fix the pipe body 100 to the inner surface of the nozzle stub 3. The disk 102 is provided at the front end of the pipe body 100, and is rotatable about the axis with respect to the pipe body 100. The cutting unit 103 and a grinding unit 104 are provided at the front end surface of the disk 102, and perform cutting on the inner surface of the nozzle stub 3. The water supply pipe 105 supplies water to the inner surface of the nozzle stub 3 during the cutting and grinding. The suction pipe 106 is provided near the cutting unit 103 to collect cut chips.

The fixing unit 101 includes a frame 101a, a hydraulic cylinder 101c, and a pair of link members 101d and 101e. The frame 101a is attached to the outer peripheral surface of the pipe body 100. The hydraulic cylinder 101c allows a rod 101b to move in a reciprocating manner along the axial direction of the pipe body 100. The pair of link members 101d and 101e is attached to the front end of the rod 101b to be rotatable within a plane including the central axis of the pipe body 100. In the pair of link members 101d and 101e, one link member 101d is disposed near the outer periphery, the other link member 101e is disposed near the inner periphery, and the central portions serving as the base ends thereof are rotatably attached to the front end of the rod 101b to form a substantially V-shape. Then, a contact portion 101f coming into contact with the inner surface of the nozzle stub 3 is rotatably attached to the front end of one link member 101d. Further, the front end of the other link member 101e is rotatably attached to the frame 101a. For this reason, when the rod 101b of the hydraulic cylinder 101c is moved in a reciprocating manner, the front ends of the pair of link members 101d and 101e may be moved close to or away from each other. Accordingly, the contact portion 101f attached to the front end of one link member 101d may come into contact with the inner surface of the nozzle stub 3 so that it is pressed.

In the embodiment, the fixing units 101 are provided at four positions on the outer peripheral surface of the pipe body 100 at the same interval in the circumferential direction, and are provided at two positions in the axial direction. That is, the number of the fixing units 101 is eight in total. Then, the pipe body 100 is fixed to the inner surface of the nozzle stub 3 by the eight fixing units 101. In FIG. 13, in order to specifically show the fixing unit 101, it is depicted such that two fixing units 101 are provided at each of the upper and lower ends. Actually, the fixing unit 101 is configured to press the inner surface of the nozzle stub 3 in the direction displaced by 45° from the perpendicular and horizontal axes at the left and right positions to be placed on the support plate 58 of the second moving unit 42B as described below.

A rotational driving shaft 100a coaxial with the central axis of the pipe body 100 is disposed inside the pipe body, and the disk 102 is attached to the front end thereof. Although it is not shown in the drawings, the inside of the pipe body 100 is provided with a disk rotational driving section rotating the rotational driving shaft 100a about the axis. The front end surface of the disk 102 is provided with a guide portion 102a along the radial direction. The cutting unit 103 and a grinding unit 104 are attached to be adjustable in position in the radial direction along the guide portion 102a. The cutting unit 103 includes a frame 103a, a disk portion 103b, a blade holder 103c, and a cutting blade 103d. The frame 103a is configured to be movable along the guide portion 102a. The disk portion 103b is provided at the frame 103a to be rotatable about the axis along the direction tangential to the outer periphery of the disk 102. A plurality of the blade holders 103c is radially attached to the disk portion 103b. The cutting blade 103d is attached to each blade holder 103c. Further, the frame 103a is provided with an exchange driving section 103e that rotates the disk portion 103b about the axis with respect to the frame 103a. When the disk portion 103b is rotated by the exchange driving section 103e, it is possible to make the cutting blade 103d selectively protrude toward the outer periphery in the radial direction so that it cuts the inner surface of the nozzle stub 3. Further, when a disk rotational driving section (not shown) is driven so that the rotational driving shaft 100a rotates about the axis, the disk 102 and the cutting unit 103 attached to the disk 102 rotate about the rotational driving shaft 100a. Accordingly, it is possible to cut the inner surface of the nozzle stub 3 in the circumferential direction.

The grinding unit 104 includes a frame 104a that is movable along the guide portion 102a and a substantially disk-shaped grinder 104b that is attached to the frame 104a to be rotatable about the axis parallel to the central axis of the pipe body 100. The frame 104a is attached with a grinding driving section 104c that rotates the grinder 104b. It is possible to grind the inner surface of the nozzle stub 3 by rotating the grinder 104b using the grinding driving section 104c.

Here, although it is not shown in the drawings, various wirings and pipes extend from the base end of the pipe body 100 up to the working floor 12. Then, the disk rotational driving section (not shown), the exchange driving section 103e, and the grinding driving section 104c are connected to the fourth control panel 14D on the working floor 12 through the wirings. Further, although it is not shown in the drawings, each of the disk rotational driving section, the exchange driving section 103e, and the grinding driving section 104c is attached with an encoder, and the detection signal is input to the fourth control panel 14D. The fourth control panel 14D outputs a control signal to each driving section to be driven, and performs a feed back control by receiving an input from the encoder provided at each driving section. Accordingly, the disk rotational driving section (not shown) is driven to rotate the rotational driving shaft 100a at a predetermined number of rotations during cutting. Further, the fourth control panel 14D may drive the exchange driving section 103e so that a predetermined cutting blade 103d selectively protrudes toward the outer periphery, if necessary. Further, the grinding driving section 104c is driven so that the grinder 104b rotates at a predetermined number of rotations during grinding, and if necessary, the disk rotational driving section (not shown) is driven to rotate the rotational driving shaft 100a. Accordingly, it is possible to adjust the position ground by the grinder 104b.

The water supply pipe 105 is connected a water supply device 106 provided on the working floor 12 and connected to the fourth control panel 14D through a pipe, so that a necessary amount of water may be supplied under the control of the fourth control panel 14D. The suction pipe 106 is connected to the collecting equipment 109 including a suctioning unit 109a provided at the working floor 12 to generated a negative pressure and a collecting box 109b collecting matter suctioned at the suctioning unit 109a. For this reason, when the suctioning unit 109a of the collecting equipment 109 is driven under the control of the fourth control panel 14, cut chips may be suctioned from the suction pipe 106 and be collected inside the collecting box 109b. As shown in FIG. 12, the front end surface of the disk 102 is attached with a cutting monitoring camera 102b and a grinding monitoring camera 102c capable of respectively imaging the cutting position of the cutting unit 103 and the grinding position of the grinding unit 104. Accordingly, it is possible to check the cutting situation and the grinding situation using a monitor (not shown) provided on the working floor 12.

Figure 14:
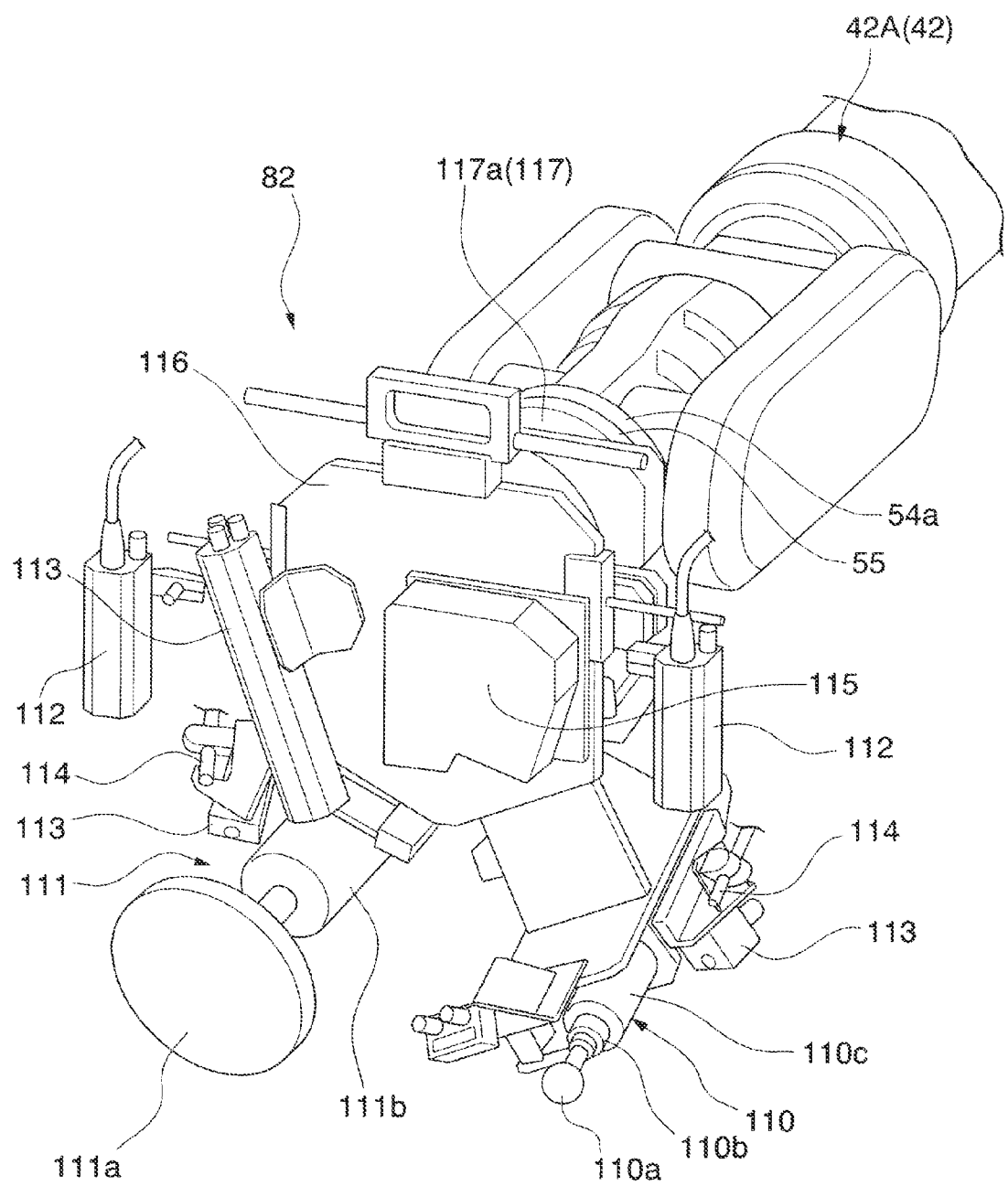
FIG. 14 is a perspective view specifically illustrating a finish processing unit in the nozzle stub working system according to the embodiment of the present invention.

As shown in FIG. 14, the finish processing unit 82 includes two grinding units which are first and second grinding units 110 and 111, an illumination unit 112, various an imaging unit 113, an air supply unit 114, a position sensor 115, a support plate 116, and a subject connection portion 117. The first grinding unit 110 and the second grinding unit 111 grind the inner surface of the nozzle stub 3. The illumination unit 112 illuminates the positions respectively ground by the grinding unit. The various imaging unit 113 image the grinding position. The air supply unit 114 blows air to remove ground chips. The position sensor 115 detects the relative position with respect to the nozzle stub 3. The support plate 116 supports the position sensor 115 and the like. The subject connection portion 117 is attached to the support plate 116, and is connected to the connection portion 55 of the first moving unit 42A. The first grinding unit 110 includes a holder 110b to which a cutter 110a made of a super steel alloy is attached and a first grinding driving section 110c that rotates the holder 110b about the axis. Further, the second grinding unit 111 includes a substantially disk-shaped wire brush 111a and a second grinding driving section 111b rotating the wire brush 111a about the axis. The imaging unit 113 is respectively provided to monitor the cutter 110a of the first grinding unit 110 and the wire brush 111a of the second grinding unit 111. In addition, one imaging unit 113 is further provided in order to monitor the finished state of the inner surface of the nozzle stub 3.

The subject connection portion 117 includes a subject connection body 117a that is strongly connected to the connection body 55a and a connector receiving portion (not shown) connected to the wiring-piping connector 55b. The portion receiving the connector 55b is connectable to various electrical system wirings that supply power and transmit a control signal to the illumination unit 112, the imaging unit 113, the position sensor 115, the first grinding unit 110, and the second grinding unit 111 and output a detection signal. Furthermore, the connector receiving portion is connectable to a pipe that supplies compressed air from the compressed air supply device 118 connected to the third control panel 14C on the working floor 12 to each air supply unit 114. For this reason, when the first grinding driving section 110c of the first grinding unit 110 is driven under the control of the third control panel 14C, it is possible to perform rough cutting using the cutter 110a. Also, it is possible to perform finish-cutting using the wire brush 111a by driving the second grinding driving section 111b of the second grinding unit 111. Further, it is possible to remove ground chips produced from the grinding position by using the air supply unit 114.

Figure 15:
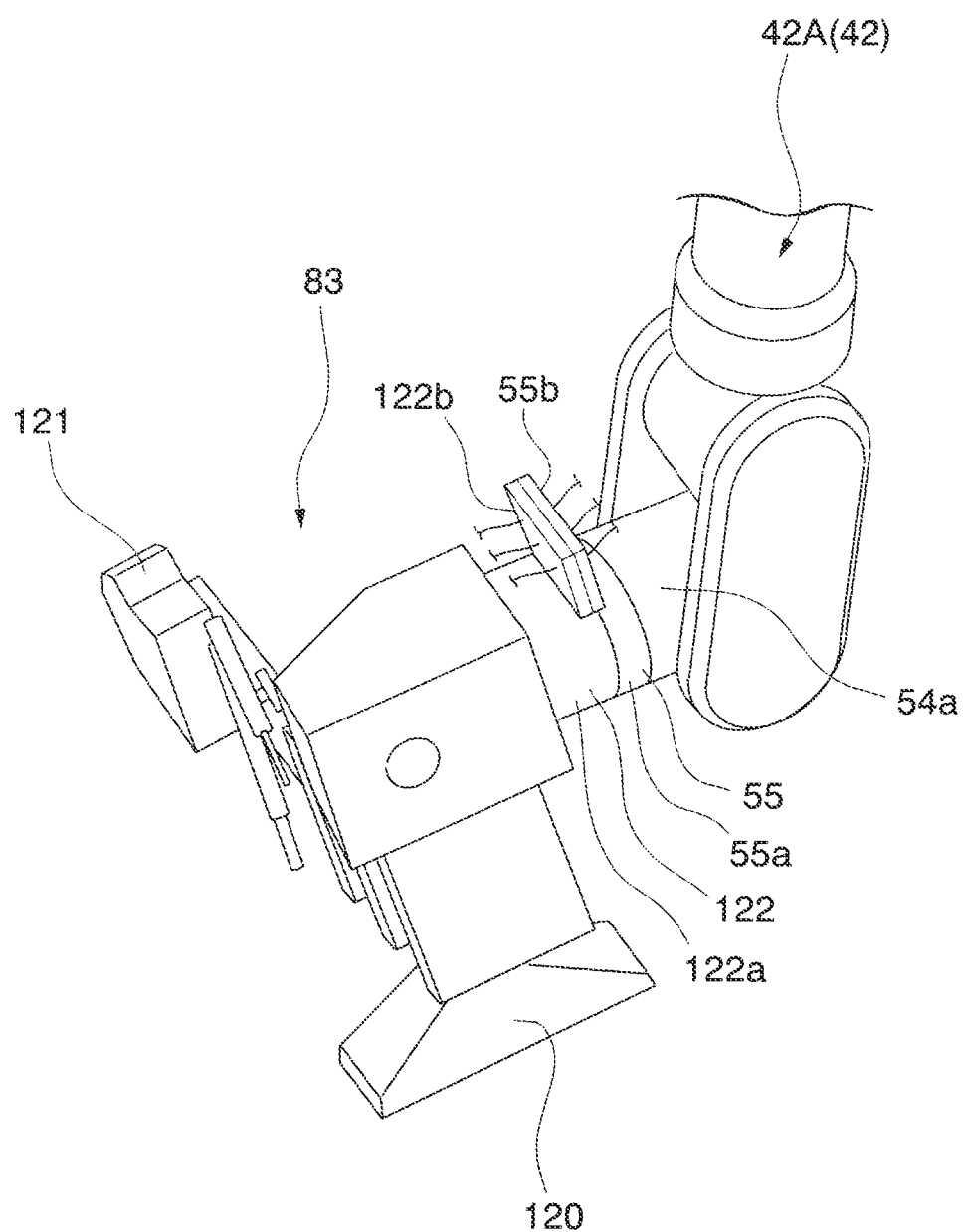
FIG. 15 is a perspective view specifically illustrating a collecting unit in the nozzle stub working system according to the embodiment of the present invention.

As shown in FIG. 15, the collecting unit 83 includes a vacuum 120 that suctions a subject inside the nozzle stub 3, a position sensor 121 that detects the relative position with respect to the nozzle stub 3, and a subject connection portion 122 that is connected to the connection portion 55 of the first moving unit 42A. The subject connection portion 122 includes a subject connection body 122a that is strongly connected to the connection body 55a and a connector receiving portion 122b that is connected to the wiring-piping connector 55b. The connector receiving portion 122b is connectable to a pipe connected to the collecting equipment 109 and the vacuum 120. Further, the connector receiving portion 122b is connectable to a wiring transmitting a detection signal from the position sensor 121 connected to the third control panel 104C. Then, when the suctioning unit 109a of the collecting equipment 109 is driven under the control of the third control panel 14C, matter present near the vacuum 120 of the collecting unit 83 may be suctioned and be collected inside the collecting box 109b.

Although it is not shown in the drawings, the decontaminating unit 84 shown in FIG. 2 is configured to be movable inside the nozzle stub 3 while being placed on the support plate 58 of the second moving unit 42B, and includes an ejection port capable of ejecting a blasting material for decontamination. Further, the decontaminating unit 84 is connected to the sixth control panel 14F provided on the working floor 12, a cleaning water supply device 125 supplying cleaning water, and blasting equipment 126 supplying blasting material together with compressed air. For this reason, when the blasting equipment 126 is driven under the control of the sixth control panel 14F so that the blasting material is blown from the ejection port of the decontaminating unit 84 to the inner surface of the nozzle stub 3 and the cleaning water supplied from the cleaning water supply device 125 is blown thereto, it is possible to remove the radiation matter adhered to the inner surface.

Figure 16:
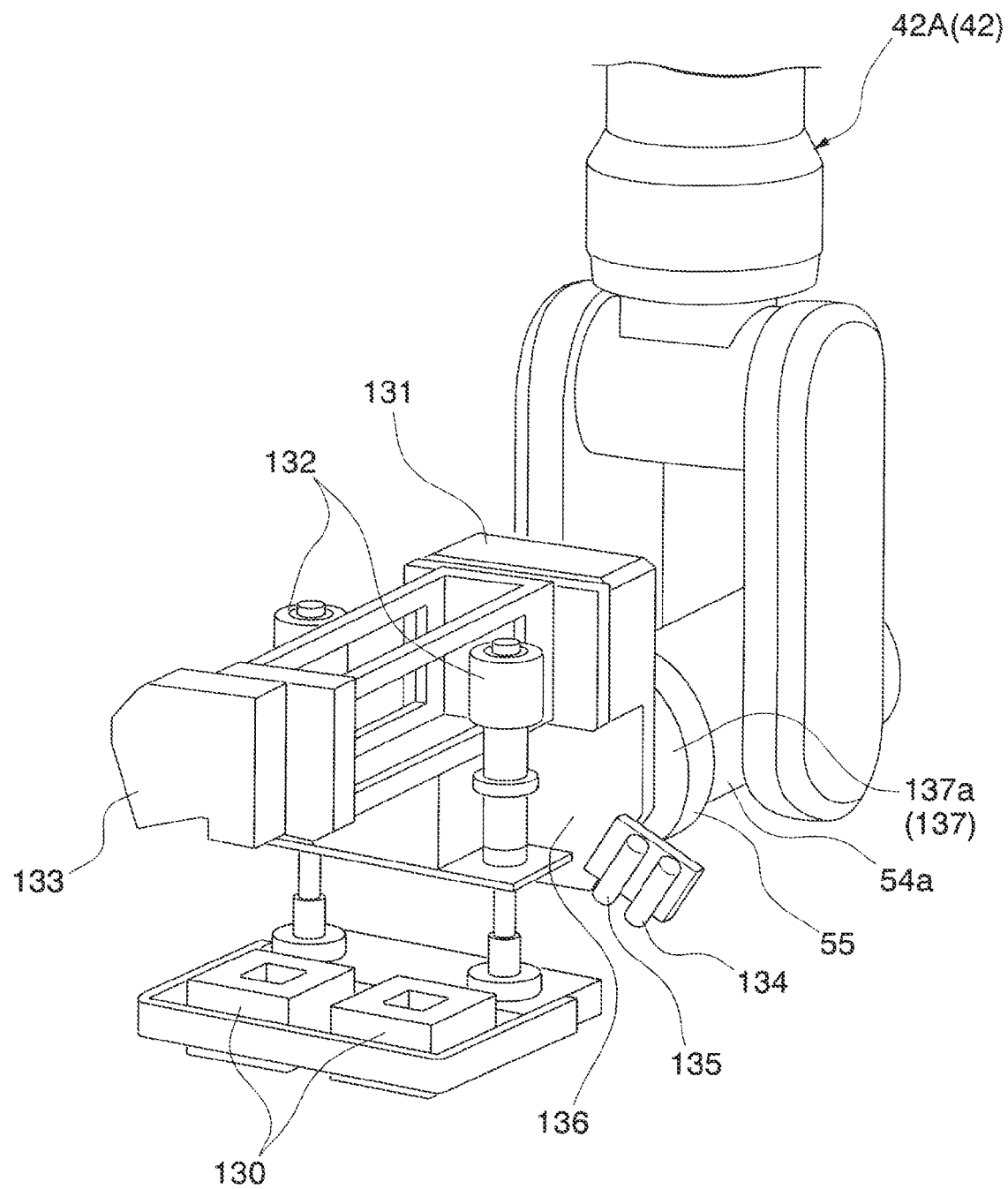
FIG. 16 is a perspective view specifically illustrating a UT inspecting unit in the nozzle stub working system according to the embodiment of the present invention.
Figure 17:
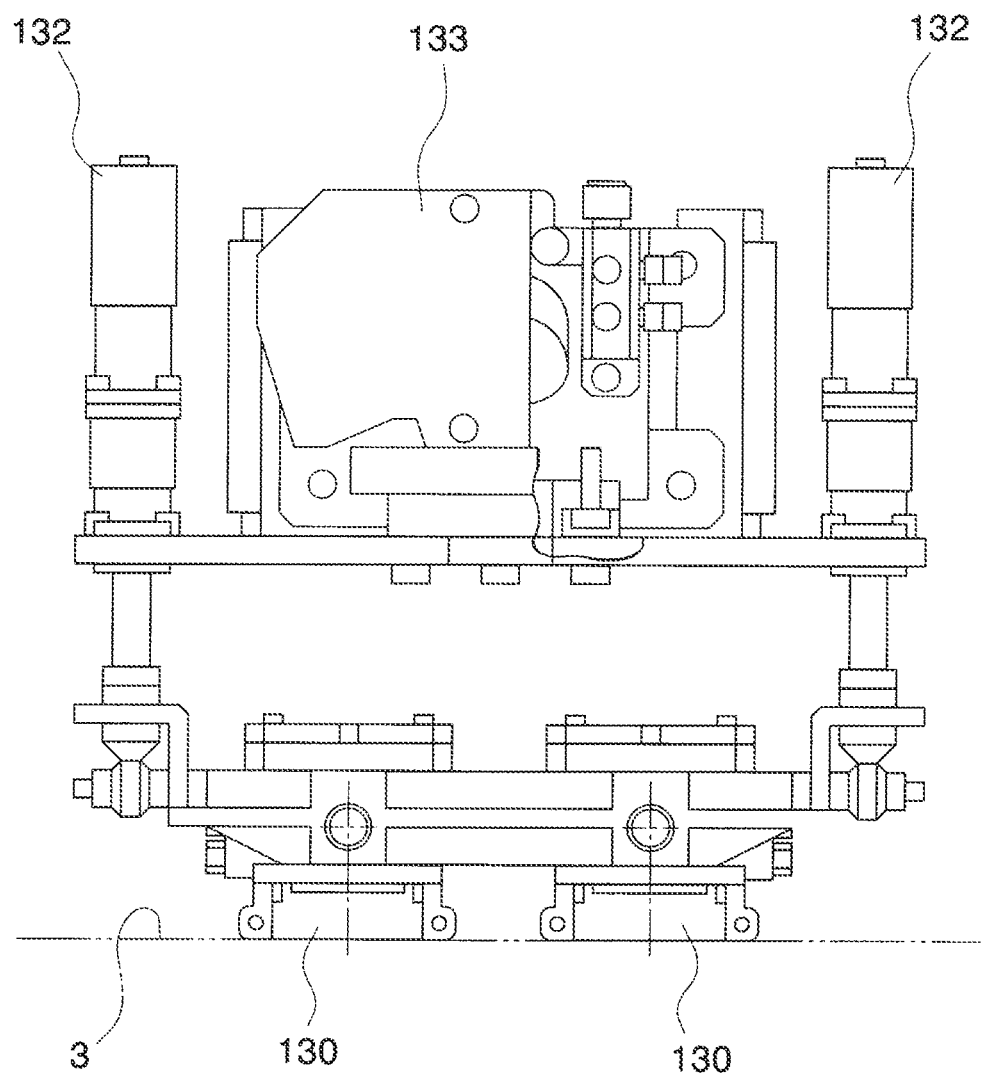
FIG. 17 is a front view specifically illustrating the UT inspecting unit in the nozzle stub working system according to the embodiment of the present invention.

Next, each inspecting unit 40A will be described. As shown in FIGS. 16 and 17, the UT inspecting unit 85 includes a pair of probes 130, a unit body 131, a position adjusting unit 132, a position sensor 133, an illumination unit 134, an imaging unit 135, a support plate 136, and a subject connection portion 137. The pair of probes 130 may oscillate an ultrasonic wave to the welding portion 5 of the inner surface of the nozzle stub 3 and detect the ultrasonic wave. The unit body 131 generates an ultrasonic wave and analyses the detected ultrasonic wave to detect a defect. The position adjusting unit 132 adjusts the positions of the pair of probes 130 by moving the pair of probes with respect to the inner surface of the nozzle stub 3. The position sensor 133 detects the relative position with respect to the nozzle stub 3. The illumination unit 134 illuminates the inspection position using the probe 130. The imaging unit 135 images the inspection position. The support plate 136 supports the position sensor 133 and the like. The subject connection portion 137 is attached to the support plate 136, and is connected to the connection portion 55 of the first moving unit 42A.

The subject connection portion 137 includes a subject connection body 137a that is strongly connected to the connection body 55a and a connector receiving portion (not shown) that is connected to the wiring-piping connector 55b. The connector receiving portion is connectable to a wiring that supplies power and transmits a control signal to the illumination unit 134, the imaging unit 135, the position adjusting unit 132, and the unit body 131 and outputs a detection signal. For this reason, when the position adjusting unit 132 is driven under the control of the third control panel 14C, it is possible to adjust the distance between the probe 130 and the inner surface of the nozzle stub 3. Then, when the unit body 131 is driven to generate an ultrasonic wave so that the ultrasonic wave is oscillated from the probe 130 and the detected ultrasonic wave is analyzed, a defect may be detected. Then, the third control panel 14C may acquire defect data relating to a defect on the basis of the defect detection signal input from the unit body 131 and the position information from the position sensor 133.

Figure 18:
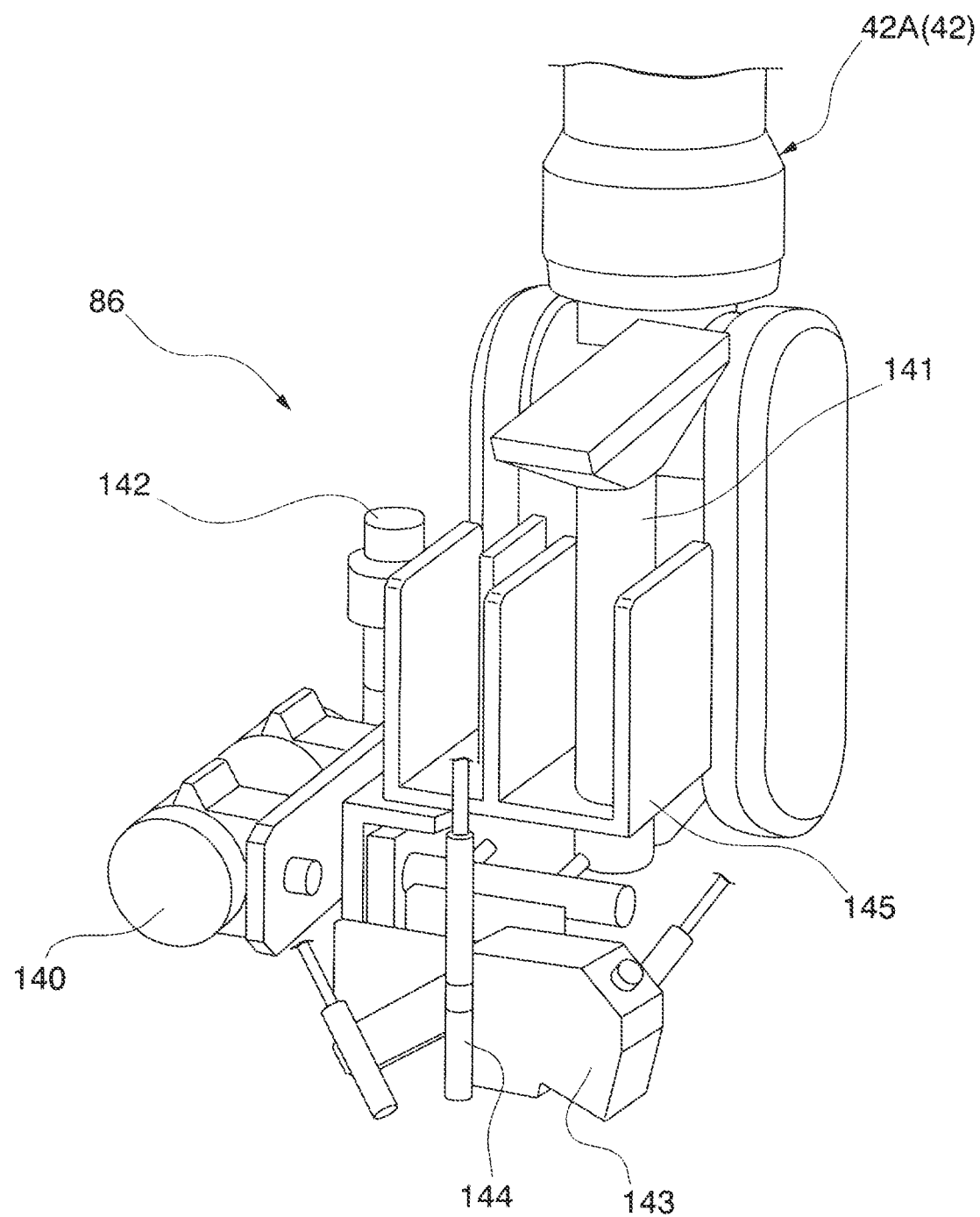
FIG. 18 is a perspective view specifically illustrating a PT inspecting unit in the nozzle stub working system according to the embodiment of the present invention.
Figure 19:
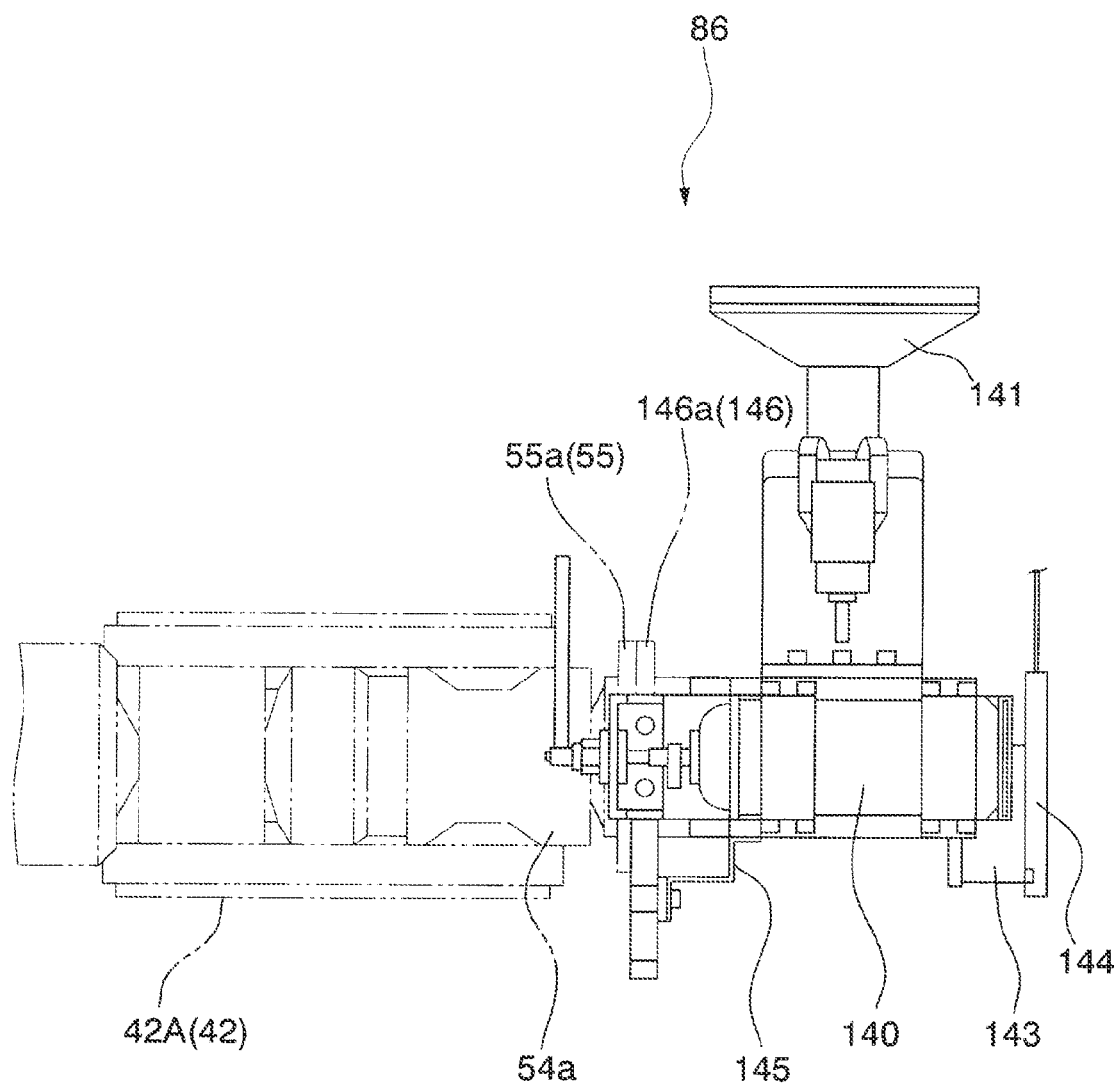
FIG. 19 is a side view specifically illustrating the PT inspecting unit in the nozzle stub working system according to the embodiment of the present invention.

As shown in FIGS. 18 and 19, the PT inspecting unit 86 includes a penetration blowing unit 140, a vacuum 141, an air supply unit 142, a position sensor 143, an imaging unit 144, a support plate 145, and a subject connection portion 146. The penetration blowing unit 140 blows penetration to the inner surface of the nozzle stub 3. The vacuum 141 may suction a liquid or the like on the inner surface of the nozzle stub 3. The air supply unit 142 may blow compressed air to the inner surface of the nozzle stub 3. The position sensor 143 detects the relative position with respect to the nozzle stub 3. The imaging unit 144 images the inner surface of the nozzle stub 3 to which the penetration is blown. The support plate 145 supports the position sensor 143 and the like. The subject connection portion 146 is attached to the support plate 145, and is connected to the connection portion 55 of the first moving unit 42A.

The subject connection portion 146 includes a subject connection body 146a that is strongly connected to the connection body 55a and a connector receiving portion (not shown) that is connected to the wiring-piping connector 55b. The connector receiving portion is connectable to a wiring or a pipe. Specifically, a wiring for supplying a control signal for driving the penetration blowing unit 140, the cleaning water blowing unit 141, the imaging unit 144, and the position sensor 143 or for supplying power and for outputting a detection signal, or a pipe for suctioning at the vacuum 141 using the suctioning unit 109a of the collecting equipment 109 and for blowing compressed air of the compressed air supply device 118 from the air supply unit 142 is connectable. For this reason, when the penetration blowing unit 140 is driven to blow the penetration to the inner surface of the nozzle stub 3 and the vacuum 141 suctions and removes the extra penetration under the control of the third control panel 14C, it is possible to visualize a defect such as a crack at the welding portion 5 of the inner surface of the nozzle stub 3. Furthermore, it is possible to detect a defect such as a crack by acquiring an image imaged by the imaging unit 144 and performing a necessary process such as a binarizing process thereon. Further, it is possible to acquire position information of the detected defect through a correlation with the position detection signal using the position sensor 143.

Figure 20:
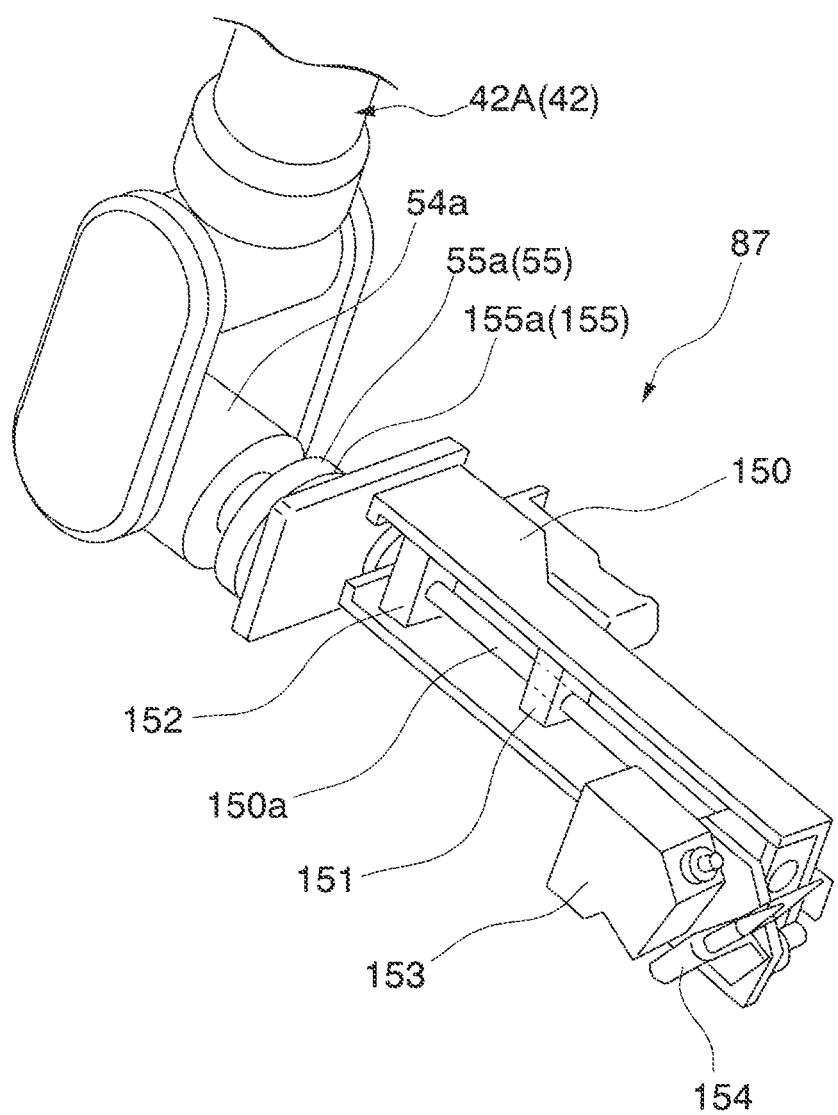
FIG. 20 is a perspective view specifically illustrating a dimension measuring unit in the nozzle stub working system according to the embodiment of the present invention.

As shown in FIG. 20, the dimension measuring unit 87 includes a frame 150, a measurement image acquiring section 151, a travel driving section 152, a position sensor 153, an imaging unit 154, and a subject connection portion 155. A guide post 150a is disposed in the frame 150. The measurement image acquiring section 151 is configured to be movable along the guide post 150a and image the inner surface of the nozzle stub 3. The travel driving section 152 allows the measurement image acquiring section 151 to travel along the guide post 150a. The position sensor 153 detects the relative position with respect to the nozzle stub 3. The imaging unit 154 images the entire range imaged by the measurement image acquiring section 151. The subject connection portion 155 is attached to the frame 150, and is connected to the connection portion 55 of the first moving unit 42A. The travel driving section 152 is, for example, an electric motor, and although it is not shown in the drawings, an encoder is mounted-thereon. Accordingly, it is possible to acquire the position information of the measurement image acquiring section 151 on the guide post 150a. The subject connection portion 155 includes a subject connection body 155a that is strongly connected to the connection body 55a and a connector receiving portion (not shown) that is connected to the wiring-piping connector 55b. The connector receiving portion is connectable to a wiring transmitting a control signal driving the measurement image acquiring section 151, the travel driving section 152, the position sensor 153, and the imaging unit 154, supplying power, and outputting a detection signal and the like from the encoder (not shown) of the travel driving section 152, the imaging unit 154, and the position sensor 153.

As described above, each working device 40 has been specifically described, but the invention is not limited thereto. That is, various configurations may be applied in accordance with the purpose of the work. Here, as described above, the working device 40 may be separated into a first working unit 160 and a second working unit 161. The first working unit 160 is separably connected to the connection portion 55 of the first moving unit 42A, and is driven by a control signal, power, operating water, compressed air, and the like input through the connection portion 55. The second working unit 161 may be placed on the support plate 58 of the second moving unit 42B. Further, the second working unit 161 includes a fixing unit fixed to the inner surface of the nozzle stub 3 while sliding inside the nozzle stub 3. In the embodiment, the welding unit 80, the finish processing unit 82, the collecting unit 83, the UT inspecting unit 85, the PT inspecting unit 86, and the dimension measuring unit 87 correspond to the first working unit 160, and the cutting unit 81 and the decontaminating unit 84 correspond to the second working unit 161.

The cutting unit 81 and the decontaminating unit 84 corresponding to the second working unit 161 and the nozzle stub blocking device 41 are temporarily placed at predetermined arrangement positions determined in advance on the plane of the working floor 12. Then, the supervising computer 15 of the control device 13 moves the elevating device 44 to the above-described arrangement position to selectively grip the working device with the progress of the work inside the nozzle stub 3, and drop the working device into the platform unit 11.

Figure 21:
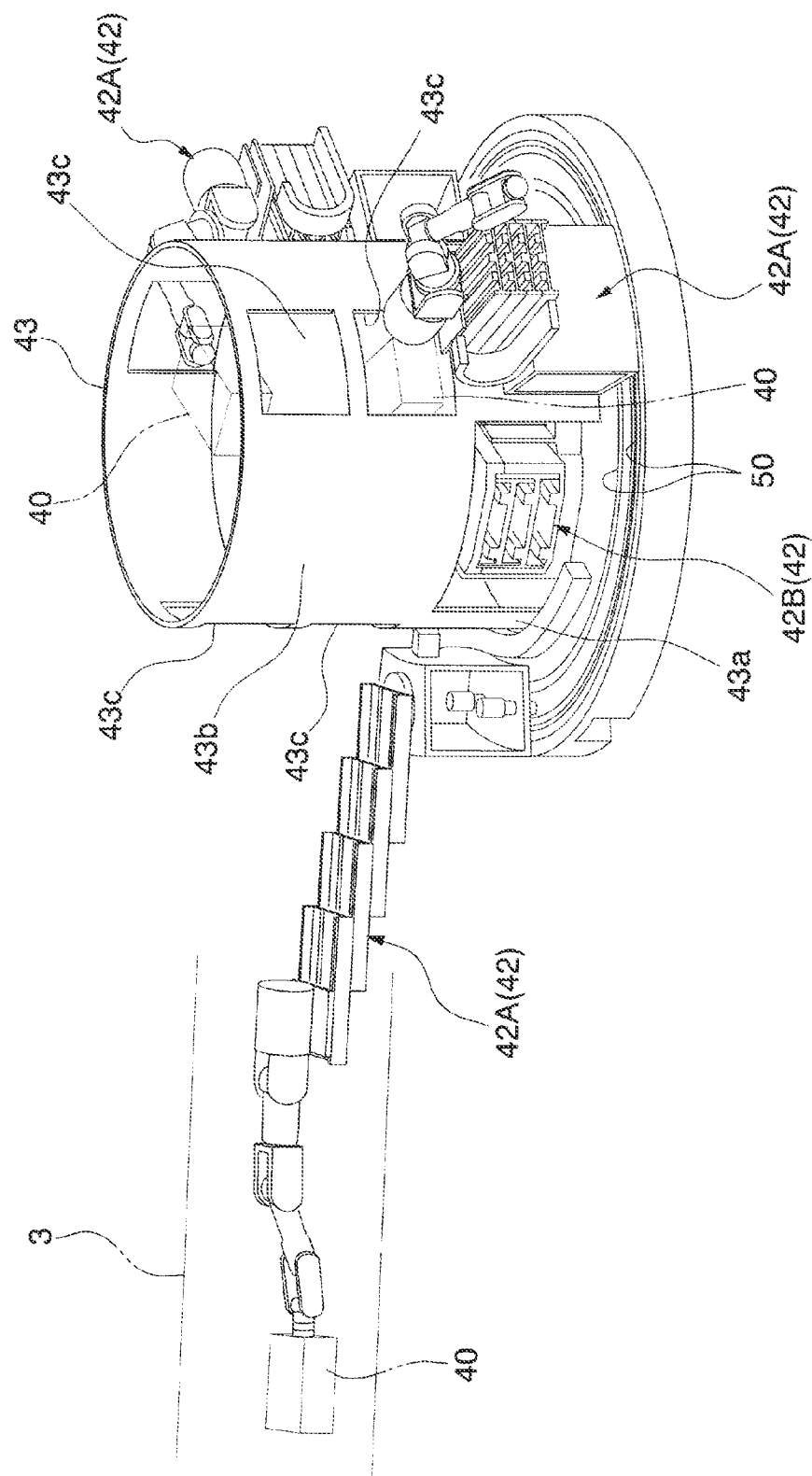
FIG. 21 is a perspective view specifically illustrating a storage device and an installation state of the storage device inside a platform unit in the nozzle stub working system according to the embodiment of the present invention.

On the other hand, a plurality of units corresponding to the first working unit 160 is received in the storage device 43. As shown in FIG. 21, the storage device 43 includes a leg portion 43a that may be disposed between the first moving unit 42A and the second moving unit 42B inside the platform unit 11 and a substantially cylindrical body 43b that is supported by the leg portion 43a. A plurality of receiving concave portions 43c is provided at the body 43b in the circumferential direction to receive the working device 40 as the subject. In the embodiment, the receiving concave portions are provided to correspond to the number of the pairs of the inlet nozzle stub 3A and the outlet nozzle stub 3B constituting the nozzle stub 3, where the receiving concave portions are provided at six positions in total, that is, the upper and lower receiving concave portions are provided at three positions in the circumferential direction. Then, each working device 40 is received in the storage device 43 in accordance with the type thereof on the working floor 12. That is, as shown in FIG. 1, the storage device 43 is prepared to correspond to the type of the working device 40 received in the storage device 43. For example, the welding unit 80 is received in one storage device 43. Further, the respective storage devices 43 are temporarily placed at predetermined arrangement positions determined in advance on the plane of the working floor 12. Then, the supervising computer 15 of the control device 13 moves the elevating device 44 to the above-described arrangement position to grip the working device with the progress of the work inside the nozzle stub 3, and drops each storage device 43 into the platform unit 11 while the working device is received in the storage device 43.

Next, the operation of the nozzle stub working system 10 of the embodiment and the control using the control device 13 of the nozzle stub working system 10 will be specifically described.

Figure 22:
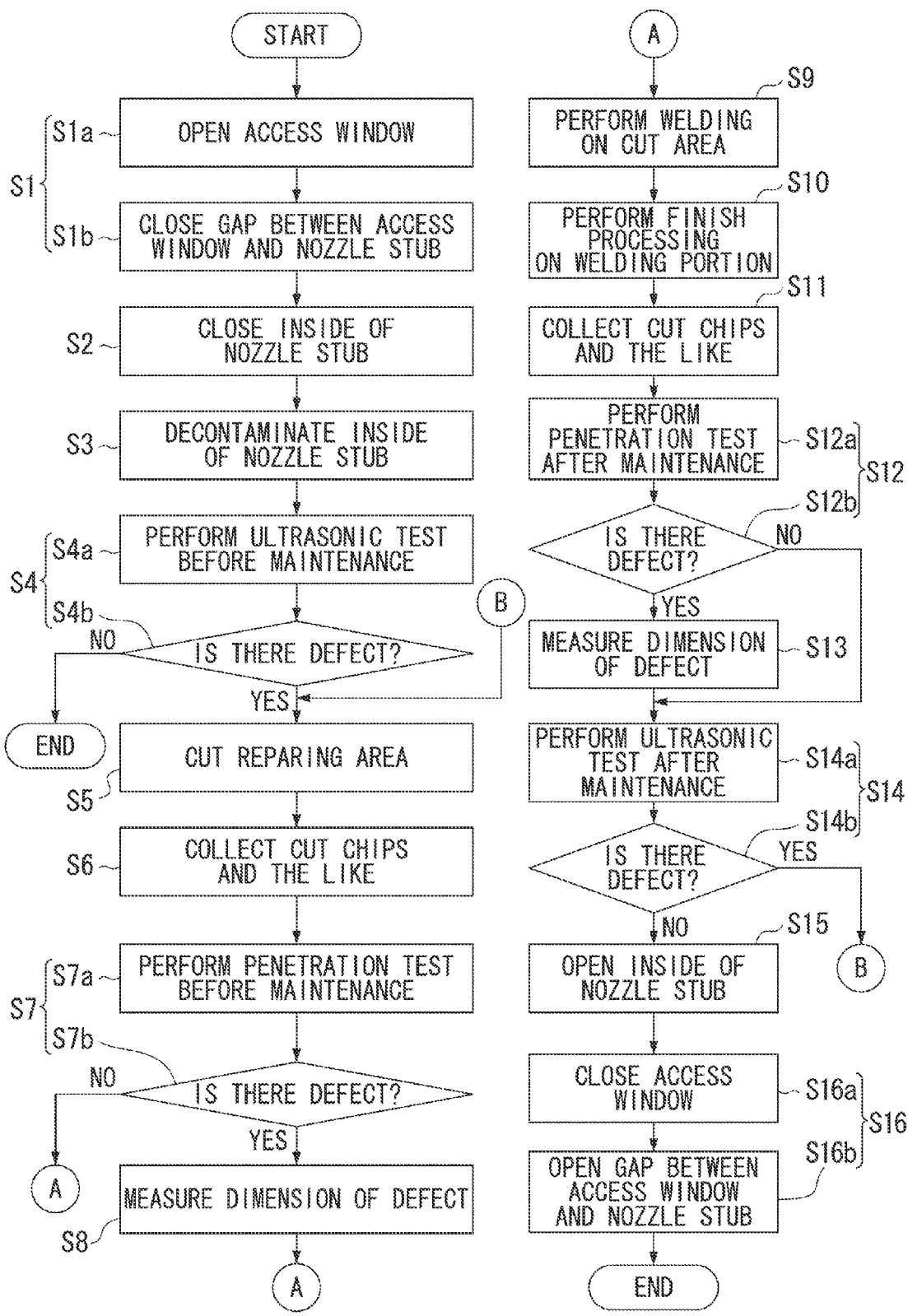
FIG. 22 is a flowchart illustrating a procedure of controlling nozzle stub work using the nozzle stub working system according to the embodiment of the present invention.
Figure 23:
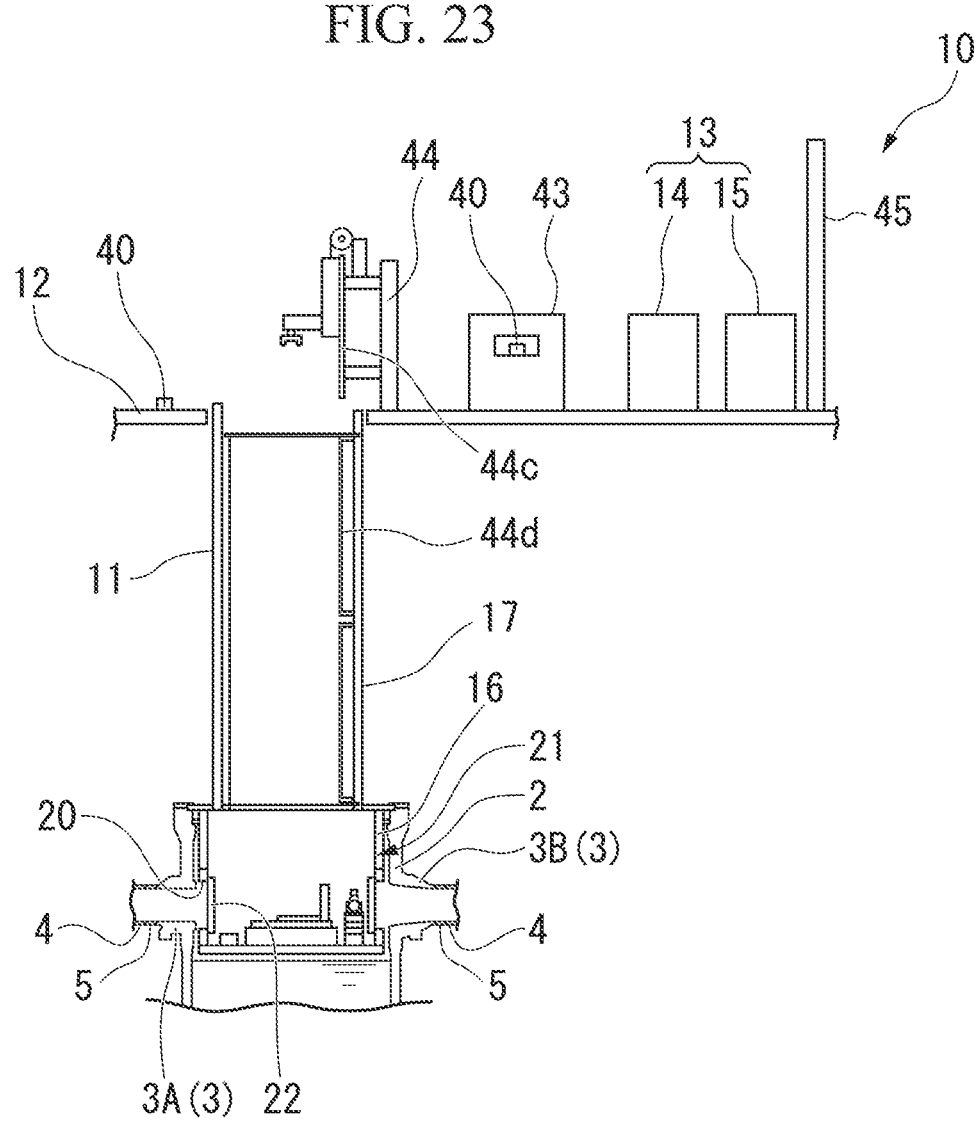
FIG. 23 is a cross-sectional view specifically illustrating a state where the nozzle stub work is started by the nozzle stub working system according to the embodiment of the present invention.

FIG. 22 is a flowchart illustrating a procedure of the maintenance and repair of the welding portion 5 (refer to FIG. 1) of the pipe 4 and the nozzle stub 3 performed by the nozzle stub working system 10. Further, FIGS. 23 to 49 are diagrams illustrating respective steps of the maintenance and repair. Furthermore, in FIGS. 23 to 49, the respective constituents are simply depicted for the easy description of the operation of each configuration. As shown in FIG. 23, the platform unit 11 and the working floor 12 are first constructed. For example, after the working floor 12 is constructed, the platform unit 11 is assembled on the working floor 12, and the lower end of the platform unit is inserted into the reactor vessel 2 while being hanged on a crane or the like. The control device 13, the working devices 40, the gap closing device 28, the elevating device 44, and the portal crane 45 are provided on the working floor 12. Further, a wiring and a pipe connecting the platform unit 11 and the working floor 12 to each other are provided. Here, the moving device 42 and the second rail 44d of the elevating device 44 are provided in advance inside the platform unit 11 while the access window 20 of the platform unit 11 is closed by the cover 22 of the access window moving device 21. The drainage of the cooling water is performed in advance inside the reactor vessel 2 until the water level thereinside becomes lower than the level of the nozzle stub 3.

Figure 24:
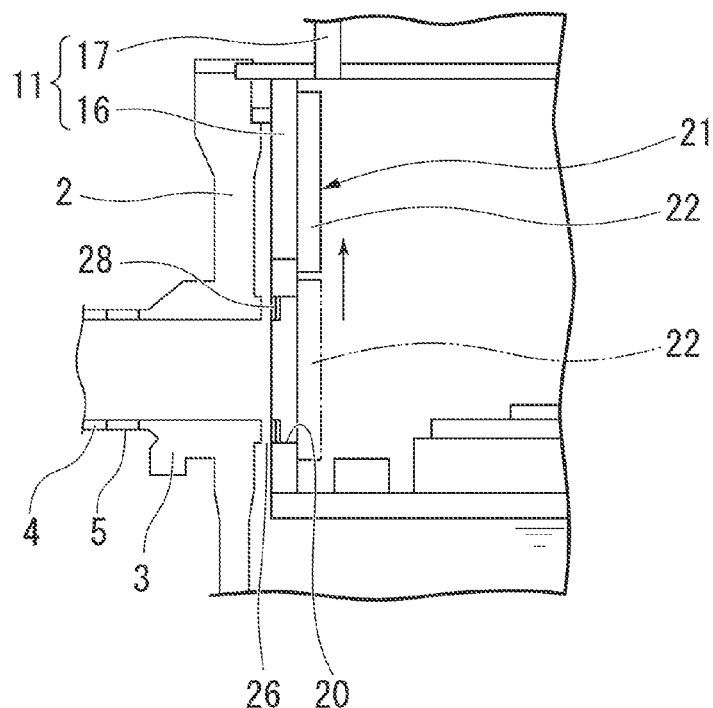
FIG. 24 is a cross-sectional view specifically illustrating a state where an access window is opened in an access window opening step using the nozzle stub working system according to the embodiment of the present invention.
Figure 25:
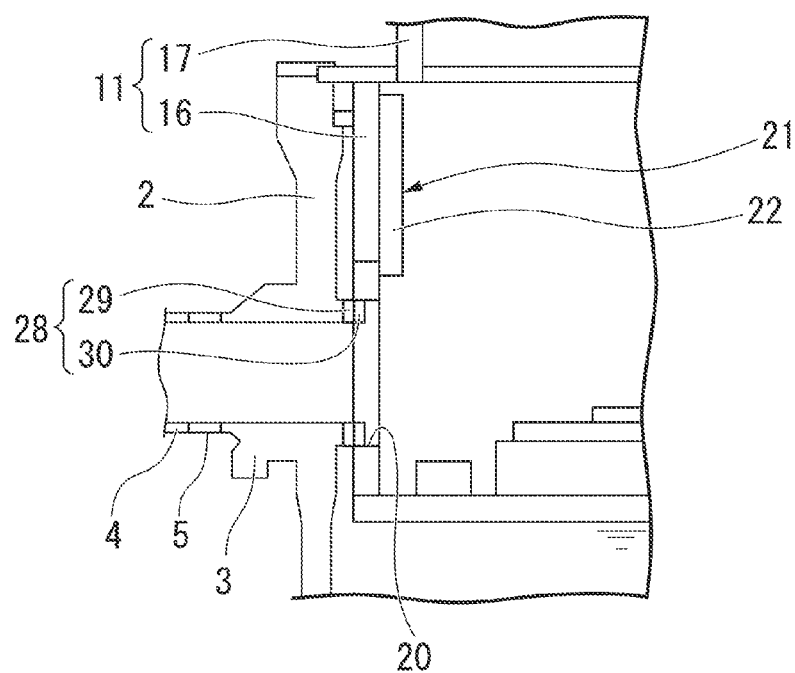
FIG. 25 is a cross-sectional view specifically illustrating a state where a gap is closed in the access window opening step using the nozzle stub working system according to the embodiment of the present invention.

As shown in FIGS. 22 and 24, when a work start command is input to the supervising computer 15 in the control device 13, as an access window opening step S1, the supervising computer 15 transmits an access window opening command to the first control panel 14A. For this reason, the first control panel 14A drives the electric winch 24 of the access window moving device 21 to move up the cover 22, so that the access window 20 is opened (step S1a). Next, the supervising computer 15 transmits a gap closing command to the first control panel 14A. For this reason, as shown in FIG. 25, the first control panel 14A drives the compressed air supply device 31 to supply compressed air to the pneumatic cylinder 28a of the gap closing device 28, so that the protection ring 29 may be advanced toward the inner surface of the reactor vessel 2 by the pneumatic cylinder 28a and the seal material 29c may be brought into contact with the inner surface (step S1b). Accordingly, it is possible to close the gap 2b between the nozzle stub 3 and the access window 20 using the protection ring 29 and the expanding and contracting member 30, and reliably prevent anything from intruding into the reactor vessel 2 from the gap 2b when accessing the nozzle stub 3 from the access window 20.

Figure 26:
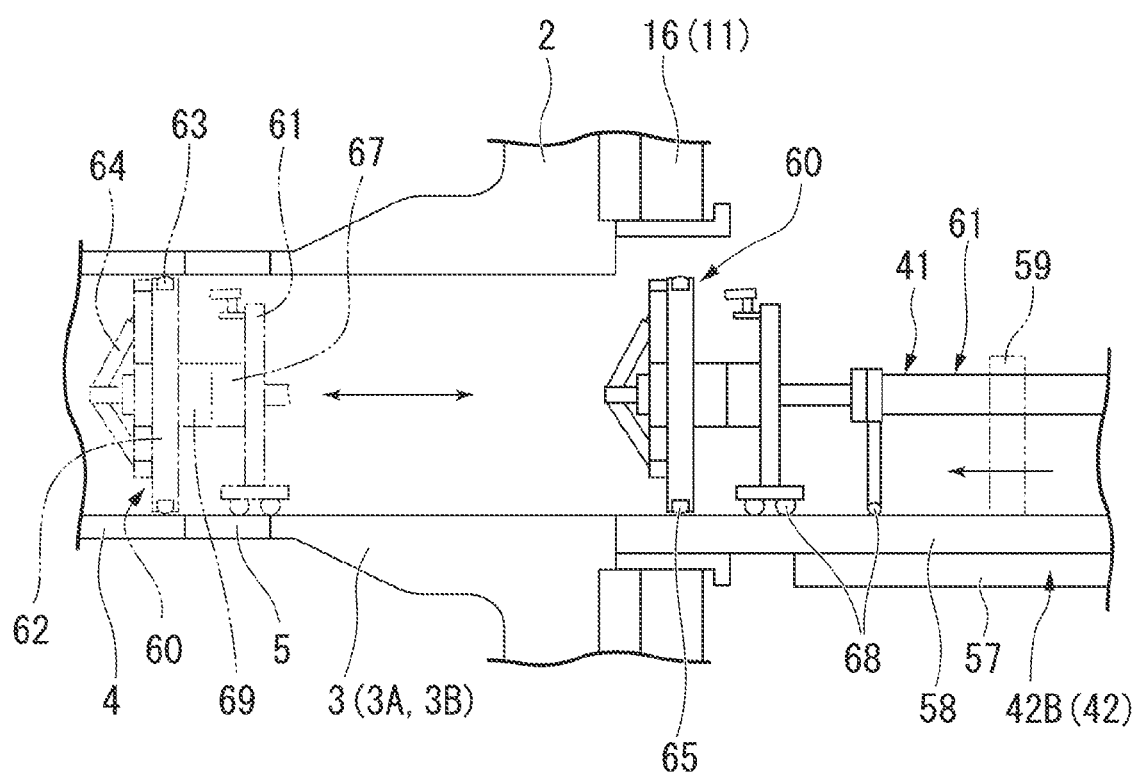
FIG. 26 is a cross-sectional view specifically illustrating a nozzle stub sealing step using the nozzle stub working system according to the embodiment of the present invention.

Next, as shown in FIG. 22, as a nozzle stub blocking step S2, the nozzle stub 3 is blocked at the inner position in relation to the work position when seen from the reactor vessel 2 inside the nozzle stub 3. That is, the supervising computer 15 transmits a nozzle stub blocking device dropping command to the first control panel 14A. For this reason, the first control panel 14A drives the elevating device 44 to drop the nozzle stub blocking device 41 temporarily placed at a predetermined arrangement position in advance into the platform unit 11, so that it is placed on the support plate 58 of the second moving unit 42B (refer to FIG. 1). When the nozzle stub blocking device 41 is placed on the support plate 58 by the elevating device 44, the first control panel 14A transmits a nozzle stub blocking device dropping completion notification to the supervising computer 15. Then, the supervising computer 15 receives the notification and transmits a plug inserting command to the second control panel 14B. Accordingly, as shown in FIG. 26, the second control panel 14B drives the second moving unit 42B to select several inlet nozzle stubs 3A or several outlet nozzle stubs 3B, rotates the platform unit so that the slide direction L1 of the second moving unit 42B is aligned with the nozzle stub 3, and slides the slide plate 57 so that the nozzle stub blocking device 41 may move from the support plate 58 into the nozzle stub 3. Then, when the pressing member 59 of the second moving unit 42B is moved from the base end toward the front end, the guide portion 61 of the nozzle stub blocking device 41 is extruded by the pressing member 59, and the seal body 60 and the guide portion 61 of the nozzle stub blocking device 41 travel into the nozzle stub 3 through the casters 65 and 68 thereof.

The second control panel 14B stops the movement of the pressing member 59 of the second moving unit 42B when the seal body 60 is inserted up to a position as an inner position in relation to the welding portion 5 as a predetermined work position when seen from the reactor vessel 2, and transmits a plug insertion completion notification to the supervising computer 15. Then, the supervising computer 15 receives the notification and transmits a plug installation command to the fifth control panel 14E. For this reason, the fifth control panel 14E drives the operating water supply device 70 to supply operating water, so that the seal plug 62 is fixed to the inner surface of the nozzle stub 3 by the fixing jack 64 of the nozzle stub blocking device 41. Furthermore, the fifth control panel 14E drives the compressed air supply device 71 to supply compressed air, so that the inflatable seal 63 is expanded to seal a gap between the seal plug 62 and the inner surface of the nozzle stub 3. Next, the fifth control panel 14E separates the connection portion 67 of the guide portion 61 and the subject connection portion 69 of the seal body 60 from each other, and transmits a plug installation completion notification to the supervising computer 15. Then, the supervising computer 15 receives the notification and transmits a guide portion retreating command to the second control panel 14B. Then, the second control panel 14B drives the second moving unit 42B again to retract the pressing member 59, the slide plate 57, and the support plate 58. Accordingly, the guide portion 61 is separated and retracted from the seal plug 62, and only the seal body 60 stays inside the nozzle stub 3.

Next, when the guide portion 61 is retracted up to the inner position of the platform unit 11 by the second moving unit 42B, the second control panel 14B transmits a guide portion retreating completion notification to the supervising computer 15. The supervising computer 15 receives the notification and transmits a guide portion lifting command to the first control panel 14A. Then, the first control panel 14A drives the elevating device 44 to lift the guide portion 61 inside the platform unit 11 up to the working floor 12 so that it is temporarily placed at a predetermined arrangement position on the working floor 12, and transmits a guide portion lifting completion notification to the supervising computer 15.

When the above-described steps are repeated for each nozzle stub 3, in all nozzle stubs 3, it is possible to block the inner position in relation to the welding portion 5 as the work position between the nozzle stub 3 and the pipe 4 when seen from the reactor vessel 2. For this reason, as described below, it is possible to reliably prevent foreign matter from intruding into the nozzle stub 3 at the time of performing work at the welding portion 5 inside the nozzle stub 3 using the working device 40. Here, the supervising computer 15 manages whether the nozzle stub blocking step is performed for each nozzle stub 3. When the nozzle stub blocking step is performed for all the nozzle stubs 3, that is, a guide portion lifting completion notification corresponding to all nozzle stubs 3 is received, a decontaminating step S3 is performed as shown in FIG. 22.

That is, the supervising computer 15 transmits a decontaminating unit dropping command to the first control panel 14A. Accordingly, the first control panel 14A first drives the elevating device 44 to drop the decontaminating unit 84 on the working floor 12 into the platform unit 11 so that it is placed on the support plate 58 of the second moving unit 42B, and transmits a decontaminating unit dropping completion notification to the supervising computer 15 (refer to FIGS. 1 and 2). The supervising computer 15 receives the notification and transmits a decontaminating unit inserting command to the second control panel 14B. Accordingly, the second control panel 14B drives the second moving unit 42B to insert the decontaminating unit 84 into a predetermined nozzle stub 3. Then, when the insertion of the decontaminating unit 84 is completed, the second control panel 14B transmits a decontaminating unit inserting completion notification to the supervising computer 15. Then, the supervising computer 15 receives the notification and transmits a decontaminating start command to the sixth control panel 14F. Accordingly, the sixth control panel 14F drives the blasting equipment 126 and the water supply device 125 to blast the blasting material into the nozzle stub 3, so that the radiation material adhered to the inner surface may be removed.

Then, when a predetermined condition is satisfied, that is, the blasting material is blasted for a predetermined time or a predetermined amount of the blasting material is blasted, the sixth control panel 14F stops the driving of the blasting equipment 126 and the water supply device 125, and transmits a decontaminating completion notification to the supervising computer 15. Then, the supervising computer 15 receives the notification and transmits a decontaminating unit retreating command to the second control panel 14B. Then, the second control panel 14B drives the second moving unit 42B again to retract the support plate 58 and the slide plate 57. Then, when the decontaminating unit 84 is moved into the platform unit 11 by the second moving unit 42B, the second control panel 14B transmits a decontaminating unit retreating completion notification to the supervising computer 15. The supervising computer 15 receives the notification and transmits a decontaminating unit inserting command to the second control panel 14B again. Accordingly, the second control panel 14B drives the second moving unit 42B to insert the decontaminating unit 84 into the next nozzle stub 3, and the decontaminating work is repeated as described above.

The supervising computer 15 manages whether the decontaminating step S3 is performed for all nozzle stubs 3. When the decontaminating step S3 is performed for all nozzle stubs 3, that is, the decontaminating unit retreating completion notification for all nozzle stubs 3 is received, the supervising computer 15 transmits a decontaminating unit lifting command to the first control panel 14A. Accordingly, the first control panel 14A drives the elevating device 44 to grip and move up the decontaminating unit 84 inside the platform unit 11, so that it is disposed at a predetermined arrangement position of the working floor 12. Then, when the arrangement is completed, the first control panel transmits a decontaminating unit lifting completion notification to the supervising computer 15.

Figure 27:
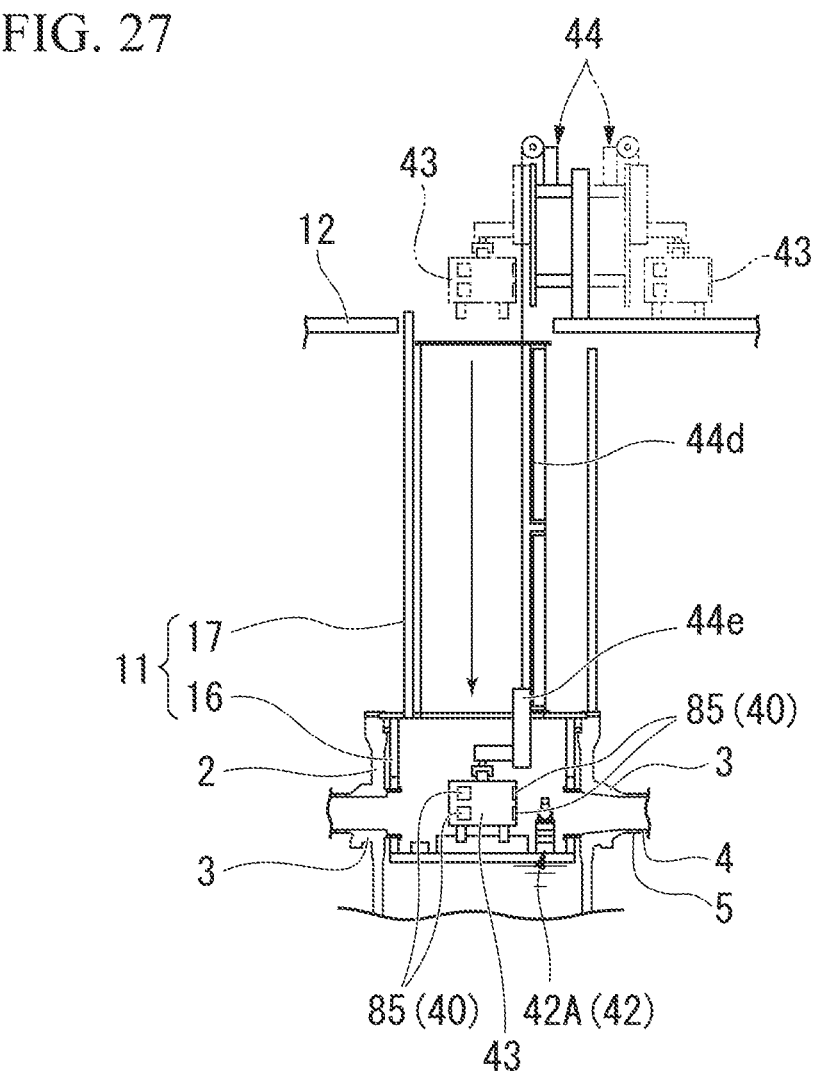
FIG. 27 is a cross-sectional view specifically illustrating a state where an UT inspecting unit is prepared in an UT inspection step before maintenance using the nozzle stub working system according to the embodiment of the present invention.

As shown in FIG. 22, the supervising computer 15 receives the notification and performs an ultrasonic inspection step S4 before maintenance. That is, the supervising computer 15 transmits a UT inspecting unit dropping command to the first control panel 14A. As shown in FIG. 27, the first control panel 14A receives the command and drives the elevating device 44 to drop the storage device 43 receiving the UT inspecting unit 85 into the platform unit 11. Then, when the dropping is completed, the first control panel transmits a UT inspecting unit dropping completion notification to the supervising computer 15.

Figure 28:
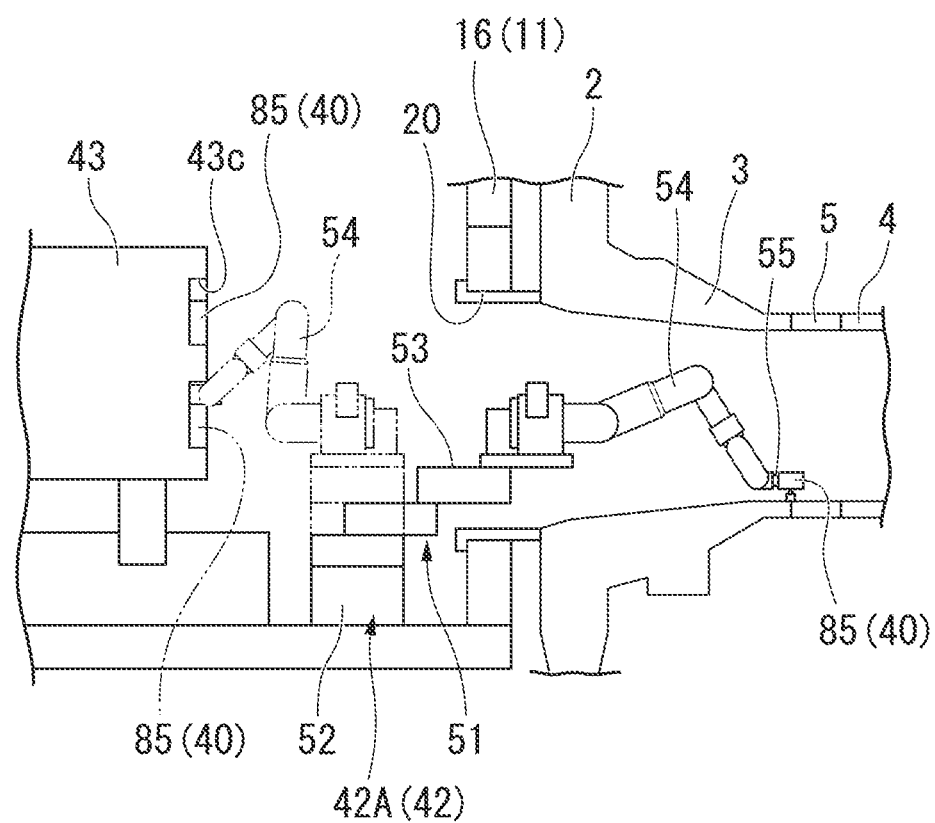
FIG. 28 is a cross-sectional view specifically illustrating an ultrasonic test in the UT inspection step before maintenance using the nozzle stub working system according to the embodiment of the present invention.

The supervising computer 15 receives the notification and transmits an ultrasonic inspection command to the third control panel 14C. As shown in FIG. 28, the third control panel 14C drives the first moving unit 42A on the basis of the command to attach each UT inspecting unit 85 received in the storage device 43 to the connection portion 55 of the front end of each manipulator 54. Here, in the embodiment, three manipulators 54 are provided to correspond to the number of pairs of the inlet nozzle stub 3A and the outlet nozzle stub 3B. For this reason, first, for example, in all inlet nozzle stubs 3A, the ultrasonic test is simultaneously performed by the UT inspecting unit 85 attached to each manipulator 54.

That is, the third control panel 14C drives the first moving unit 42A to insert the UT inspecting unit 85 attached to each manipulator 54 up to the welding portion 5 between each inlet nozzle stub 3A and the pipe 4. Then, when the UT inspection unit is located at the welding portion 5, the UT inspecting unit 85 is driven. First, the third control panel 14C drives the position adjusting unit 132 to dispose the pair of probes 130 at a position distant from the inner surface of the nozzle stub 3 by a predetermined distance. Next, the third control panel 14C drives the unit body 131 to oscillate an ultrasonic wave from the pair of probes 130, detects the reflected ultrasonic waves, and analyzes the unit body 131. Furthermore, the third control panel 14C drives the first moving unit 42A so that the UT inspecting unit 85 moves in the circumferential direction and the axial direction of the nozzle stub 3 to inspect the entire welding portion 5 of the inner surface of the nozzle stub 3. Accordingly, it is possible to perform the ultrasonic test in the entire area of the welding portion 5 of each inlet nozzle stub 3A using the UT inspecting unit 85 (step S4a). Then, the analysis result obtained from the unit body 131 of each UT inspecting unit 85 is transmitted as UT inspection data before maintenance, corresponding to the position of the inner surface of the nozzle stub 3 in the axial direction and the circumferential direction, to the supervising computer 15 through the third control panel 14C.

Figure 29:
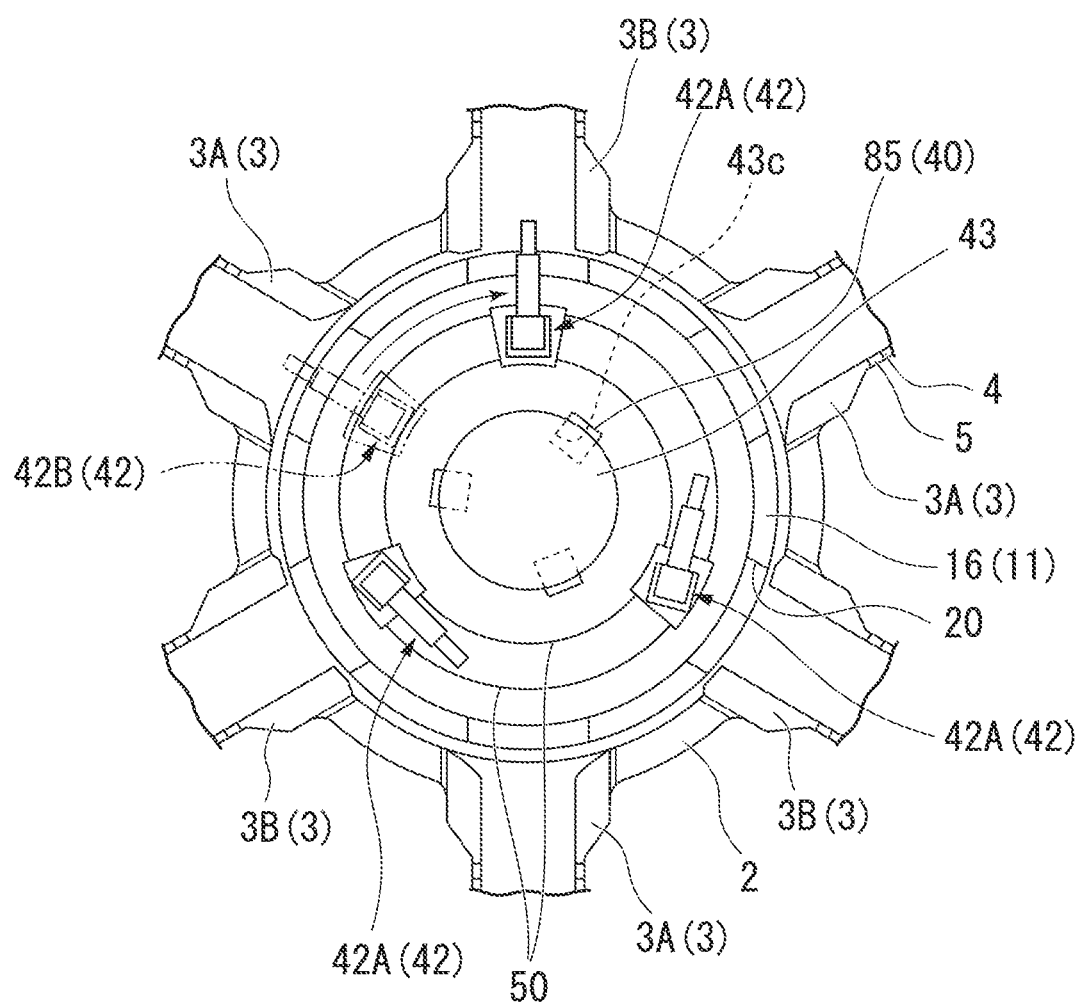
FIG. 29 is a top cross-sectional view specifically illustrating a state of moving from an inlet nozzle stub to an outlet nozzle stub in the UT inspection step before maintenance using the nozzle stub working system according to the embodiment of the present invention.

Next, as shown in FIG. 29, the third control panel 14C drives the first moving unit 42A to retract the UT inspecting unit 85 from the inlet nozzle stub 3A and insert it into each outlet nozzle stub 3B. In the same manner as above, the ultrasonic test is performed therein and the result is transmitted as UT inspection data before maintenance to the supervising computer 15 through the third control panel 14C. Then, the third control panel 14C drives the first moving unit 42A to hand over the UT inspecting unit 85 to each receiving concave portion 43c of the storage device 43.

Figure 30:
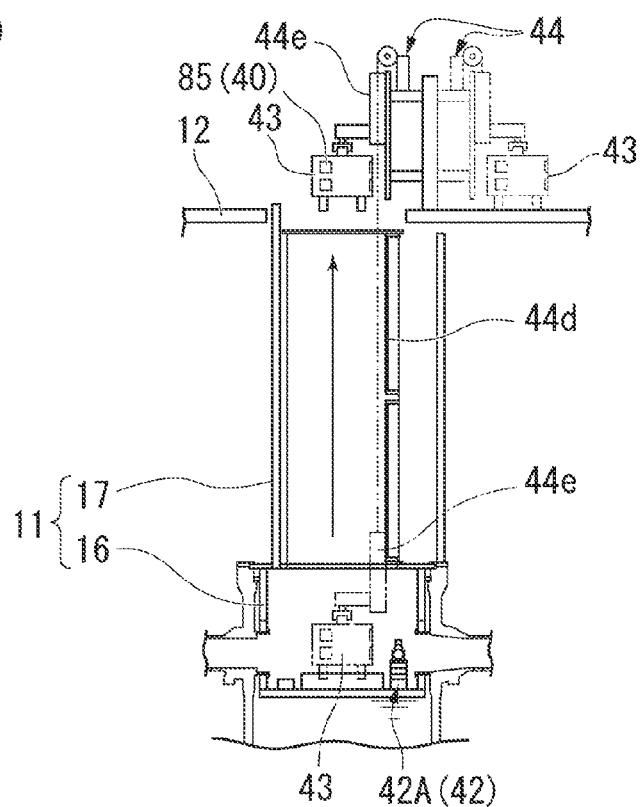
FIG. 30 is a cross-sectional view specifically illustrating a state where the UT inspecting unit is lifted in the UT inspection step before maintenance using the nozzle stub working system according to the embodiment of the present invention.

When the UT inspection data before maintenance for all nozzle stubs 3 is received, the supervising computer 15 transmits a UT inspecting unit lifting command to the first control panel 14A. As shown in FIG. 30, the first control panel 14A drives the elevating device 44 on the basis of the command so that the storage device 43 receiving the UT inspecting unit 85 is lifted from the inside of the platform unit 11 onto the working floor 12 and is disposed at a predetermined arrangement position. Next, the first control panel 14A transmits a UT inspecting unit lifting completion notification to the supervising computer 15. The supervising computer 15 analyzes the input ultrasonic inspection data before maintenance, and creates reparing area data representing the position and the size of the area including the distinguished defective portion set as a reparing area on the basis of the UT inspection data before maintenance. Furthermore, when the defective portion is not distinguished from the UT inspection data before maintenance, it is determined that there is no defect and all works are ended (step S4b).

Figure 31:
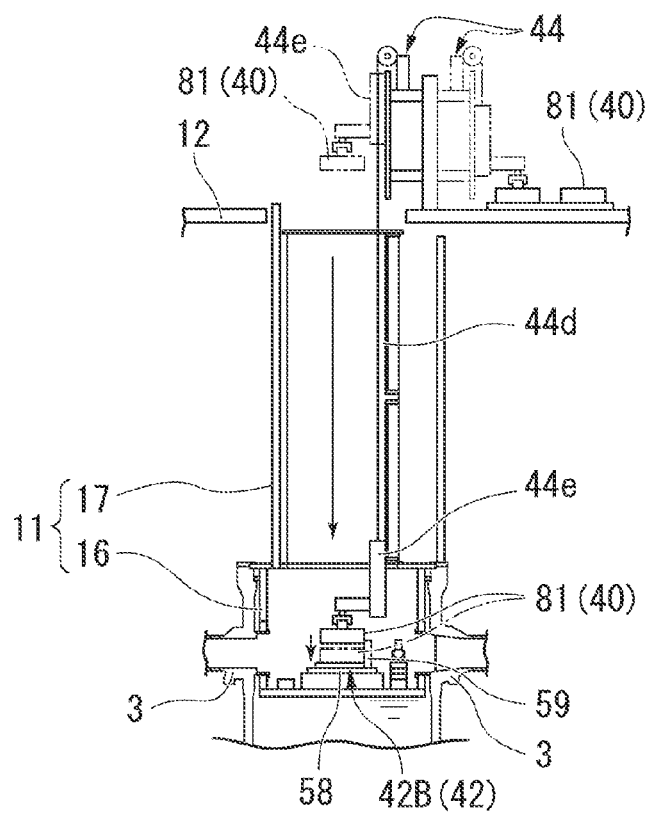
FIG. 31 is a cross-sectional view specifically illustrating a state where a cutting unit is prepared in a cutting step using the nozzle stub working system according to the embodiment of the present invention.
Figure 32:
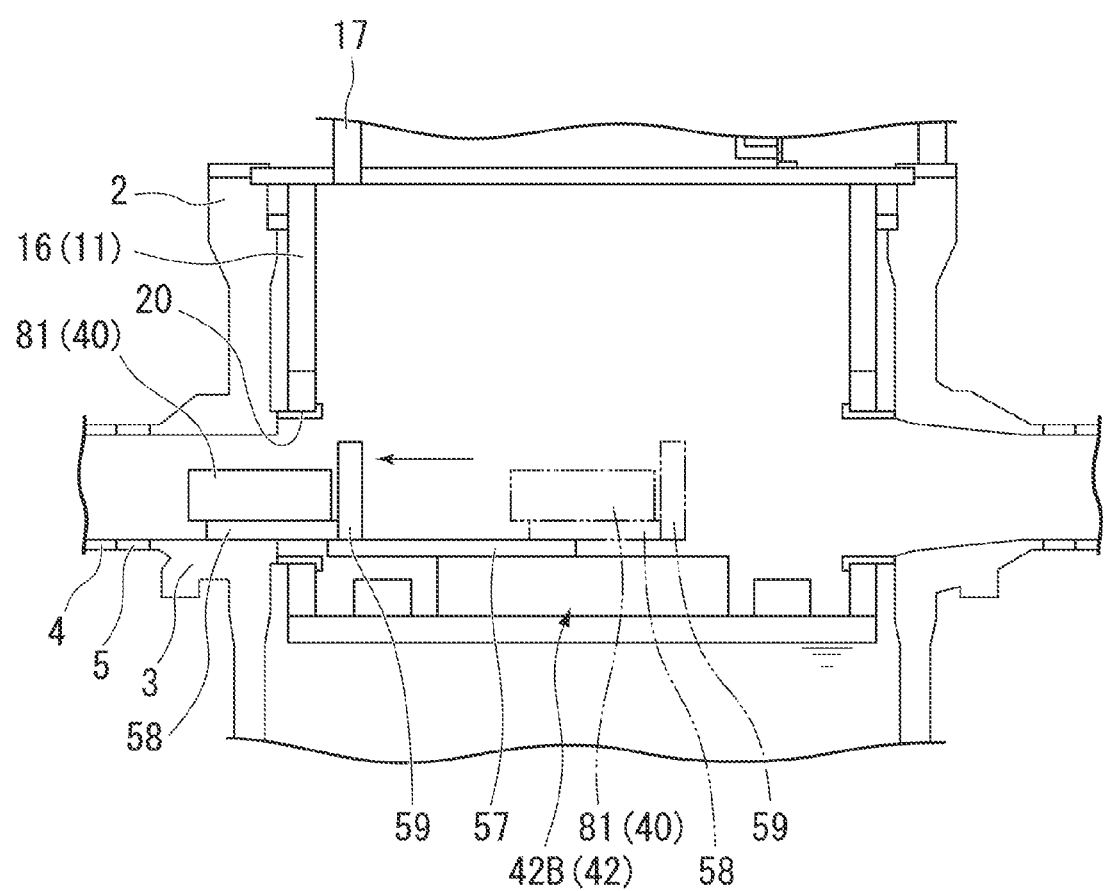
FIG. 32 is a cross-sectional view specifically illustrating a state where the cutting unit is inserted into the nozzle stub in the cutting step using the nozzle stub working system according to the embodiment of the present invention.
Figure 33:
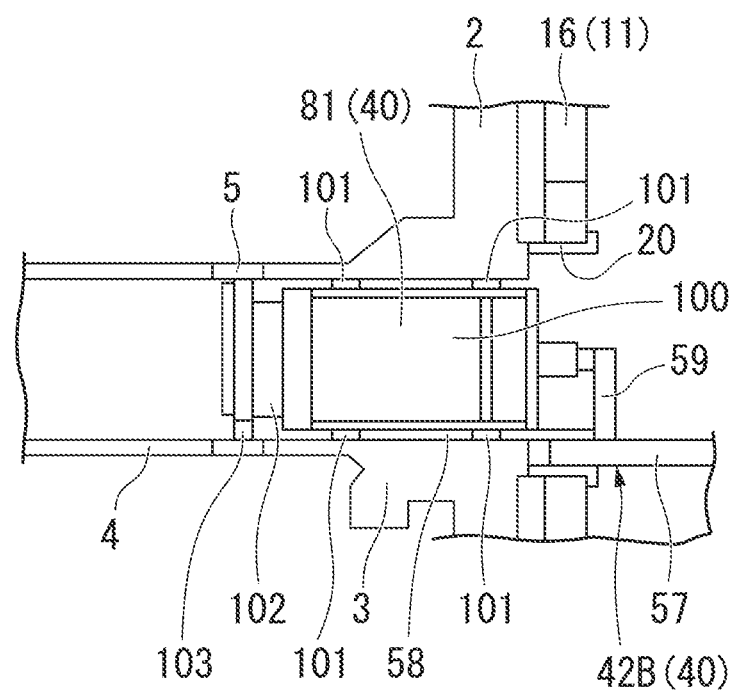
FIG. 33 is a cross-sectional view specifically illustrating a state where cutting is performed by the cutting unit in the cutting step using the nozzle stub working system according to the embodiment of the present invention.

On the other hand, when the defective portion is distinguished and the reparing area data is created, the supervising computer 15 performs the next cutting step S5 as shown in FIG. 22. That is, the supervising computer 15 transmits a cutting unit dropping command to the first control panel 14A. First, as shown in FIG. 31, the first control panel 14A drives the elevating device 44 to drop the cutting unit 81 on the working floor 12 into the platform unit 11 and place it on the support plate 58 of the second moving unit 42B, and transmits a cutting unit dropping completion notification to the supervising computer 15. The supervising computer 15 receives the notification and transmits a cutting unit inserting command to the second control panel 14B. Accordingly, as shown in FIGS. 32 and 33, the second control panel 14B drives the second moving unit 42B to insert the cutting unit 81 into a predetermined nozzle stub 3.

Then, when the insertion of the cutting unit 81 is completed, the second control panel 14B transmits a cutting unit inserting completion notification to the supervising computer 15, and the supervising computer 15 receives the notification and transmits a reparing area cutting command to the fourth control panel 14D. For this reason, as shown in FIG. 33, the fourth control panel 14D drives the operating water supply device 106 to supply operating water to the hydraulic cylinder 26 of the fixing unit 101 in the cutting unit 81, so that the contact portion 29b comes into contact with the inner surface of the nozzle stub 3 and the pipe body 100 is fixed to the inner surface of the nozzle stub 3. Then, when the fixing is completed by the fixing unit 101, the fourth control panel 14D transmits a cutting unit fixing completion notification to the supervising computer 15, and drives the disk rotational driving section (not shown) to rotate the disk 102, so that the reparing area is cut by the cutting blade 103d.

Here, the supervising computer 15 receives the cutting unit fixing completion notification from the fourth control panel 14D and transmits a moving unit retreating command to the second control panel 14B. Accordingly, the second control panel 14B drives the second moving unit 42B to retract the slide plate 57 and the support plate 58. Since the cutting unit 81 is fixed to the inner surface of the nozzle stub 3 by the fixing unit 101, only the slide plate 57, the support plate 58, and the pressing member 59 of the second moving unit 42B are retracted. Then, when the slide plate 57, the support plate 58, and the pressing member 59 are moved into the platform unit 11, the second control panel 14B transmits a moving unit retreating completion notification to the supervising computer 15. The supervising computer 15 receives the notification and transmits the cutting unit inserting command to the first control panel 14A again. Accordingly, the first control panel 14A drives the elevating device 44 to drop the next cutting unit 81 from the working floor 12 into the platform unit 11, so that it is placed on the support plate 58 of the second moving unit 42B. Subsequently, the second control panel 14B and the fourth control panel 14D inserts the cutting unit 81 into another inlet nozzle stub 3A and starts cutting therein under the control of the supervising computer 15. In this manner, the cutting is simultaneously performed in three inlet nozzle stubs 3A by the cutting unit 81. Furthermore, for example, when the cutting blade is rotated for a predetermined time, the fourth control panel 14D determines that the cutting blade 103d cannot be used any more, and drives the exchange driving section 103e to dispose another cutting blade 103d at the cuttable position.

Figure 34:
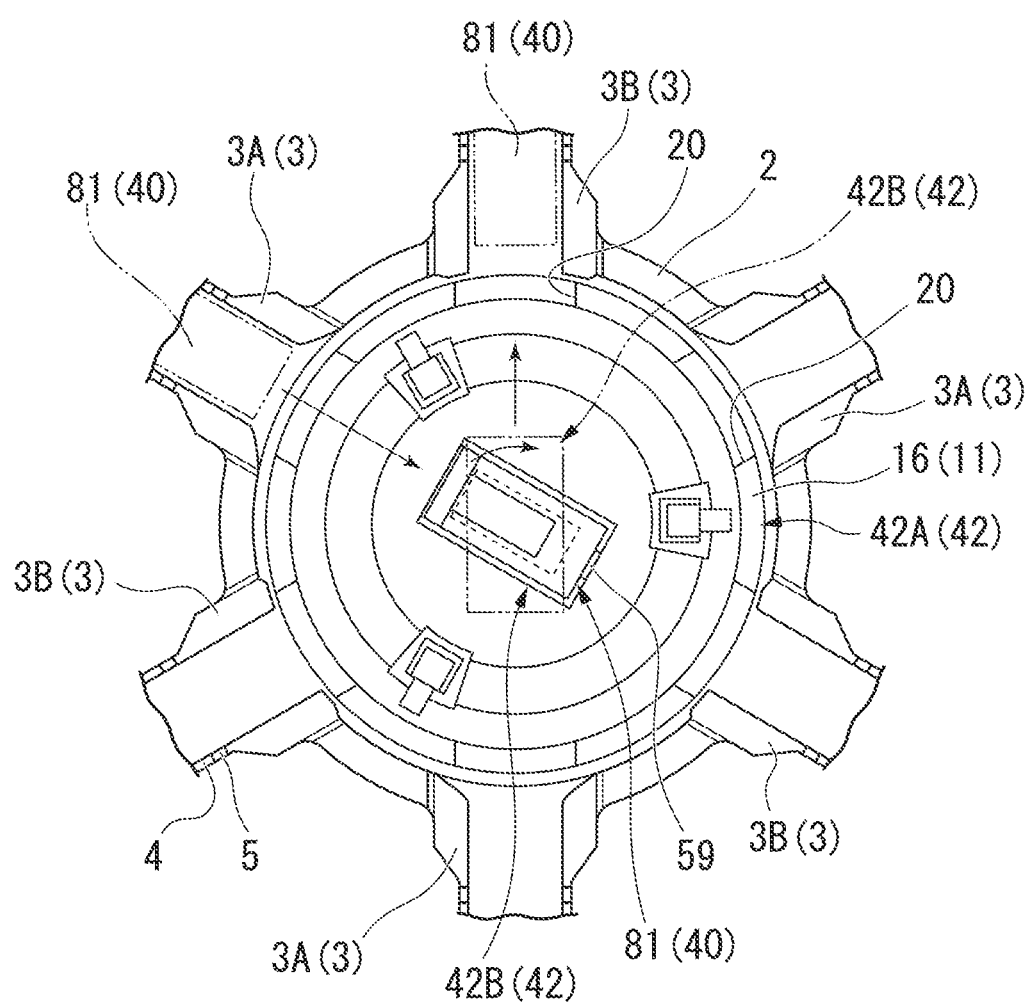
FIG. 34 is a top cross-sectional view specifically illustrating a state of moving from the inlet nozzle stub to the outlet nozzle stub in the cutting step using the nozzle stub working system according to the embodiment of the present invention.

Then, for example, when the cutting is completed by rotting the cutting blade for a predetermined time, the grinding driving section 104c of the grinding unit 104 is driven to perform grinding on the cut area using the grinder 104b. Then, when the grinding is completed by rotating the grinder at a predetermined condition, for example, for a predetermined time, the fourth control panel 14D transmits a cutting completion notification to the supervising computer 15. The supervising computer 15 receives the notification and transmits a cutting unit receiving command to the second control panel 14B. Accordingly, the second control panel 14B drives the second moving unit 42B to insert the slide plate 57 and the support plate 58 into the corresponding inlet nozzle stub 3A. When the support plate 58 is inserted below the cutting unit 81, the second control panel 14B transmits a support plate inserting completion notification to the supervising computer 15. Then, the supervising computer 15 receives the notification and transmits a fixing releasing command to the fourth control panel 14D. Then, the fourth control panel 14D releases the state where the cutting unit 81 is fixed by the fixing unit 101 on the basis of the command, and transmits a fixing releasing notification to the supervising computer 15. Accordingly, the cutting unit 81 is handed over to the support plate 58 of the second moving unit 42B. Then, the supervising computer 15 receives the notification and transmits a cutting unit lifting command to the second control panel 14B. As shown in FIG. 34, the second control panel 14B drives the second moving unit 42B on the basis of the command to lift the cutting unit 81 from the inlet nozzle stub 3A and insert it into the corresponding outlet nozzle stub 3B.

Figure 35:
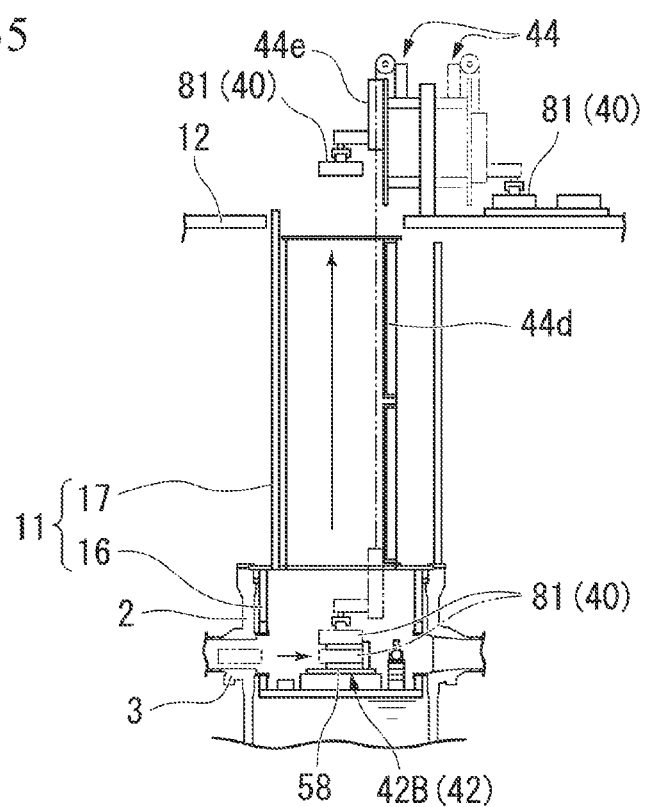
FIG. 35 is a cross-sectional view specifically illustrating a state where the cutting unit is lifted in the cutting step using the nozzle stub working system according to the embodiment of the present invention.

Subsequently, in the same manner, the second control panel 14B and the fourth control panel 14D cut the reparing area of the inner surface of the outlet nozzle stub 3B using the cutting unit 81 under the control of the supervising computer 15. Then, in the same manner, when a cutting completion notification is received from the fourth control panel 14D, the fixing of the cutting unit 81 with respect to the nozzle stub 3 is released and the cutting unit is retracted from the inside of the platform unit 11 under the control of the supervising computer 15. When the cutting unit 81 is retracted into the platform unit 11 by the second moving unit 42B, the second control panel 14B transmits a cutting unit retreating completion notification to the supervising computer 15. As shown in FIG. 35, the supervising computer 15 receives the notification and transmits a cutting unit lifting command to the first control panel 14A. Then, the first control panel 14A receives the notification, drives the elevating device 44 to lift the cutting unit 81, and transmits a cutting unit lifting completion notification to the supervising computer 15.

Figure 36:
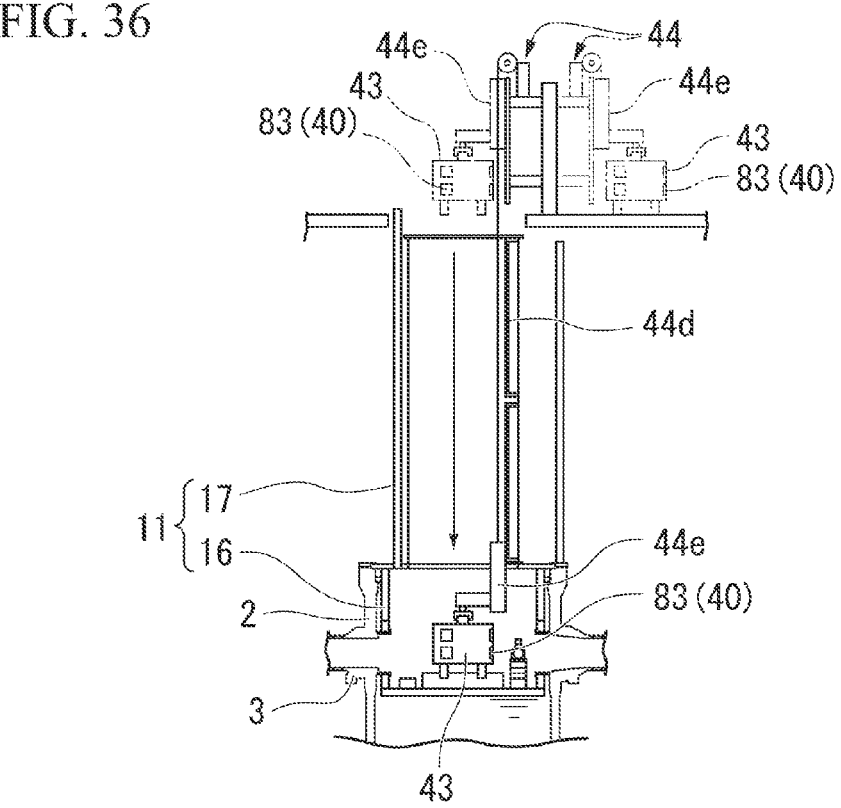
FIG. 36 is a cross-sectional view specifically illustrating a state where a collecting unit is prepared in a first collecting step using the nozzle stub working system according to the embodiment of the present invention.
Figure 37:
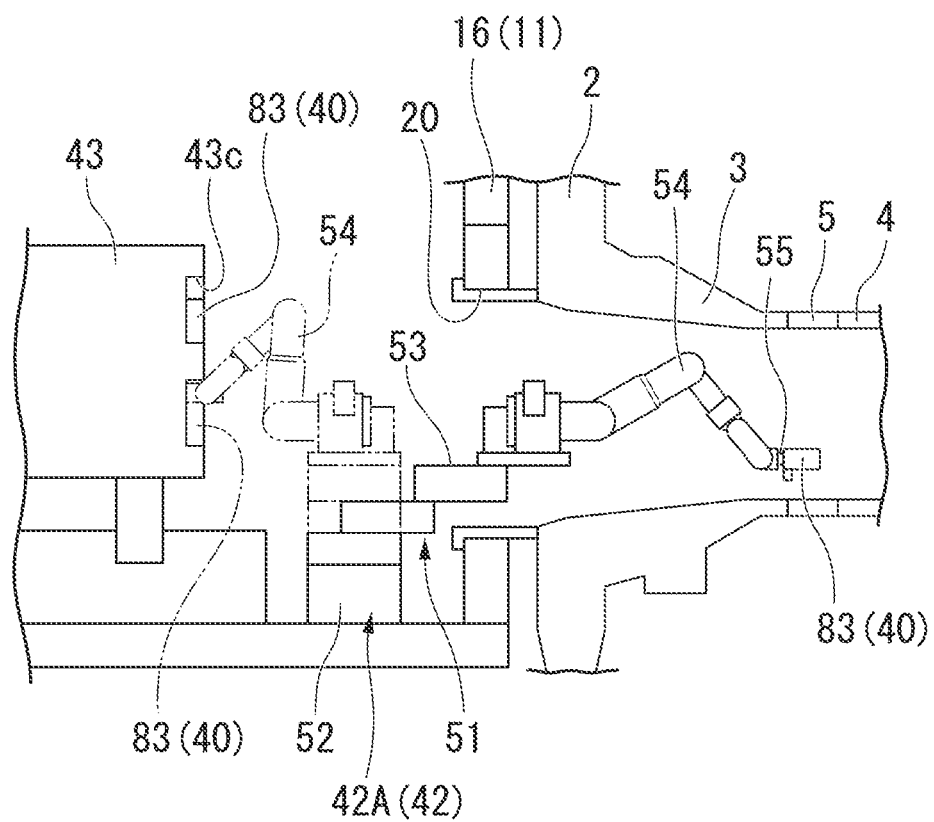
FIG. 37 is a cross-sectional view specifically illustrating a collecting work in the first collecting step using the nozzle stub working system according to the embodiment of the present invention.

When the supervising computer 15 receives the cutting unit lifting completion notification corresponding to all cutting units 81, the supervising computer performs the next first collecting step S6 as shown in FIG. 22. That is, the supervising computer 15 transmits a collecting unit dropping command to the first control panel 14A. As shown in FIG. 36, the first control panel 14A drives the elevating device 44 to drop the storage device 43 receiving the collecting unit 83 into the platform unit 11 on the basis of the command, and transmits a collecting unit dropping completion notification to the supervising computer 15 when the dropping is completed. The supervising computer 15 receives the notification and transmits a collecting work command to the third control panel 14C. As shown in FIG. 37, the third control panel 14C drives the first moving unit 42A to attach each collecting unit 83 received in the storage device 43 to the connection portion 55 of each manipulator 54 on the basis of the command. The third control panel 14C drives the collecting equipment 109 to collect waste produced by the cutting or the like inside the nozzle stub 3 using the attached collecting unit 83.

Figure 38:
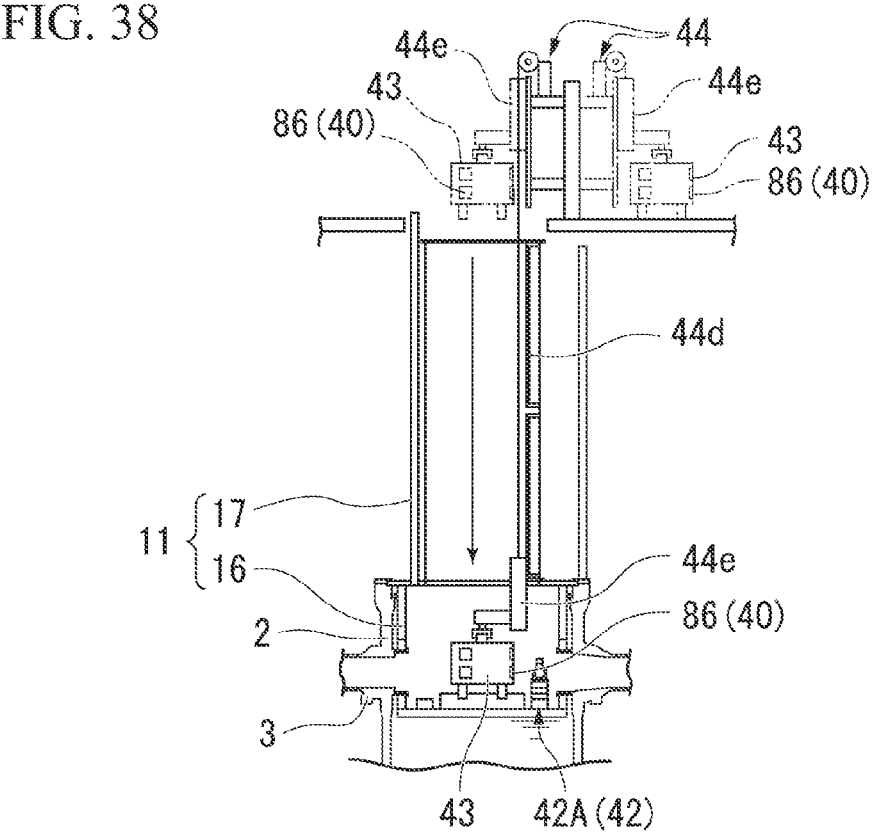
FIG. 38 is a cross-sectional view specifically illustrating a state where a PT inspecting unit is prepared in a PT inspection step before maintenance using the nozzle stub working system according to the embodiment of the present invention.

When the collecting work is performed in the outlet nozzle stub 3B after the collecting work is performed in the inlet nozzle stub 3A as in the ultrasonic inspection step S4 before maintenance, the third control panel 14C transmits a collecting completion notification to the supervising computer 15. In the same manner, the supervising computer 15 receives the notification, lifts the storage device 43, and performs the next penetration inspection step S7 before maintenance as shown in FIG. 22. That is, the supervising computer 15 transmits a PT inspecting unit dropping command to the first control panel 14A. As shown in FIG. 38, the first control panel 14A drives the elevating device 44 to drop the storage device 43 receiving the PT inspecting unit 86 into the platform unit 11 on the basis of the command, and transmits a PT inspecting unit dropping completion notification to the supervising computer 15 after the dropping is completed.

Figure 39:
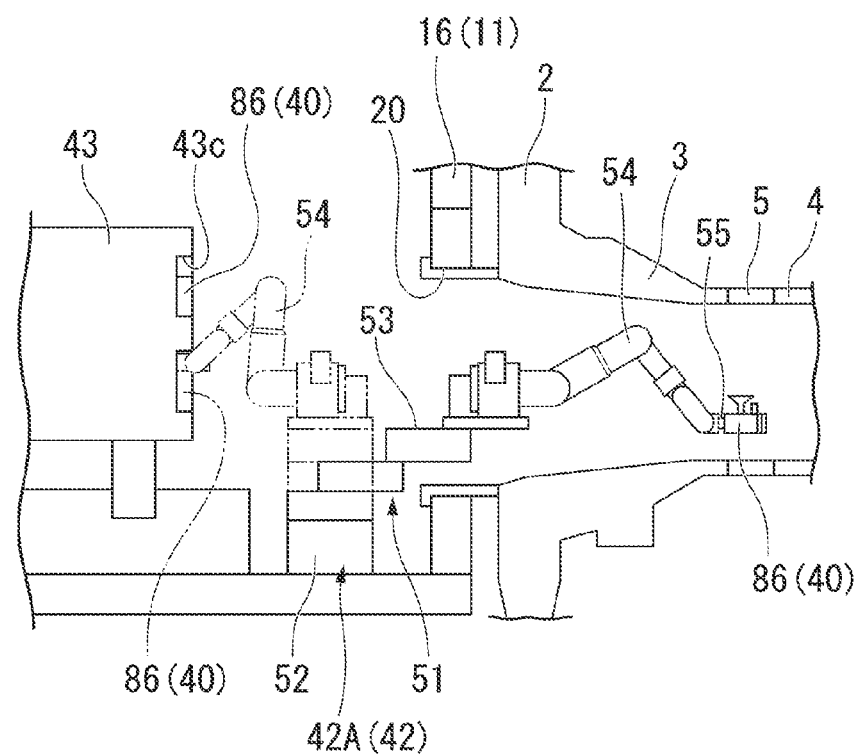
FIG. 39 is a cross-sectional view specifically illustrating a penetration test in the PT inspection step before maintenance using the nozzle stub working system according to the embodiment of the present invention.

The supervising computer 15 receives the notification and a penetration inspection command to the third control panel 14C. As shown in FIG. 39, the third control panel 14C receives the command and drives the first moving unit 42A to attach each PT inspecting unit 86 received in the storage device 43 to each manipulator 54. Then, as in the ultrasonic inspection step S4, the third control panel 14C performs the penetration test on the reparing area subjected to the cutting in the inlet nozzle stub 3A by using the attached PT inspecting unit 86, and also performs the penetration test on the reparing area subjected to the cutting in the outlet nozzle stub 3B (step S7a). Then, the penetration test is performed on each nozzle stub 3, and the defect position information acquired from the PT inspecting unit 86 is transmitted as PT inspection data before maintenance to the supervising computer 15. Then, the third control panel 14C drives the first moving unit 42A to hand over the PT inspecting unit 86 to each receiving concave portion 43c of the storage device 43. Furthermore, even when no defect is detected, the PT inspection data before maintenance is transmitted. Then, when the PT inspection data before maintenance for all nozzle stubs 3 is received, the supervising computer 15 transmits a PT inspecting unit lifting command to the first control panel 14A. The first control panel 14A drives the elevating device 44 to lift the storage device 43 receiving the PT inspecting unit 86 from the inside of the platform unit 11 onto the working floor 12 and dispose it at a predetermined position on the basis of the command.

Next, the first control panel 14A transmits a PT inspecting unit lifting completion notification to the supervising computer 15. Here, the supervising computer 15 determines whether a defect is detected by referring to the received PT inspection data before maintenance (step S7b). When no defect is found, the supervising computer receives the PT inspecting unit lifting completion notification and performs a welding step S9. On the other hand, when a defect is detected, the supervising computer 15 receives a PT inspecting unit lifting completion notification and performs a defect dimension measuring step S8.

Figure 40:
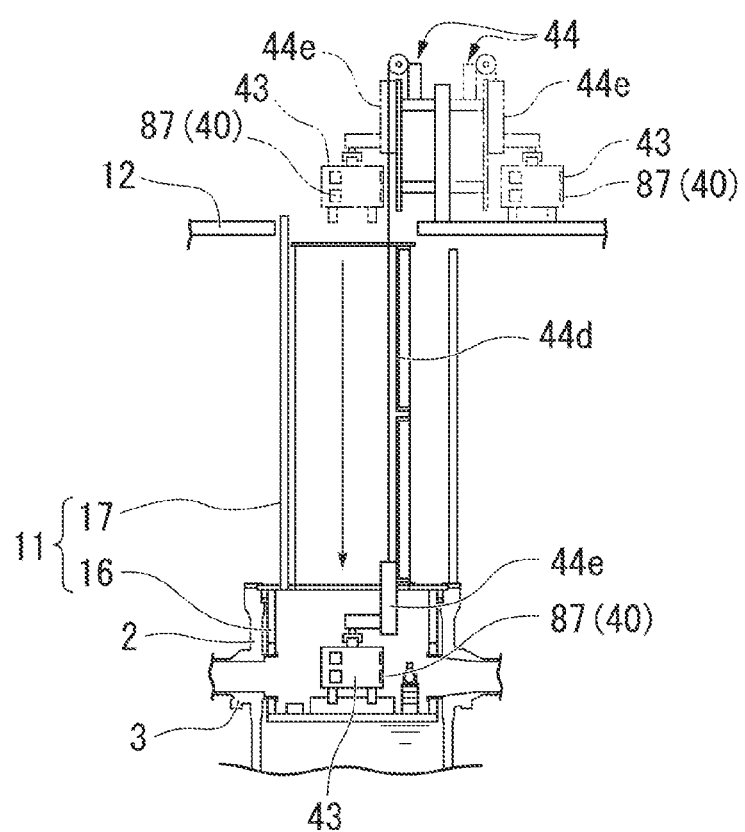
FIG. 40 is a cross-sectional view specifically illustrating a state where a dimension measuring unit is prepared in a dimension measuring step before maintenance using the nozzle stub working system according to the embodiment of the present invention.
Figure 41:
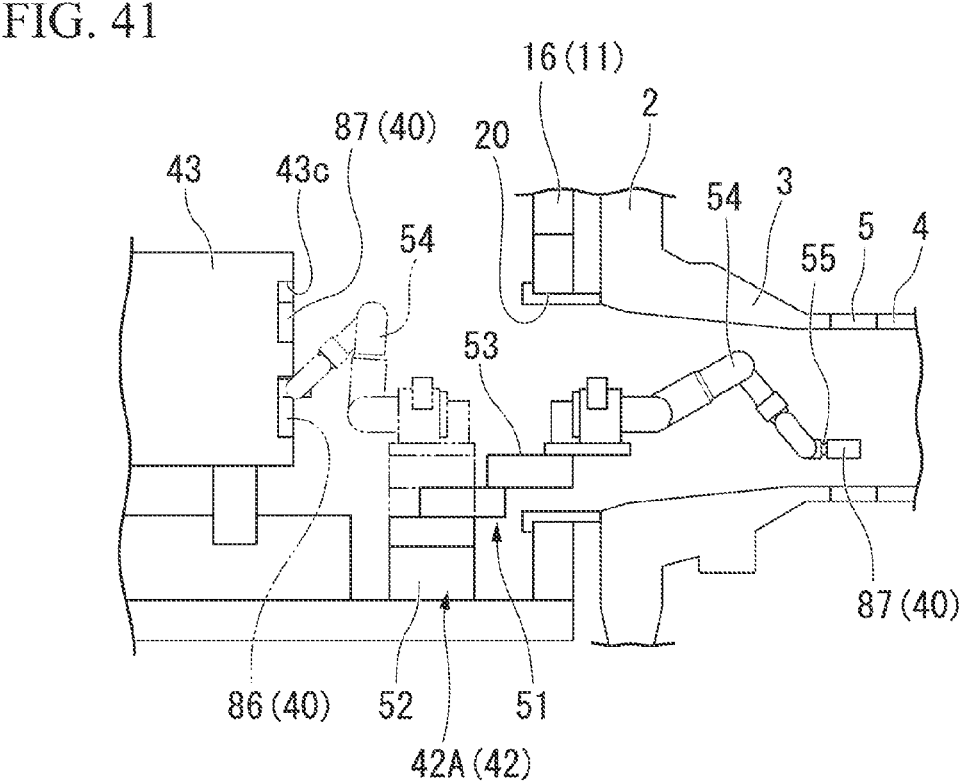
FIG. 41 is a cross-sectional view specifically illustrating a dimension measuring work in the dimension measuring step before maintenance using the nozzle stub working system according to the embodiment of the present invention.

That is, the supervising computer 15 transmits a dimension measuring unit dropping command to the first control panel 14A. As shown in FIG. 40, the first control panel 14A drives the elevating device 44 to drop the storage device 43 receiving the dimension measuring unit 87 into the platform unit 11 on the basis of the command, and transmits a dimension measuring unit dropping completion notification to the supervising computer 15 after the dropping is completed. The supervising computer 15 receives the notification and transmits a dimension measuring command to the third control panel 14C. As shown in FIG. 41, the third control panel 14C receives the command and drives the first moving unit 42A to attach each dimension measuring unit 87 received in the storage device 43 to each manipulator 54. The third control panel 14C measures the dimension of the defect detected at the inlet nozzle stub 3A in the penetration inspection step S7 before maintenance using the attached dimension measuring unit 87, and transmits the result as defect dimension data to the supervising computer 15 through the third control panel 14C. Then, when all defects are measured in the inlet nozzle stub 3A, the measurement is also performed in the outlet nozzle stub 3B. Then, in the same manner, the result is transmitted as defect dimension data to the supervising computer 15 through the third control panel 14C.

The third control panel 14C drives the first moving unit 42A to hand over the dimension measuring unit 87 to each receiving concave portion 43c of the storage device 43. The supervising computer 15 transmits a dimension measuring unit lifting command to the first control panel 14A. Then, the first control panel 14A drives the elevating device 44 to lift the storage device 43 receiving the dimension measuring unit 87 from the inside of the platform unit 11 onto the working floor 12 and dispose it at a predetermined arrangement position on the basis of the command. Then, the first control panel 14A transmits a dimension measuring unit lifting completion notification to the supervising computer 15. On the other hand, when the defect dimension data for all defects stored on the PT inspection data before maintenance is acquired, the supervising computer 15 determines whether re-cutting is necessary on the basis of the measurement result of the defect dimension data and the predetermined reference value. When it is determined that the re-cutting is needed, the supervising computer 15 performs the same work from the cutting step S5 again as shown in FIG. 22. On the other hand, when it is determined that the re-cutting is not needed, the supervising computer 15 performs the next welding step S9.

Figure 42:
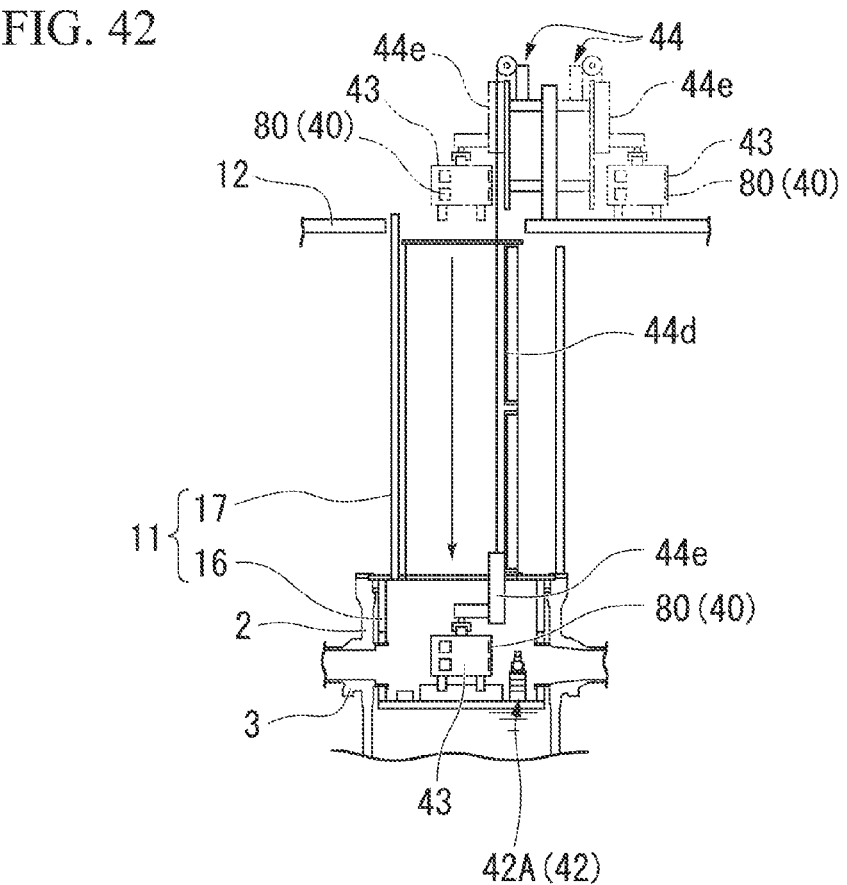
FIG. 42 is a cross-sectional view specifically illustrating a state where a welding unit is prepared in a welding step using the nozzle stub working system according to the embodiment of the present invention.
Figure 43:
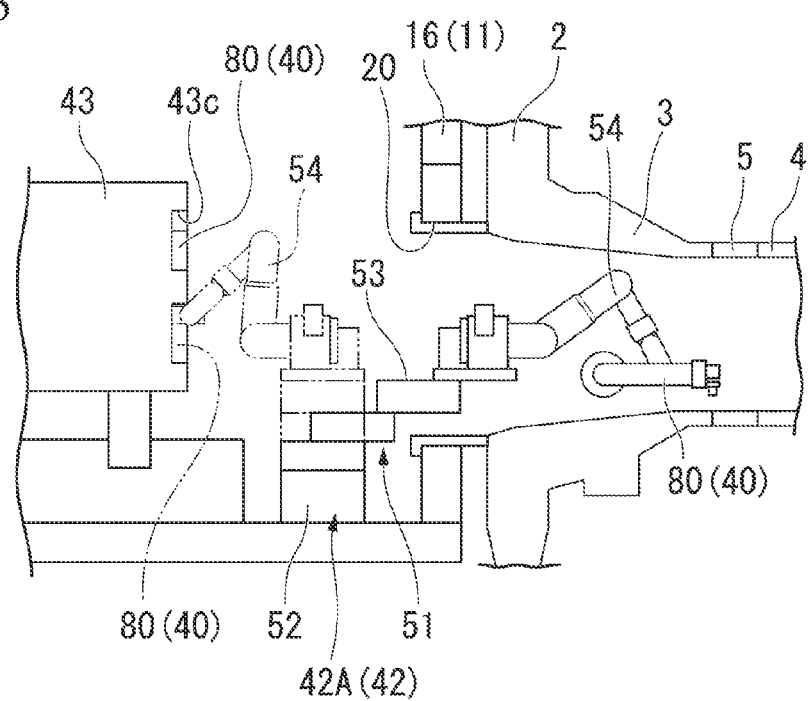
FIG. 43 is a cross-sectional view specifically illustrating a welding work in the welding step using the nozzle stub working system according to the embodiment of the present invention.

That is, the supervising computer 15 transmits a welding unit dropping command to the first control panel 14A. As shown in FIG. 42, the first control panel 14A drives the elevating device 44 to drop the storage device 43 receiving the welding unit 80 into the platform unit 11 on the basis of the command, and transmits a welding unit dropping completion notification to the supervising computer 15 after the dropping is completed. The supervising computer 15 receives the notification and transmits a welding command to the third control panel 14C. The third control panel 14C drives the first moving unit 42A to attach each welding unit 80 received in the storage device 43 to each manipulator 54 on the basis of the command. Then, as shown in FIG. 43, the third control panel 14C performs welding on the area cut in the cutting step S5 inside the inlet nozzle stub 3A by using the attached welding unit 80. At this time, the third control panel 14C monitors the number of rotations output from the encoder provided in the rotational driving section of the supply portion 91 of the welding unit 80. When it is determined that the wire W wound on the wire reel 91a is not left on the basis of the number of rotations, the third control panel drives the first moving unit 42A to perform the welding work again by using another welding unit 80 of the storage device 43.

When the cut area of each inlet nozzle stub 3A is completely welded, the third control panel 14C drives the first moving unit 42A to insert the welding unit 80 into the outlet nozzle stub 3B and to perform welding on the cut area of the outlet nozzle stub 3B. When all cut area of the nozzle stub 3 is completely welded, the third control panel 14C drives the first moving unit 42A to hand over the attached welding unit 80 to the storage device 43. The third control panel 14C transmits a welding completion notification to the supervising computer 15. Then, the supervising computer 15 receives the notification and transmits a welding unit lifting command to the first control panel 14A. The first control panel 14A drives the elevating device 44 to lift the storage device 43 receiving the welding unit 80 from the inside of the platform unit 11 up to the working floor 12 and dispose it at a predetermined arranged position on the basis of the command. The first control panel 14A transmits a welding unit lifting completion notification to the supervising computer 15. As shown in FIG. 22, the supervising computer 15 receives the notification and performs the next finish processing step S10.

Figure 44:
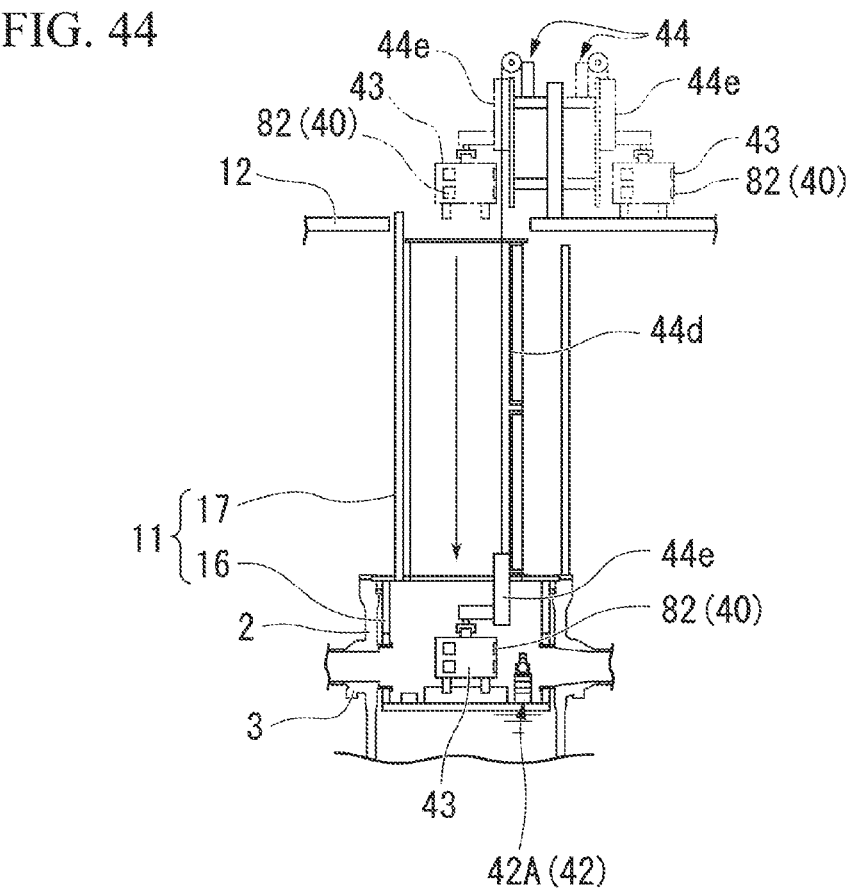
FIG. 44 is a cross-sectional view specifically illustrating a state where a finish processing unit is prepared in a finish processing step using the nozzle stub working system according to the embodiment of the present invention.
Figure 45:
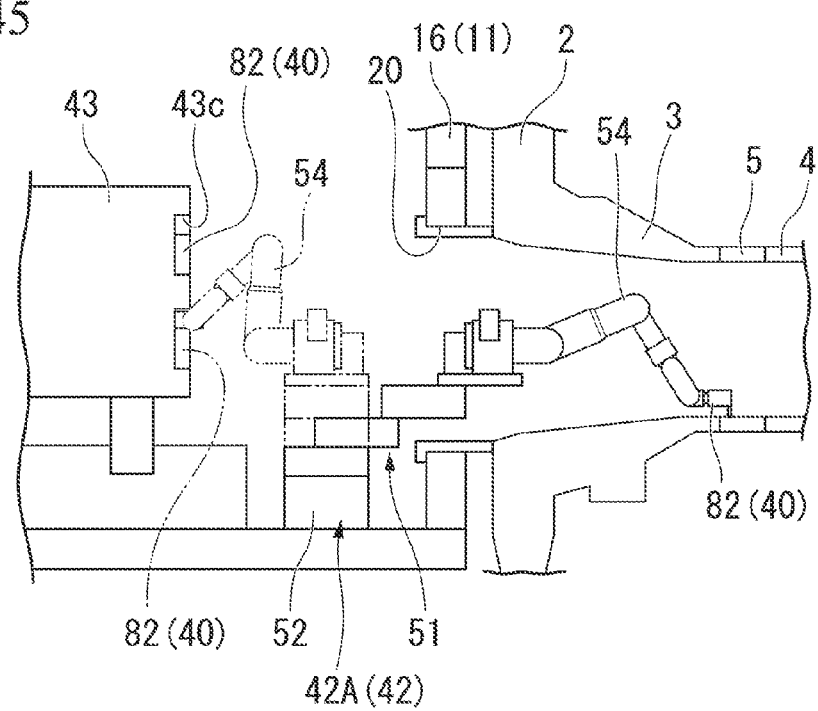
FIG. 45 is a cross-sectional view specifically illustrating a finish processing work in the finish processing step using the nozzle stub working system according to the embodiment of the present invention.

That is, the supervising computer 15 transmits a finish processing unit dropping command to the first control panel 14A. As shown in FIG. 44, the first control panel 14A drives the elevating device 44 to drop the storage device 43 receiving the finish processing unit 82 into the platform unit 11 on the basis of the command. When the storage device 43 is dropped into the platform unit 11, the first control panel 14A transmits a finish processing unit dropping completion notification to the supervising computer 15. The supervising computer 15 receives the notification and transmits a finish processing command to the third control panel 14C. As shown in FIG. 45, the third control panel 14C drives the first moving unit 42A to receive the finish processing unit 82 received in the storage device 43 using the manipulator 54 and insert it into the inlet nozzle stub 3A on the basis of the command.

When the unit reaches the welded area, the first grinding unit 110 is first driven to perform rough cutting on the welded area by the cutter 110a attached to the holder 110b. When grinding is performed on all welded areas by the first grinding unit 110 of the finish processing unit 82, the second grinding unit 111 is driven to perform finish cutting using the wire brush 111a. Then, when grinding is performed on all welded areas by the second grinding unit 111 of the finish processing unit 82, the third control panel 14C inserts the finish processing unit 82 into the outlet nozzle stub 3B and performs the same finish process on the welded area of the outlet nozzle stub 3B in the same manner as above. Then, when the finish welding of all welded areas of the nozzle stub 3 is completed, the third control panel 14C drives the first moving unit 42A to hand over the attached finish processing unit 82 to the storage device 43. The third control panel 14C transmits a finish processing completion notification to the supervising computer 15. Then, the supervising computer 15 receives the notification and transmits a finish processing unit lifting command to the first control panel 14A. The first control panel 14A drives the elevating device 44 to lift the storage device 43 receiving the finish processing unit 82 from the inside of the platform unit 11 onto the working floor 12 and dispose it at a predetermined position on the basis of the command. The first control panel 14A transmits a finish processing unit lifting completion notification to the supervising computer 15.

As shown in FIG. 22, the supervising computer 15 receives the notification and performs a second collecting step S11 for collecting the cut chips produced from the inside of the nozzle stub 3 in the finish processing step S10. The supervising computer 15 sequentially performs a second collecting step S11, a penetration inspection step S12 after maintenance, a dimension measuring step S13 after maintenance, and an ultrasonic inspection step S14 after maintenance. In the penetration inspection step S12 after maintenance, the penetration test is performed on the area welded in the welding step S9. In the dimension measuring step S13 after maintenance, the dimension of the defect detected by the penetration test is measured. In the ultrasonic inspection step S14 after maintenance, the ultrasonic test is performed on the area welded in the welding step. Furthermore, the specific control and the specific collecting work in the second collecting step S11 are the same as those of the first collecting step S6. Further, the specific control of the penetration test (step S12a) in the penetration inspection step S12 after maintenance is the same as that of step S4a. Further, the specific control (step S14a) of the ultrasonic test in the ultrasonic inspection step S14 after maintenance is the same as the control of step S7a of the ultrasonic penetration inspection step S7 before maintenance. For this reason, any step will not be illustrated again.

Furthermore, in the penetration inspection step S12 after maintenance, the supervising computer 15 determines whether there is a defect on the basis of the result of the penetration test of step S12a (step S12b). When it is determined that there is no defect, the supervising computer 15 performs the ultrasonic inspection step S14 after maintenance. Further, in the ultrasonic inspection step S14 after maintenance, the ultrasonic test is performed on all nozzle stubs 3 in step S14a, and the third control panel 14C transmits an ultrasonic inspection completion notification to the supervising computer 15. The supervising computer 15 determines whether there is a defect on the basis of the penetration inspection data and the defect dimension data input from the penetration inspection step S12 after maintenance and the ultrasonic inspection data input from step S14a of the ultrasonic inspection step S14 after maintenance (step S14b). Then, when it is determined that there is a defect, the supervising computer 15 performs the cutting step S5 again to perform the step after the cutting step S5 again. On the other hand, when it is determined that there is no defect, the supervising computer 15 performs the next nozzle stub opening step S15.

Figure 46:
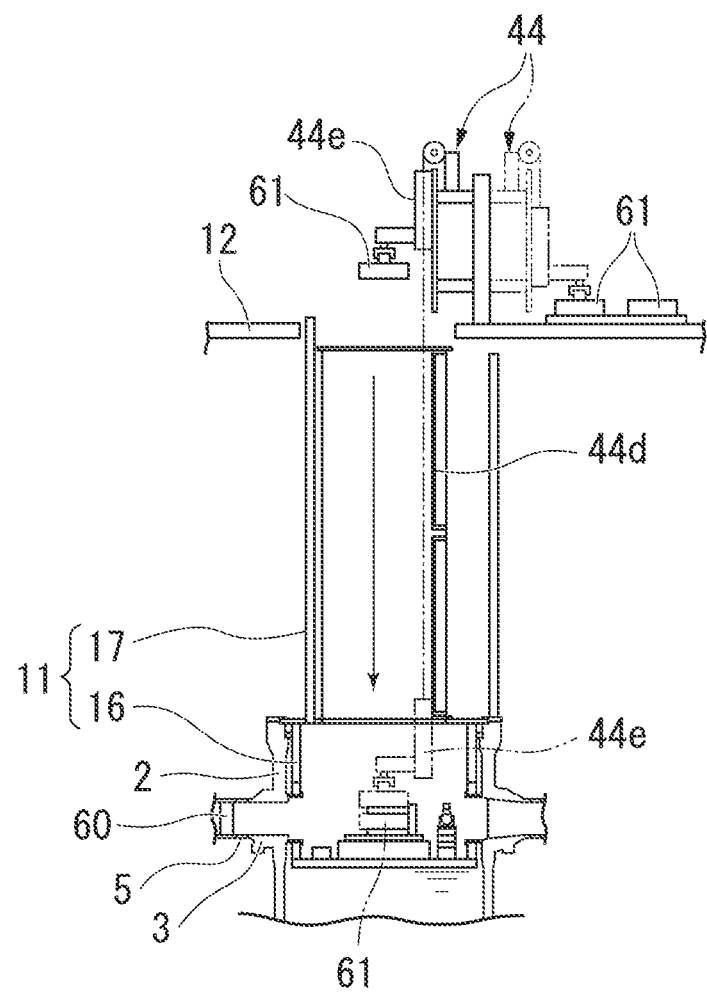
FIG. 46 is a cross-sectional view specifically illustrating a state where a guide portion is prepared in a nozzle stub opening step using the nozzle stub working system according to the embodiment of the present invention.
Figure 47:
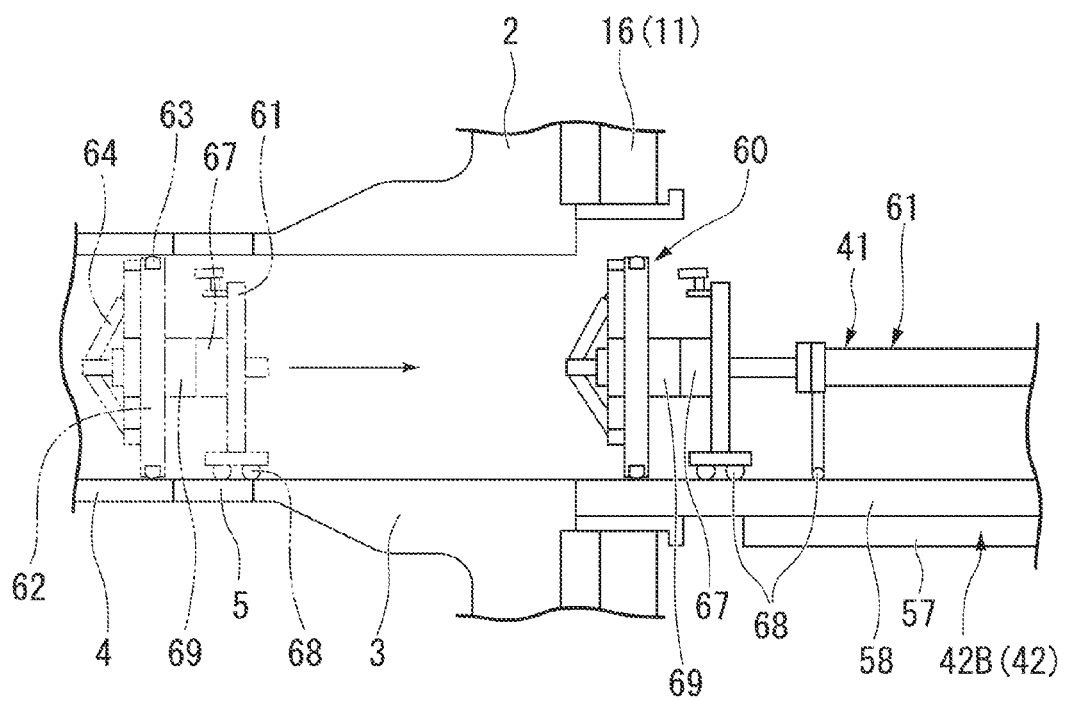
FIG. 47 is a cross-sectional view specifically illustrating a state where a nozzle stub blocking device is lifted in the nozzle stub opening step using the nozzle stub working system according to the embodiment of the present invention.

That is, the supervising computer 15 transmits a guide portion dropping command to the first control panel 14A. Then, the first control panel 14A drops the guide portion 61 of the nozzle stub blocking device 41 temporarily placed on the working floor 12 into the platform unit 11 and places it on the support plate 58 of the second moving unit 42B. When the guide portion 61 is placed on the support plate 58 by the elevating device 44, the first control panel 14A transmits a guide portion dropping completion notification to the supervising computer 15. The supervising computer 15 receives the notification and transmits the guide portion inserting command to the second control panel 14B. Accordingly, as shown in FIG. 46, the second control panel 14B drives the second moving unit 42B to select several inlet nozzle stubs 3A or several outlet nozzle stubs 3B. The second control panel rotates the platform unit 11 so that the slide direction L2 of the second moving unit 42B is aligned with the nozzle stub 3, and slides the slide plate 57 so that the guide portion 61 may move into the nozzle stub 3 on the support plate 58. Then, as shown in FIG. 47, the pressing member 59 of the second moving unit 42B is moved, so that the guide portion 61 of the nozzle stub blocking device 41 is extruded and the guide portion 61 travels into the nozzle stub 3 through the caster 68 thereof. Then, when the guide portion 61 is made to travel up to the position of the seal body 60 fixed to the inside of the nozzle stub 3 by the second moving unit 42B under the control of the second control panel 14R, the connection portion 67 of the front end of the guide portion 61 is connected to the subject connection portion 69 of the seal body 60. The second control panel 14B transmits a guide portion inserting completion notification to the supervising computer 15.

The supervising computer 15 receives the notification and transmits a plug fixing releasing command to the fifth control panel 14E. The fifth control panel 14E drives the operating water supply device 70 to release the state where the inner surface of the nozzle stub 3 is fixed by the fixing jack 64. Furthermore, the fifth control panel 14E drives the compressed air supply device 71 to decrease the pressure inside the inflatable seal 63, so that the inflatable seal 63 is contracted. The fifth control panel 14E transmits a plug fixing releasing completion notification to the supervising computer 15. Accordingly, the supervising computer 15 transmits a nozzle stub blocking device retreating command to the second control panel 14B. Then, the second control panel 14B drives the second moving unit 42B again to retract the support plate 58. Accordingly, the nozzle stub blocking device 41 having the guide portion 61 and the seal plug 62 connected to each other is retracted and is located inside the platform unit 11.

Next, when the nozzle stub blocking device 41 is retracted to the position inside the platform unit 11 by the second moving unit 42B, the second control panel 14B transmits the retreating completion notification of the nozzle stub blocking device 41 to the supervising computer 15. The supervising computer 15 receives the notification and transmits a nozzle stub blocking device lifting command to the first control panel 14A. The first control panel 14A drives the elevating device 44 to lift the nozzle stub blocking device 41 inside the platform unit 11 up to the working floor 12 and disposes it at a predetermined arrangement position on the working floor 12, and transmits a nozzle stub blocking device lifting completion notification to the supervising computer 15 after the arrangement is completed.

Figure 48:
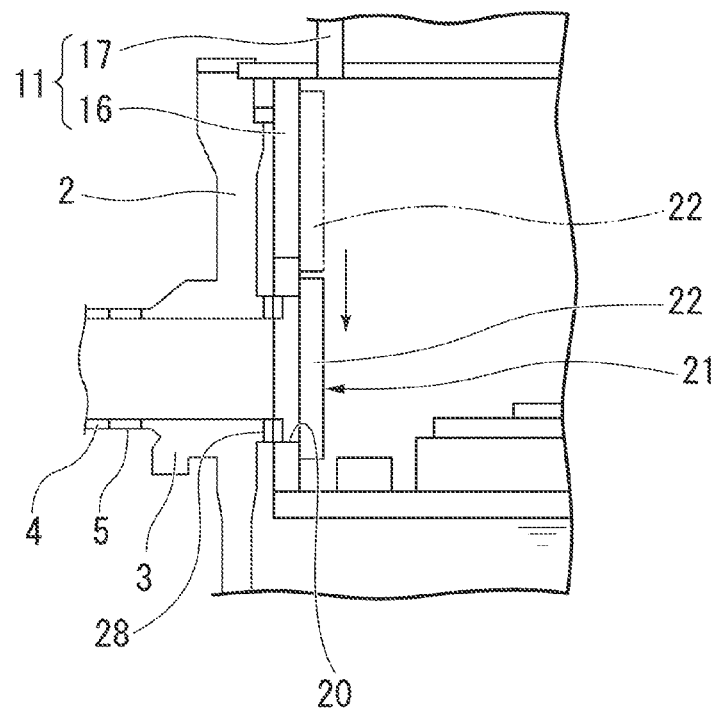
FIG. 48 is a cross-sectional view specifically illustrating an access window closing step using the nozzle stub working system according to the embodiment of the present invention.
Figure 49:
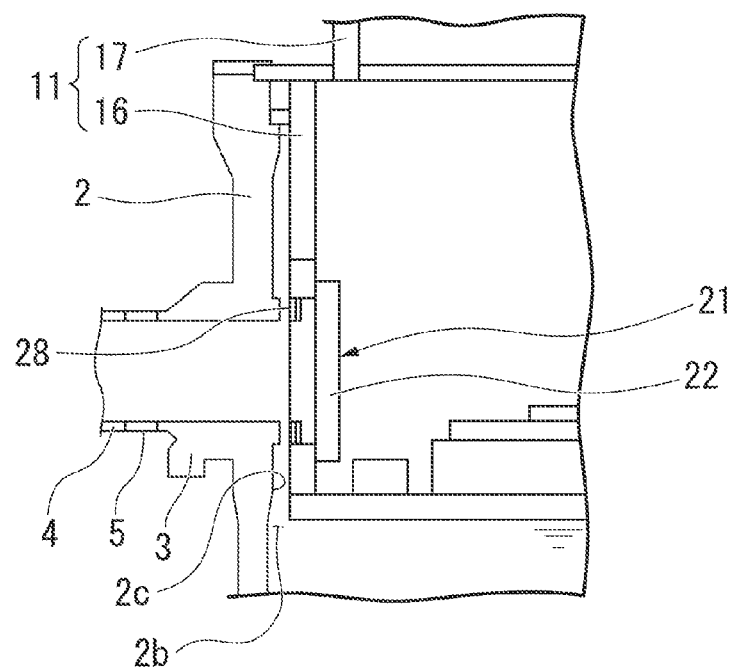
FIG. 49 is a cross-sectional view specifically illustrating a gap opening step using the nozzle stub working system according to the embodiment of the present invention.

When the above-described steps are repeated for each nozzle stub 3, all nozzle stubs 3 are opened again. Here, the supervising computer 15 manages whether the nozzle stub blocking step S15 is performed for each nozzle stub 3. When the nozzle stub opening step S15 is performed for all nozzle stubs 3, that is, the corresponding nozzle stub blocking device lifting completion notification for all nozzle stubs 3 is received, the next access window closing step S16 is performed. The supervising computer 15 transmits an access window closing command to the first control panel 14A. For this reason, as shown in FIG. 48, the first control panel 14A drives the electric winch 24 of the access window moving device 21 to drop the cover 22. Next, the operating water supply device 27 is driven to supply operating water so that the hydraulic jack 26 is advanced. Accordingly, the O-rings 22a provided between the cover 22 and the platform unit 11 adheres to each other. Accordingly, the access window 20 is closed (step S16a). Next, the supervising computer 15 transmits a gap opening command to the first control panel 14A. For this reason, as shown in FIG. 49, the first control panel 14A drives the compressed air supply device 31 to decrease the pneumatic pressure of the pneumatic cylinder 28a of the gap closing device 28, so that the protection ring 29 is separated from the inner surface 2c of the reactor vessel 2 by the pneumatic cylinder 28a and is received inside the access window 20 (step S16b).

As described above, according to the nozzle stub working system 10 of the embodiment, the access window moving device 21 is driven by the control device 13 provided outside the reactor vessel 2 to open the access window 20, and each working device 40 is driven to perform the work inside the nozzle stub 3. Accordingly, it is possible to automatically perform the works such as welding or various inspections inside the nozzle stub 3 without disposing a workman inside the platform unit 11. Furthermore, since the access window moving device 21 is driven by the control device 13 to close the access window 20 after the work is completed, it is possible to automatically return the inside of the reactor vessel 2 to the underwater environment without disposing the workman inside the platform unit 11.

It is possible to dispose a plurality of devices requiring the working device 40 outside the reactor vessel 2 by using the working floor 12 above the reactor vessel 2. Further, since the elevating device 44 is driven under the control of the control device 13, it is possible to perform various works inside the nozzle stub 3 by dropping the working device 40 into the platform unit 11 if necessary. For this reason, it is possible to decrease the number of devices disposed inside the platform unit 11 as minimally as possible and highly efficiently perform the work inside the nozzle stub 3 in a narrow space. Further, it is possible to sequentially perform a plurality of types of works by switching the working device 40 using the elevation of the elevating device 44. Furthermore, the moving device 42 is provided inside the platform unit 11, and the working device 40 may be sent and received between the elevating device 44 and the moving device under the control of the control device 13. Further, the attached working device 40 may be moved. For this reason, a moving function does not need to be provided in the working device 40, and the working device 40 may have a minimal function for performing the work, so that a decrease in size may be realized. For this reason, it is possible to realize a decrease in weight of the working device 40 elevated by the elevating device 44 and realize a decrease in size of the elevating device 44. Accordingly, it is possible to more easily perform the movement and the work in a narrow space inside the platform unit 11 and the nozzle stub 3. In particular, since all moving devices 42 are configured to be rotatable about the central axis C11 of the platform unit 11 inserted into the reactor vessel 2, it is possible to accurately and easily perform the positioning with respect to the plurality of nozzle stubs 3 radially provided in the reactor vessel 2.

In the embodiment, the moving device 42 includes the first moving unit 42A and the second moving unit 42B. Then, the working device 40 includes the first working unit 160 and the second working unit 161. For this reason, it is possible to perform the work inside the nozzle stub 3 using the first working unit 160 while delicately adjusting the position of the first working unit 160 using the first moving unit 42. On the other hand, the second working unit 161 may perform the work while taking a stable posture inside the nozzle stub 3 using the fixing unit fixing itself. That is, it is possible to appropriately perform the work while delicately moving inside the nozzle stub by the combination of the first moving unit 42A and the first working unit 160. Further, it is possible to appropriately perform the work causing a reaction or vibration from the nozzle stub 3 by the combination of the second moving unit 42B and the second working unit 161.

In the embodiment, the welding unit 80 and the like constituting the first working unit 160 are disposed on the working floor 12 while being received in the storage device 43. For this reason, in the case of the first working unit 160, it is possible to elevate a plurality of working devices received in the storage device 43 using the elevating device 44, and thus to highly efficiently elevate the working devices. It is possible to perform the work by selecting a working device from the plurality of the first working units 160 received in the storage device 43 while the storage device 43 is dropped into the platform unit 11. In the case of the work performed by using a consumable material, the working unit does not need to be exchanged using the elevating device 44 whenever the consumable material is completely consumed, but the first working unit 160 may be exchanged between the storage device 43 and the first moving unit 42A. Accordingly, it is possible to efficiently perform the work. As described above, a plurality of the storage devices 43 is provided in accordance with the type of the work, and each first working unit 160 is received in the storage device 43. For this reason, it is possible to selectively elevate the storage device 43 in accordance with the type of the work by driving the elevating device 44, and simultaneously perform the same type of work by using the plurality of first working units 160 received in one storage device 43. Further, it is possible to sequentially perform a plurality of works by switching the storage device 43. Accordingly, it is possible to efficiently perform the work.

While the embodiment of the present invention has been specifically described by referring to the drawings, the specific configuration is not limited to the embodiment, and modifications and the like within the scope of the present invention are included in the invention.

INDUSTRIAL APPLICABILITY

According to the nozzle stub working system for the reactor vessel of the present invention, it is possible to shorten a work period and reduce costs while suppressing a radiation exposure dose of a workman as much as possible.

REFERENCE SIGNS LIST

2: REACTOR VESSEL
3: NOZZLE STUB
10: NOZZLE STUB WORKING SYSTEM
11: PLATFORM UNIT
12: WORKING FLOOR
13: CONTROL DEVICE
20: ACCESS WINDOW
21: ACCESS WINDOW MOVING DEVICE
28: GAP CLOSING DEVICE
40: WORKING DEVICE
40A: INSPECTING UNIT
40B: CONSTRUCTING UNIT
41: NOZZLE STUB BLOCKING DEVICE
42: MOVING DEVICE
42A: FIRST MOVING UNIT
42B: SECOND MOVING UNIT
43: STORAGE DEVICE
44: ELEVATING DEVICE
80: WELDING UNIT
81: CUTTING UNIT
82: FINISH PROCESSING UNIT
160: FIRST WORKING UNIT
161: SECOND WORKING UNIT

The invention claimed is:

1. A nozzle stub working system for a reactor vessel that performs work inside a nozzle stub protruding outward from a side surface of the reactor vessel and allowing the inside and the outside of the reactor vessel to communicate with each other, the nozzle stub working system for the reactor vessel comprising:
   a platform unit that is provided at an upper portion inside the reactor vessel, of which the upper portion is opened by separating an upper structure and an inner structure therefrom, and includes a substantially cylindrical side wall portion and a bottom portion blocking the lower end of the side wall portion;
   an access window that is provided at the side wall portion of the platform unit to allow the inside of the platform unit to communicate with the nozzle stub;
   an access window moving device that opens and closes the access window;
   a working device that advances from the inside of the platform unit to the inside of the nozzle stub to perform work inside the nozzle stub;
   a working floor that is provided above the reactor vessel;
   an elevating device that elevates the working device from the working floor into the platform unit;
   a moving device that is provided inside the platform unit, configured to send and receive the working device between the moving device and the elevating device inside the platform unit, configured to separably attach the working device thereto, and configured to move the working device attached to the moving device between predetermined positions of the nozzle stub and the inside of the platform unit; and
   a control device that is provided at the outside of the reactor vessel and controls the access window moving device and the working device, the elevating device, and the moving device,
   wherein the moving device includes:
       a first moving unit that separably attaches the working device to the front end thereof and moves the attached working device to be rotatable about a horizontal axis and two axes perpendicular thereto, and
       a second moving unit that includes a support plate on which the working device is placed and moves the working device placed on the support plate to slide the support plate,
   wherein the control device drives the access window moving device to open the access window, drives the working device to perform work inside the nozzle stub, and then drives the access window moving device to close the access window after the performance of the work,
   wherein the first moving unit is provided with a lower plate and a plurality of upper plates having a first upper plate and a second upper plate, the first upper plate being arranged on the lower plate, the second upper plate being arranged on the first upper plate, and the first moving unit adjusts a position of the working device relative to the nozzle stub by sliding the first upper plates with respect to the lower plate and sliding the second upper plate with respect to the first upper plate,
   wherein the control device drives the elevating device to drop the working device into the platform unit, and
   wherein the control device drives the moving device.

2. The nozzle stub working system for the reactor vessel according to claim 1, wherein the moving device is configured to be rotatable about the central axis of the platform unit.

3. The nozzle stub working system for the reactor vessel according to claim 1 or 2,
wherein the working device includes:
a first working unit that is separably attached to the front end of the first moving unit and is driven while being attached thereto, and
a second working unit that is placed on the support plate of the second moving unit and includes a fixing unit fixed to an inner surface of the nozzle stub inside the nozzle stub.

4. The nozzle stub working system for the reactor vessel according to claim 1 or 2, further comprising:
a storage device that receives a plurality of working devices,
wherein the elvating device elevates the storage device receiving the plurality of working devices.

5. The nozzle stub working system for the reactor vessel according to claim 4, further comprising:
a plurality of types of the working devices; and
a plurality of the storage devices that correspond to the types of the working devices, each type of the working device being received in each storage device,
wherein the control device drives the elevating device to selectively elevate the storage device in accordance with the type of work.

6. The nozzle stub working system for the reactor vessel according to claim 1, further comprising:
a nozzle stub blocking device that blocks the nozzle stub inside the nozzle stub,
wherein the control device drives the nozzle stub blocking device to block the nozzle stub at a position on the inner side of a work position when seen from the reactor vessel inside the nozzle stub before the work inside the nozzle stub using the working device.

7. The nozzle stub working system for the reactor vessel according to claim 1, further comprising:
a gap closing device that closes a gap between the access window and the nozzle stub,
wherein the control device drives the gap closing device to close a gap between the access window and the nozzle stub before or immediately after driving the access window moving device to open the access window.

8. The nozzle stub working system for the reactor vessel according to claim 1,
wherein the working device includes:
an inspecting unit that inspects the inner surface of the nozzle stub, and
a constructing unit that performs an inner surface construction at the inner surface of the nozzle stub, and
wherein the control device allows the inspecting unit to inspect the inner surface of the nozzle stub and allows the constructing unit to perform the inner surface construction at the inner surface of the nozzle stub on the basis of the inspection result of the inspecting unit.

9. The nozzle stub working system for the reactor vessel according to claim 8,
wherein the constructing unit includes a cutting unit that cuts the inner surface of the nozzle stub, and
wherein the control device drives the cutting unit to cut the inner surface of the nozzle stub in an area that is determined as a defective position on the basis of the inspection result using the inspecting unit.

10. The nozzle stub working system for the reactor vessel according to claim 9,
wherein the control device allows the inspecting unit to inspect the area cut by the cutting unit after the cutting is performed by the cutting unit, and drives the cutting unit again to perform cutting when a defective position is found on the basis of the inspection result using the inspecting unit.

11. The nozzle stub working system for the reactor vessel according to claim 9,
wherein the constructing unit further includes a welding unit that welds the inner surface of the nozzle stub, and
wherein the control device drives the welding unit to perform welding on the area cut by the cutting unit.

12. The nozzle stub working system for the reactor vessel according to claim 11,
wherein the constructing unit further includes a finish processing unit that performs finish processing on the inner surface of the nozzle stub, and
wherein the control device drives the finish processing unit to perform finish processing on the area welded by the welding unit.

13. The nozzle stub working system for the reactor vessel according to claim 11,
wherein the control device allows the inspecting unit to inspect the area welded by the welding unit, and retreats the working device inside the platform unit to close the access window using the access window moving device when a construction is determined to be satisfactory in all areas on the basis of the inspection result using the inspecting unit.

14. The nozzle stub working system for the reactor vessel according to claim 13,
wherein the control device drives the cutting unit again to perform cutting on the area determined as a defective construction.

15. A nozzle stub working system for a reactor vessel that performs work inside a nozzle stub protruding outward from a side surface of the reactor vessel and allowing the inside and the outside of the reactor vessel to communicate with each other, the nozzle stub working system for the reactor vessel comprising:
a platform unit that is provided at an upper portion inside the reactor vessel, of which the upper portion is opened by separating an upper structure and an inner structure therefrom, and includes a substantially cylindrical side wall portion and a bottom portion blocking the lower end of the side wall portion;
an access window that is provided at the side wall portion of the platform unit to allow the inside of the platform unit to communicate with the nozzle stub;
an access window moving device that opens and closes the access window;
a working device that advances from the inside of the platform unit to the inside of the nozzle stub to perform work inside the nozzle stub;
a control device that is provided at the outside of the reactor vessel, after driving the access window moving device to open the access window, drives the working device to perform work inside the nozzle stub, and then drives the access window moving device to open and to close the access window after the performance of the work,
a working floor that is provided above the reactor vessel;
an elevating device that elevates the working device from the working floor into the platform unit; and a moving device that is provided inside the platform unit, separably attaches the working device thereto, and moves the working device attached thereto, wherein the moving device includes:
a first moving unit that separably attaches the working device to the front end thereof and moves the attached working device to be rotatable about a horizontal axis and two axes perpendicular thereto, and a second moving unit that includes a support plate on which the working device is placed and moves the working device placed on the support plate to slide the support plate, wherein the first moving unit is provided with a lower plate and a plurality of upper plates having a first upper plate and a second upper plate, the first upper plate being arranged on the lower plate, the second upper plate being arranged on the first upper plate, and the first moving unit adjusts a position of the working device relative to the nozzle stub by sliding the first upper plates with respect to the lower plate and sliding the second upper plate with respect to the first upper plate, wherein the control device drives the elevating device to drop the working device into the platform unit, and wherein the elevating device includes:
a support table configured to travel on the working floor;
a frame that is provided on the support table to be rotatable about the perpendicular axis;
a pair of a first rail and a second rail that is respectively disposed at the frame and the inner peripheral surface of the platform unit to be substantially perpendicular thereto;
a body configured to travel up and down on the first rail and the second rail; and
a pair of grip portions configured to be movable close to or away from the body.

16. The nozzle stub working system for the reactor vessel according to claim 15, further comprising:
wherein the control device drives the moving device to send and receive the working device between the moving device and the elevating device inside the platform unit, and moves the working device attached to the moving device between predetermined positions inside the platform unit and the nozzle stub.

17. The nozzle stub working system for the reactor vessel according to claim 1,
wherein the moving device is configured to be rotatable about the central axis of the platform unit,
wherein the first moving unit includes a guide rail that is formed in a circular-arc shape at an outer periphery on the bottom portion of the platform unit and a unit body that is movable about the central axis of the platform unit in a circumferential direction along the guide rail, and
wherein the second moving unit is provided near an inner periphery of the guide rail of the first moving unit on the bottom portion of the platform unit to be rotatable about the central axis of the platform unit.

18. The nozzle stub working system for the reactor vessel according to claim 1 or 2, further comprising:
a storage device that receives a plurality of working devices,
wherein the elevating device elevates the storage device receiving the plurality of working devices, wherein the storage device includes a leg portion that is capable of being disposed inside the platform unit and a body having a substantially cylindrical shape that is supported by the leg portion, and a plurality of receiving concave portions is provided at the body in a circumferential direction to receive a target working device.

19. A nozzle stub working system for a reactor vessel that performs work inside a nozzle stub protruding outward from a side surface of the reactor vessel and allowing the inside and the outside of the reactor vessel to communicate with each other, the nozzle stub working system for the reactor vessel comprising:
a platform unit that is provided at an upper portion inside the reactor vessel, of which the upper portion is opened by separating an upper structure and an inner structure therefrom, and includes a substantially cylindrical side wall portion and a bottom portion blocking the lower end of the side wall portion;
an access window that is provided at the side wall portion of the platform unit to allow the inside of the platform unit to communicate with the nozzle stub;
an access window moving device that opens and closes the access window;
a working device that advances from the inside of the platform unit to the inside of the nozzle stub to perform work inside the nozzle stub; and
a working floor that is provided above the reactor vessel; and
an elevating device that elevates the working device from the working floor into the platform unit,
a moving device that is provided inside the platform unit, configured to send and receive the working device between the moving device and the elevating device inside the platform unit, configured to separably attach the working device, and configured to moves the working device attached to the moving device between predetermined positions of the nozzle stub and the inside of the platform unit; and
a control device that is provided at the outside of the reactor vessel and controls the access window moving device and the working device, the elevating device, and the moving device,
wherein the moving device includes:
a first moving unit that is provided with a lower plate and a plurality of upper plates having a first upper plate and a second upper plate, the first upper plate being arranged on the lower plate, the second upper plate being arranged on the first upper plate, and
a second moving unit that includes a support plate on which the working device is placed and moves the working device placed on the support plate to be slid, and wherein
the control device is configured to:
(a) drive the elevating device to drop the working device into the platform unit;
(b) after (a), drive the access window moving device to open the access window;
(c) after (b), drive the first moving unit to adjust a position of the working device relative to nozzle stub by separably attaching the working device to the front end of the first moving unit and rotating the attached working device about a horizontal axis and two axes, and by sliding the first upper plate with respect to the lower plate and sliding the second upper plate with respect to the first upper plate;

(d) after (c), drive the working device to perform work inside the nozzle stub; and (e) after (d), drive the access window moving device to close the access window.

20. The nozzle stub working system for the reactor vessel according to claim 19, wherein the moving device is rotatable about the central axis of the platform unit, wherein the first moving unit includes a guide rail that is formed in a circular-arc shape at an outer periphery on the bottom portion of the platform unit and a unit body that is movable about the central axis of the platform unit in a circumferential direction along the guide rail, wherein the second moving unit is provided near an inner periphery of the guide rail of the first moving unit on the bottom portion of the platform unit to be rotatable about the central axis of the platform unit.

21. The nozzle stub working system for the reactor vessel according to claim 19, further comprising:

a storage device that receives the plurality of working devices, wherein the elevating device elevates the storage devices receiving a plurality of working devices, wherein the storage device includes a leg portion that may be disposed inside the platform unit and a body having a substantially cylindrical shape that is supported by the leg portion, and a plurality of receiving concave portions is provided at the body in a circumferential direction to receive a target working device.

* * * * *